US012117742B2

(12) United States Patent
Haruta et al.

(10) Patent No.: US 12,117,742 B2
(45) Date of Patent: Oct. 15, 2024

(54) IMAGE FORMING APPARATUS WITH ENHANCING STRUCTURE IN COVER

(71) Applicant: BROTHER KOGYO KABUSHIKI KAISHA, Nagoya (JP)

(72) Inventors: Kotaro Haruta, Gifu (JP); Tomohiro Wada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/047,823

(22) Filed: Oct. 19, 2022

(65) Prior Publication Data

US 2023/0125825 A1 Apr. 27, 2023

(30) Foreign Application Priority Data

Oct. 21, 2021 (JP) ................................ 2021-172622
May 23, 2022 (JP) ................................ 2022-083951

(51) Int. Cl.
*G03G 15/04* (2006.01)
*G03G 21/16* (2006.01)

(52) U.S. Cl.
CPC ... *G03G 15/04054* (2013.01); *G03G 21/1628* (2013.01); *G03G 2215/0409* (2013.01); *G03G 2221/1687* (2013.01)

(58) Field of Classification Search
CPC ........... G03G 15/04054; G03G 15/011; G03G 15/0178; G03G 21/1628; G03G 2215/0103; G03G 2215/0409; G03G 2221/1687; G06K 15/1247; G06K 15/1261; B41J 2/45
USPC ........ 399/118, 220; 347/118, 130, 138, 238, 347/242, 245, 257, 263
See application file for complete search history.

(56) References Cited

U.S. PATENT DOCUMENTS 7,957,666 B2 * 6/2011 Sato .................. G03G 15/6552 399/125
9,116,500 B2 * 8/2015 Ito ...................... G03G 21/1628
2009/0087209 A1 * 4/2009 Yamaguchi .......... G03G 15/011 399/98

(Continued)

FOREIGN PATENT DOCUMENTS

JP 2009-157001 A 7/2009
JP 2013-73072 A 4/2013

(Continued)

*Primary Examiner* — Robert B Beatty
(74) *Attorney, Agent, or Firm* — Merchant & Gould P.C.

(57) ABSTRACT

An image forming apparatus, having a housing with an opening, an openable/closable cover, a hinge supporting the openable/closable cover pivotably, LED units including LED heads, a first enhancing member, a second enhancing member, and a link member, is provided. The LED units are supported by the openable/closable cover. The first enhancing member, the second enhancing member, and the link member are attached to an inner surface of the openable/closable cover. The first enhancing member and the second enhancing member are located on one side and the other side, respectively, of the openable/closable cover in a first direction being parallel to a pivot axis of the hinge and extend in a second direction. The link member links the first enhancing member and the second enhancing member at a position farther from the hinge than one of the LED units located closest to the hinge in the second direction.

18 Claims, 33 Drawing Sheets

(56) References Cited

U.S. PATENT DOCUMENTS

| | | | | |
|---|---|---|---|---|
| 2009/0162091 | A1 | 6/2009 | Yokoi | |
| 2009/0169228 | A1* | 7/2009 | Yokoi .................. | G03G 15/326 399/88 |
| 2013/0077986 | A1 | 3/2013 | Mori et al. | |
| 2014/0056612 | A1* | 2/2014 | Mori .................. | G03G 21/1628 399/110 |
| 2017/0214811 | A1* | 7/2017 | Sakai ................. | H04N 1/00559 |
| 2018/0095407 | A1* | 4/2018 | Tsukada ............. | G03G 21/1628 |
| 2020/0341425 | A1* | 10/2020 | Hiraoka ............. | G03G 21/1666 |

FOREIGN PATENT DOCUMENTS

| | | |
|---|---|---|
| JP | 2014-66840 A | 4/2014 |
| JP | 2020-86035 A | 6/2020 |

* cited by examiner

IMAGE FORMING APPARATUS WITH ENHANCING STRUCTURE IN COVER

REFERENCE TO RELATED APPLICATIONS

This application claims priorities under 35 U.S.C. § 119 from Japanese Patent Applications No. 2021-172622, filed on Oct. 21, 2021, and No. 2022-083951, filed on May 23, 2022, the entire subject matters of which are incorporated herein by reference.

BACKGROUND ART

The present disclosure is related to an image forming apparatus.

For example, an image forming apparatus, or a multicolor printer, in a tandem style having a housing, a cover, and light-emitting diode (LED) line heads being exposure devices is known. The housing may accommodate consumable materials such as toners and may have an opening, and the cover may be movable to cover or expose the opening. The consumable materials may be exchanged through the opening of the housing, and the LED heads may be attached to the cover and movable along with the cover.

The cover may pivot on hinges, which are arranged on one end of the hosing, and LED units each having the LED line head may be attached to an inner surface of the cover.

The cover may work also as an ejection tray and may be formed in resin. Therefore, an LED holder frame to enhance the cover and retain the LED units may be attached to the inner surface of the cover. The LED holder frame may be formed of a metal plate and may be arranged to entirely cover the LED units attached to the cover.

For another example, an image forming apparatus having a housing, an upper cover, side frames, and an upper panel is known. The upper cover may be pivotably attached to the housing to pivot on hinges being a fulcrum. The side frames attached to the housing may be formed of metal plates. The upper panel may be formed of a metal plate and may be attached to the upper cover.

The upper panel may be electrically connected to the side frame of the housing thorough a conductive cable at a position in vicinity to the hinges and thereby may be grounded.

SUMMARY

The former image forming apparatus may have four LED units for four colors. The four LED units may be retained by the LED holder frame formed of the metal sheet in the cover. In order to retain the four LED units securely, the LED holder frame may need to have a relatively large area dimension, and an overall thickness of the LED holder frame may be decided with reference to specific parts of the LED holder frame that specifically require strength. Therefore, weight of the LED holder frame tends to increase, and in order to ensure dimensional accuracy, yield ratio tends to decrease, which may increase manufacturing cost.

In the latter image forming apparatus, the upper panel may be grounded through the conductive cable at the position near the hinges alone. In other words, static electricity may accumulate in a part of the upper panel on a side opposite to the hinges. The accumulated static electricity may electrically interfere with other electrical components in the image forming apparatus, causing malfunction of the electrical components.

The present disclosure is advantageous in that an image forming apparatus, in which rigidity of a cover is secured and LED units are retained stably, and in which components may be downsized and dimensional accuracy may be improved so that manufacturing cost is reducible. Moreover, an image forming apparatus, in which overall static electricity generated in a cover is eliminative, and malfunction of the electrical components is restrained, is provided.

DETAILED DESCRIPTION

First Embodiment

A first embodiment of the present disclosure will be described with reference to the accompanying drawings.

In the following description, a right-hand side and a left-hand side in FIG. 1 to a viewer will be defined as a front side and a rear side, respectively, of an image forming apparatus 1, and a nearer side and a farther side to the viewer with respect to a cross section in FIG. 1 will be defined as a leftward side and a rightward side, respectively, of the image forming apparatus 1. An upper side and a lower side in FIG. 1 will be defined as an upper side and a lower side, respectively, of the image forming apparatus 1. A front-to-rear or rear-to-front direction may be called as a front-rear direction, a left-to-right or right-to-left direction may be called as a widthwise direction, and an up-to-down or down-to-up direction may be called as a vertical direction. The front-rear direction, the widthwise direction, and the vertical direction intersect orthogonally with one another.

Figure 1:
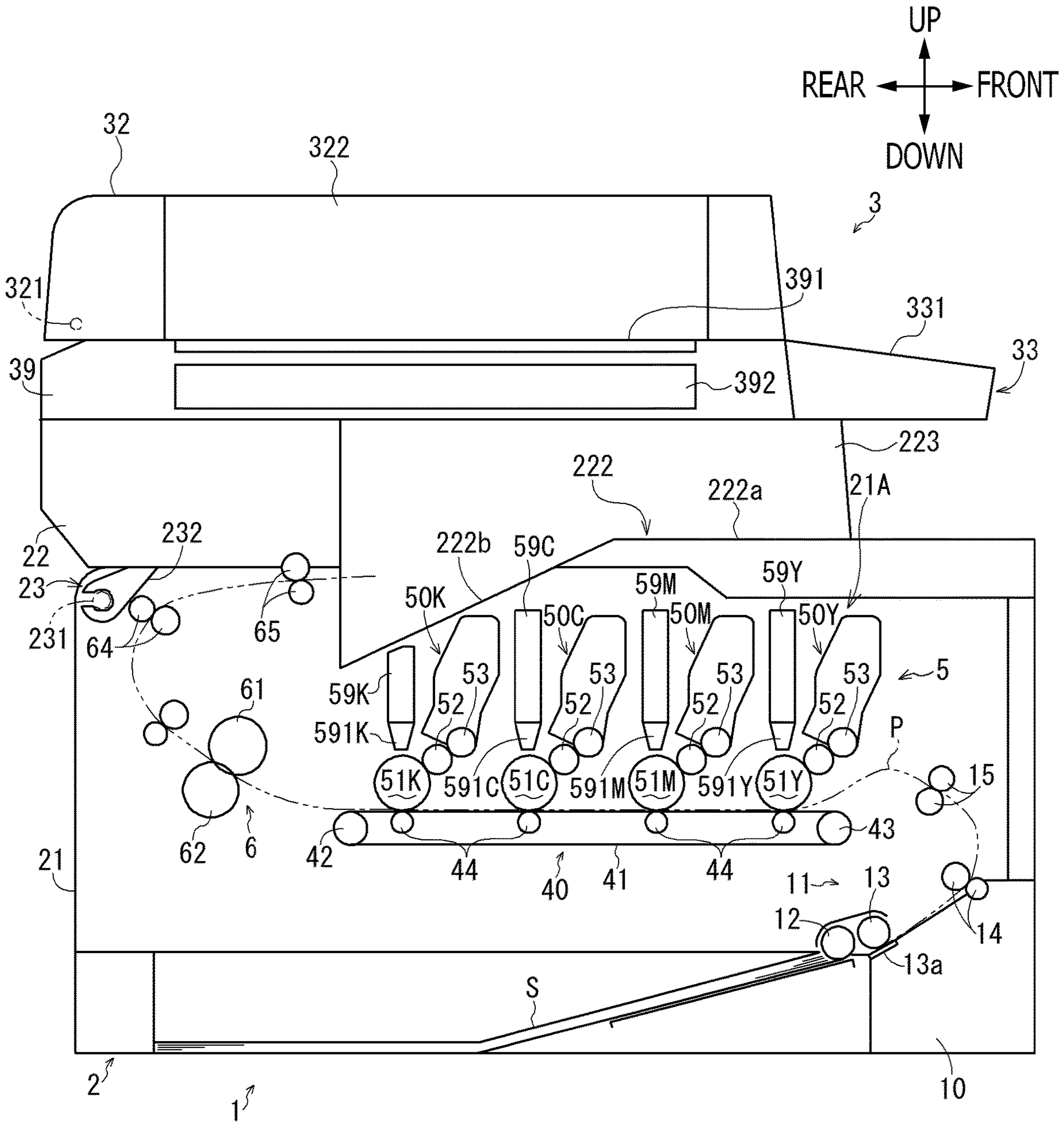
FIG. 1 is a cross-sectional view of an image forming apparatus.
Figure 2:
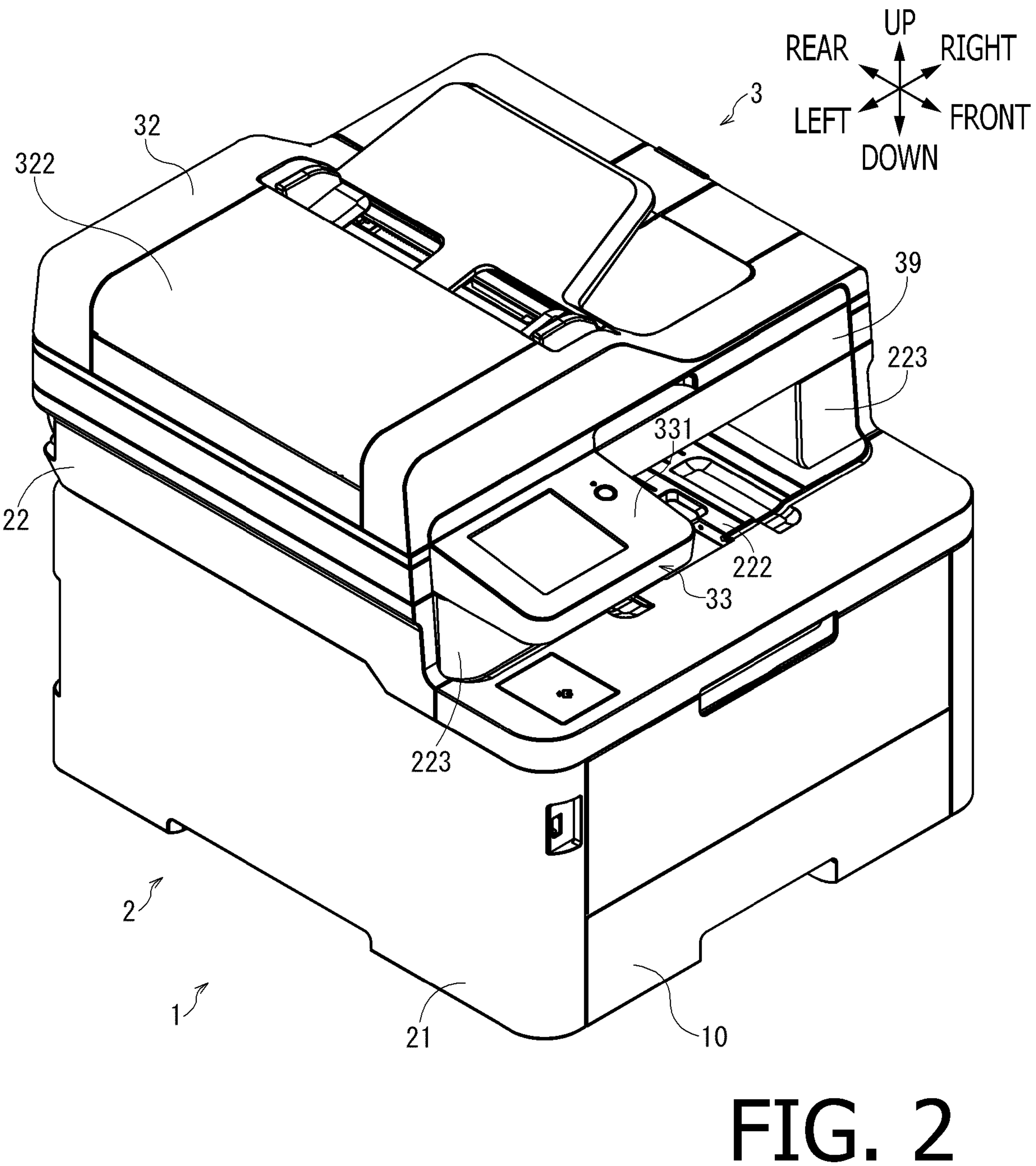
FIG. 2 is a perspective view of the image forming apparatus with an openable/closable cover located at a closed position.
Figure 3:
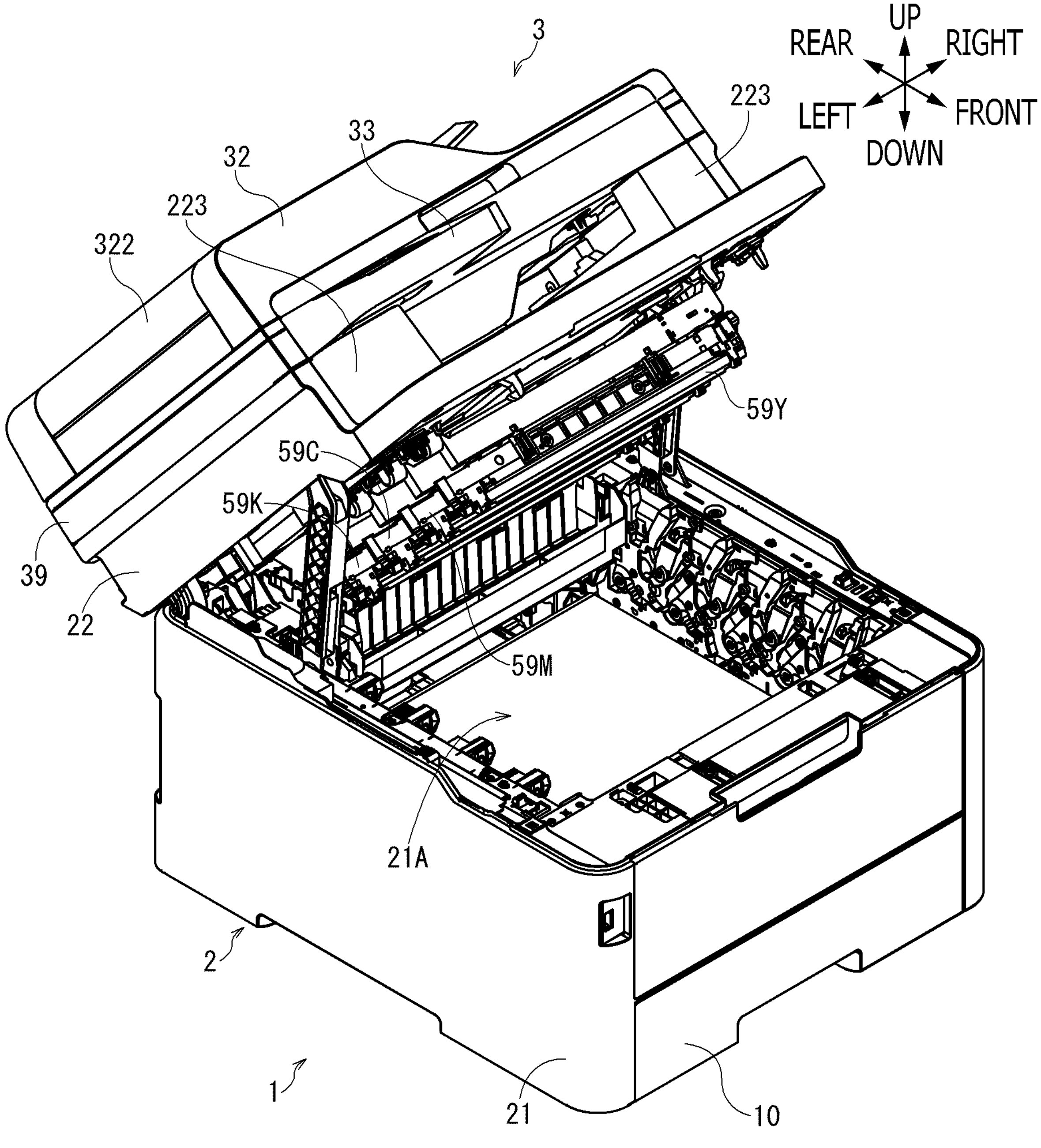
FIG. 3 is a perspective view of the image forming apparatus with the openable/closable cover located at an open position.

The image forming apparatus 1 as shown in FIGS. 1-3 is an exemplary embodiment of the present disclosure and may be a color laser printer which may form multicolored images electro-photographically on sheets S. The image forming apparatus 1 has a first housing 2 and a second housing 3.

The first housing 2 includes a housing body 21, an openable/closable cover 22, and a hinge 23. The housing body 21 has a shape of an approximately rectangular box with an opening 21A on an upper side thereof. Through the opening 21A, an inner side space of the housing body 21 is open upward. The housing body 21 accommodates components including a feeder tray 10 to support the sheets S, a sheet conveyer 11 to convey the sheets S, an image forming device 5 to form toner images on the sheets S conveyed by the sheet conveyer 11, and a fuser 6 to fix the toner images on the sheets S.

The openable/closable cover 22 is movable to open or close the opening 21A of the housing body 21. The hinge 23 includes a pair of hinges 23, which are located on a rightward side and a leftward side of the first housing 2. The hinge 23 supports the openable/closable cover 22 pivotably. The hinge 23 is fixed to the housing body 21 and includes a rotation shaft 231, which extends in the widthwise direction, and a supporting arm 232, which is fixed to the openable/closable cover 22 and pivotably fitted around the rotation shaft 231. The rotation shaft 231 is fixed to a rear end area of the housing body 21, and the supporting arm 232 is fixed to a rear end area of the openable/closable cover 22. In this regard, the widthwise direction may be parallel to the rotation shaft 231 of the hinge 23.

With the supporting arm 232 fitted around the rotation shaft 231, the openable/closable cover 22 may pivot on the rotation shaft 231. The openable/closable cover 22 pivoting on the rotation shaft 231 moves between a closed position (see FIGS. 1 and 2), at which the openable/closable cover 22 covers the opening 21A, and an open position (see FIG. 3), at which the openable/closable cover 22 opens the opening 21A.

The openable/closable cover 22 includes an ejection tray 222, in which the sheets S ejected from the housing body 21 may rest. The ejection tray 222 has a horizontal section 222*a*, which extends substantially horizontally, and a slanted section 222*b*, which slants to be lower toward the rear side and dents inward in the housing body 21. The slanted section 222*b* is located rearward in the ejection tray 222, while the horizontal section 222*a* is located frontward with respect to the slanted section 222*b*.

The openable/closable cover 22 includes a supporting column 223 to support the second housing 3. The supporting column 223 includes a pair of supporting columns 223, which are located on a rightward end and a leftward end of the openable/closable cover 22. Between the supporting column 223 on the right and the supporting column 223 on the left, the ejection tray 222 is located.

The feeder tray 10 is located at a lower position in the housing body 21, and the sheet conveyer 11 may convey the sheet S supported on the feeder tray 10 to the image forming device 5. The feeder tray 10 is slidable in the front-rear direction to move between a stored position, in which the feeder tray 10 is stored in the housing body 21, and a separated position, in which the feeder tray 10 is drawn frontward from the stored position.

The sheet conveyer 11 includes a feeder roller 12, a separator roller 13, a separator pad 13*a*, a conveyer roller pair 14, and a registration roller pair 15. In the housing body 21, a conveyer path P, which extends from the feeder tray 10 through the image forming device 5 to the ejection tray 222, is formed.

The sheets S supported by the feeder tray 10 may be separated from one another by the feeder roller 12, the separator roller 13, and the separator pad 13*a*. The feeder roller 12 may convey the separated sheet S from the feeder tray 10 toward the image forming device 5. The separator roller 13 and the separator pad 13*a* may together separate the sheets S on the feeder tray 10 from one another.

The sheet S fed to the conveyer path P may be conveyed by the conveyer roller pair 14 and the registration roller pair 15 toward the image forming device 5. The sheet S reaching the registration roller pair 15 may hit the registration roller pair 15, and the registration roller pair 15 hit by a frontward edge of the sheet S may restrict the sheet S from moving in the conveyer path P temporarily and, after a pause, convey the sheet S to the image forming device 5 at predetermined timing.

The image forming device 5 is located above the feeder tray 10 and includes four process cartridges 50K, 50C, 50M, 50Y, which are arranged along the front-rear direction. In other words, the process cartridges 50K, 50C, 50M, 50Y may align in a direction intersecting orthogonally with the widthwise direction, which is parallel to the rotation shaft 231 of the hinge 23. The process cartridges 50K, 50C, 50M, 50Y are arranged, in a direction from rear to front, in an order: the process cartridge 50K, the process cartridge 50C, the process cartridge 50M, and the process cartridge 50Y.

The process cartridges 50K, 50C, 50M, 50Y are detachably attached to the housing body 21. The process cartridges 50K, 50C, 50M, 50Y has photosensitive drums 51K, 51C, 51M, 51Y, respectively.

Each of the process cartridges 50K, 50C, 50M, 50Y has a developing roller 52 and a supplying roller 53. Each of the process cartridges 50K, 50C, 50M, 50Y contains a toner to form images, and the supplying roller 53 may supply the toner to the developing roller 52.

In the housing body 21, an LED unit 59K to expose a surface of the photosensitive drum 51K, an LED unit 59C to expose a surface of the photosensitive drum 51C, an LED unit 59M to expose a surface of the photosensitive drum 51M, and an LED unit 59Y to expose a surface of the photosensitive drum 51Y are accommodated.

The LED units 59K, 59C, 59M, 59Y are supported by the openable/closable cover 22 in an arrangement aligning in the front-rear direction. The LED units 59K, 59C, 59M, 59Y are arranged, in a direction from rear to front, in an order: the LED unit 59K, the LED unit 59C, the LED unit 59M, and the LED unit 59Y.

The LED unit 59K is located at a position closest to the hinge 23 in the front-rear direction among the LED units 59K, 59C, 59M, 59Y. The LED unit 59C is located at a position farther from the hinge 23 than the LED unit 59K in the front-rear direction. The LED unit 59M is located at a position farther from the hinge 23 than the LED unit 59C in the front-rear direction. The LED unit 59Y is located at a position farther from the hinge 23 than the LED unit 59M in the front-rear direction. In other words, the LED unit 59Y is located at a position farthest from the hinge 23 in the front-rear direction among the e LED units 59K, 59C, 59M, 59Y.

The LED unit 59K located closest to the hinge 23 in the front-rear direction and the LED unit 59C located second closest to the hinge 23 in the front-rear direction overlap the slanted section 222*b* of the ejection tray 222 in a view along the vertical direction. The LED unit 59Y located farthest from the hinge 23 in the front-rear direction and the LED unit 59M located second farthest from the hinge 23 in the front-rear direction overlap the horizontal section 222*a* of the ejection tray 222 in the view along the vertical direction.

The LED units 59K, 59C, 59M, 59Y extend downward from the openable/closable cover 22 and have LED heads 591K, 591C, 591M, 591Y, respectively, at lower ends thereof. The LED units 59K, 59C, 59M, 59Y are, when the openable/closable cover 22 is closed, located above and in proximity to the photosensitive drums 51K, 51C, 51M, 51Y, respectively. Each of the LED units 59K, 59C, 59M, 59Y extends along the widthwise direction and has an LED array, in which a plurality of LED elements align in the widthwise direction.

At a position below the photosensitive drums 51K, 51C, 51M, 51Y across the conveyer path P, a transfer belt 41 is arranged to face the photosensitive drums 51K, 51C, 51M, 51Y. The transfer belt 41 are strained around a driving roller 42 and a driven roller 43 located frontward with respect to the driving roller 42. The transfer belt 41, the driving roller 42, and the driven roller 43 form a belt assembly 40. At positions to face the photosensitive drums 51K, 51C, 51M, 51Y across the transfer belt 41, transfer rollers 44 are arranged.

In the image forming device 5, chargers (not shown) to charge the surfaces of the photosensitive drums 51K, 51C, 51M, 51Y are arranged. The photosensitive drums 51K, 51C, 51M, 51Y charged evenly by the chargers may be selectively exposed to beams emitted from the LED units 59K, 59C, 59M, 59Y. The beams may remove the charges on the surfaces of the photosensitive drums 51K, 51C, 51M, 51Y in the selectively exposed areas; thereby, electrostatic latent images may be formed on the surfaces of the photosensitive drums 51K, 51C, 51M, 51Y.

The toner stored in each of the process cartridges 50K, 50C, 50Y, 50M may be charged positively by friction between the supplying roller 53 and the developing roller 52 and carried on a surface of the developing roller 52. To the developing rollers 52, developing bias is applied, and when the electrostatic latent images formed on the photosensitive drums 51K, 51C, 51M, 51Y come to face the developing rollers 52, due to the difference in potentials between the electrostatic latent images and the developing rollers 52, the toners may be supplied from the developing rollers 52 to the electrostatic latent images. Thereby, toner images may be formed on the surfaces of the photosensitive drums 51K, 51C, 51M, 51Y.

As the sheet S conveyed by the sheet conveyer 11 toward the image forming device 5 reaches the transfer belt 41, the sheet S may ride on the transfer belt 41 and may be conveyed through positions between the transfer belt 41 and the photosensitive drums 51K, 51C, 51M, 51Y. When the sheet S faces the photosensitive drums 51K, 51C, 51M, 51Y one after another, the toner images on the surfaces of the photosensitive drums 51K, 51C, 51M, 51Y may be transferred to the sheet S through the transfer bias applied to the transfer rollers 44.

It may be noted that the transfer belt 41, which may convey the sheet S, and on which the toner images may be transferred to the sheet S being conveyed, may optionally be replaced with an intermediate transfer belt, to which the toner images may be transferred, and the toner images may be further transferred therefrom to the sheet S.

The sheet S with the toner images transferred thereon may be conveyed to the fuser 6. The fuser includes a heat roller 61 and a pressure roller 62, which is urged against the heat roller 61. The toner images on the sheet S conveyed to the fuser 6 may be thermally fixed do the sheet S as the sheet S passes through a position between the heat roller 61 and the pressure roller 62.

The sheet S with the thermally fixed toner images may be conveyed from the fuser 6 downstream in a conveying direction and further conveyed by an intermediate ejection roller pair 64 and by an ejection roller pair 65, which is located downstream in the conveying direction from the intermediate ejection roller pair 64, to be ejected at the ejection tray 222.

The second housing 3 is located above the first housing 2. The second housing 3 includes an original placement base 39, an original presser 32, and an operation interface 33. The original placement base 39 is located above the openable/ closable cover 22 and is supported by the supporting columns 223 of the openable/closable cover 22. The original placement base 39 accommodates an image reading sensor 392, which may read an image of an original material placed on an upper surface 391 of the original placement base 39.

The original presser 32 is located above the original placement base 39. The original presser 32 is pivotable on a pivot axis 321, which is located at a rear end area in the original presser 32. The original presser 32 is movable between a pressing position, at which the original presser 32 covers the upper surface 391 of the original placement base 39, and an open position, at which the upper surface 391 of the original placement base 39 is exposed.

The original presser 32 may, when located at the pressing position, press an original material placed on the upper surface 391 of the original placement base 39. The original presser 32 includes an auto document feeder (ADF) 322, which may feed the original material to the upper surface 391 of the original placement base 39 automatically. The original placement base 39 and the original presser 32 may together operate as an image reader.

The operation interface 33 is coupled with the original placement base 39 of the second housing 3 and is supported by the openable/closable cover 22. The operation interface 33 protrudes frontward from the original placement base 39. The operation interface 33 may be an approximately rectangular panel, and a dimension of an upper surface 331 of the operation interface 33 in the widthwise direction is smaller than a widthwise dimension of the second housing 3. The operation interface 33 may be located leftward with respect to a widthwise center of the second housing 3.

The operation interface 33 includes a display device, such as a liquid crystal panel, and an operation device, such as a touch panel and/or operation buttons to operate the image forming device 5 and the image reader. The upper surface 331 of the operation interface 33 inclines lower-frontward. Therefore, operability of the operation interface 33 from the front side of the image forming apparatus 1 by a user may be improved.

[Protrusions in LED Units]

Figure 4:
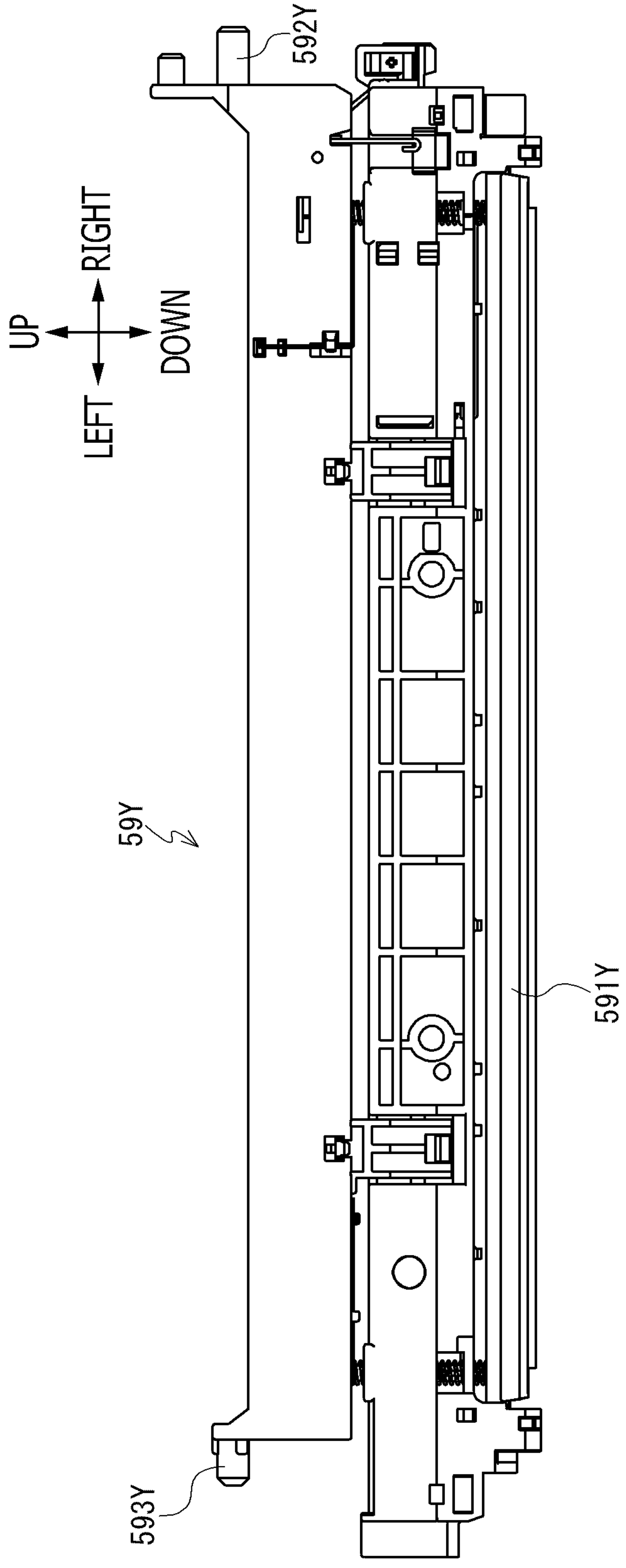
FIG. 4 is a front view of an LED unit.
Figure 5:
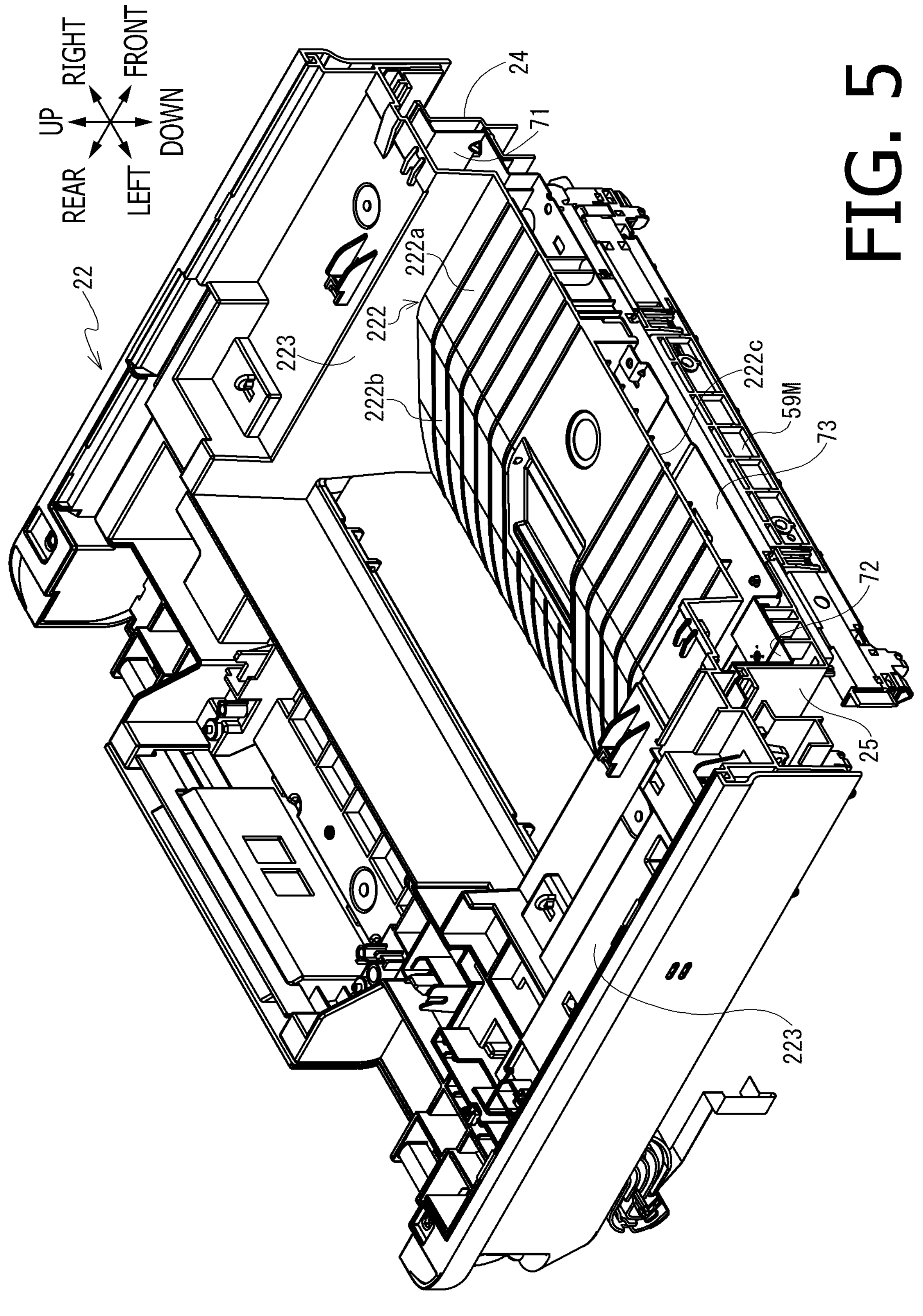
FIG. 5 is a perspective cross-sectional view of the openable/closable cover.
Figure 6:
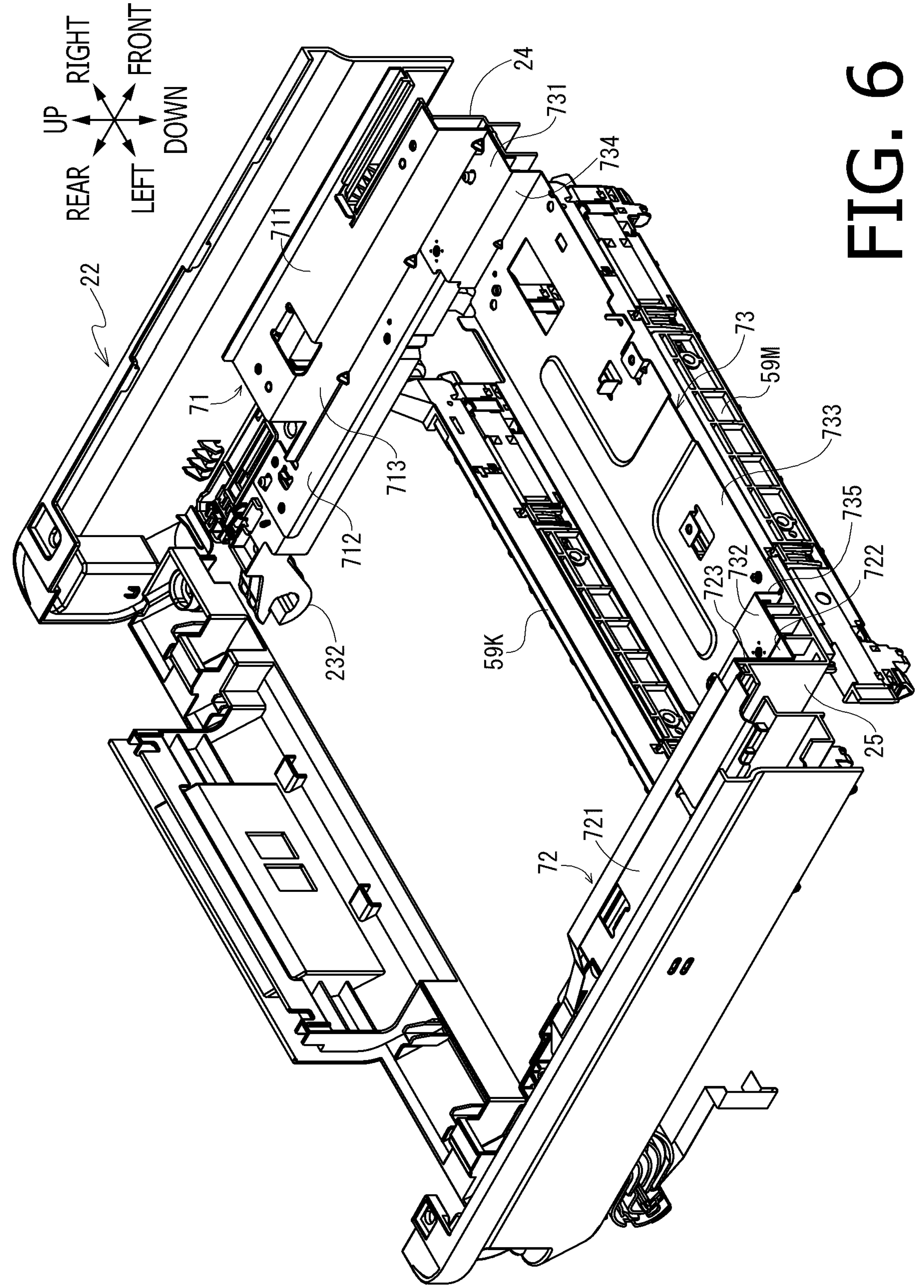
FIG. 6 is a perspective cross-sectional view of the openable/closable cover including a first LED-unit holder and a second LED-unit holder to retain LED units, a first enhancing member, a second enhancing member, and a link member.

As shown in FIG. 4, the LED unit 59Y has a protrusion 592Y and a protrusion 593Y on one end and the other end, respectively, in the widthwise direction. The protrusion 592Y protrudes rightward from a rightward end of the LED unit 59Y, and the protrusion 593Y protrudes leftward from a leftward end of the LED unit 59Y.

Similarly, the LED unit 59M has a protrusion 592M protruding rightward from a rightward end of the LED unit 59M and a protrusion 593M protruding leftward from a leftward end of the LED unit 59M. The LED unit 59C has a protrusion 592C protruding rightward from a rightward end of the LED unit 59C and a protrusion 593C protruding leftward from a leftward end of the LED unit 59C. The LED unit 59K has a protrusion 592K protruding rightward from a rightward end of the LED unit 59K and a protrusion 593K protruding leftward from a leftward end of the LED unit 59K.

[Structure to Support LED Units with Openable/Closable Cover]

As shown in FIGS. 5-8, the image forming apparatus 1 has a first LED-unit holder 24 to support rightward ends of the LED units 59K, 59C, 59M, 59Y and a second LED-unit holder 25 to support leftward ends of the LED units 59K, 59C, 59M, 59Y.

The LED units 59K, 59C, 59M, 59Y are retained by the first LED-unit holder 24 and the second LED-unit holder 25, and the first LED-unit holder 24 and the second LED-unit holder 25 are attached to the openable/closable cover 22. In other words, the LED units 59K, 59C, 59M, 59Y are supported by the openable/closable cover 22 through the first LED-unit holder 24 and the second LED-unit holder 25.

The first LED-unit holder 24 longitudinally extends in the front-rear direction on a rightward side of the first housing 2 and is located at a position below the supporting column 223 of the openable/closable cover 22 on the right. The second LED-unit holder 25 longitudinally extends in the front-rear direction on a leftward side of the first housing 2 and is located at a position below the supporting column 223 of the openable/closable cover 22 on the left. To a rearward end of the first LED-unit holder 24, the supporting arm 232 of the hinge 23 on the right is fixed, and to a rearward end of the second LED-unit holder 25, the supporting arm 232 of the hinge 23 on the left is fixed.

The image forming apparatus 1 includes a first enhancing member 71, a second enhancing member 72, and a link member 73. The first enhancing member 71 longitudinally extends in the front-rear direction on the rightward side of the first housing 2. The second enhancing member 72 longitudinally extends in the front-rear direction on the leftward side of the first housing 2. The link member 73 is located between the first enhancing member 71 and the second enhancing member 72 to link the first enhancing member 71 and the second enhancing member 72. The first enhancing member 71, the second enhancing member 72, and the link member 73 may be formed of metal plates. Optionally, the first enhancing member 71, the second enhancing member 72, and the link member 73 may be formed of metal pipes or metal bars.

The first enhancing member 71 is located at an upper position with respect to the first LED-unit holder 24, and the first LED-unit holder 24 is attached to the first enhancing member 71 from below. The second enhancing member 72 is located at an upper position with respect to the second LED-unit holder 25, and the second LED-unit holder 25 is attached to the second enhancing member 72 from below.

Each supporting column 223 of the openable/closable cover 22 has an inner surface 223*a*, which faces toward the opening 21A of the housing body 21. The inner surface 223*a* of the supporting column 223 of the openable/closable cover 22 on the right faces the first enhancing member 71 at an upper position with respect to the first enhancing member 71. The inner surface 223*a* of the supporting column 223 of the openable/closable cover 22 on the left faces the second enhancing member 72 at an upper position with respect to the second enhancing member 72.

The first LED-unit holder 24 is fixed to the supporting column 223 of the openable/closable cover 22 on the right. Meanwhile, the first enhancing member 71 is attached to the inner surface 223*a* of the supporting column 223 on the right in an arrangement in which the first enhancing member 71 is interposed in the vertical direction between the supporting column 223 on the right and the first LED-unit holder 24.

The second LED-unit holder 25 is fixed to the supporting column 223 of the openable/closable cover 22 on the left. Meanwhile, the second enhancing member 72 is attached to the inner surface 223*a* of the supporting column on the left in an arrangement in which the second enhancing member 72 is interposed in the vertical direction between the supporting column 223 on the left and the second LED-unit holder 25.

The link member 73 links the first enhancing member 71 and the second enhancing member 72 at a position farther in the front-rear direction from the hinge 23 than the LED unit 59K, which is closest to the hinge 23, and the LED unit 59C, which is second closest to the hinge 23. The link member 73 overlaps the LED units 59M, 59Y, which are in the front-rear direction farther from the hinge 23 than the LED units 59K, 59C, in a view along the vertical direction. Meanwhile, the link member 73 does not overlap the LED units 59K, 59C in the view along the vertical direction.

With the first enhancing member 71 and the second enhancing member 72, linked by the link member 73, are attached to the openable/closable cover 22 together with the first LED-unit holder 24 and the second LED-unit holder 25, rigidity of the openable/closable cover 22 to support the LED units 59K, 59C, 59M, 59Y is increased.

In this arrangement, the link member 73 links the first enhancing member 71 and the second enhancing member 72 at the position farther from the hinge 23 than the LED units 59K, 59C; therefore, the rigidity of the openable/closable cover 22 may be effectively increased, and the manufacturer may select materials and thicknesses for the first enhancing member 71, the second enhancing member 72, and the link member 73 according to the required strengths more preferably.

Therefore, the first enhancing member 71, the second enhancing member 72, and the link member 73 may be composed of downsized parts to improve dimensional accuracy, while the rigidity of the openable/closable cover 22 may be secured, and the LED units 59K, 59C, 59M, 59Y may be retained stably. Moreover, by forming the first enhancing member 71, the second enhancing member 72, and the link member 73 with downsized parts, manufacturing costs for the parts may be reduced, and storage spaces required for the parts in assembly lines to assemble the openable/closable cover 22 may be reduced.

Moreover, the first enhancing member 71 is attached to the openable/closable cover 22 in the interposed position between the openable/closable cover 22 and the first LED-unit holder 24, and the second enhancing member 72 is attached to the openable/closable cover 22 in the interposed position between the openable/closable cover 22 and the second LED-unit holder 25. Therefore, rigidity of the first enhancing member 71 and the second enhancing member 72 may be improved, and accordingly, the rigidity of the openable/closable cover 22 may be improved more effectively.

Figure 9A:
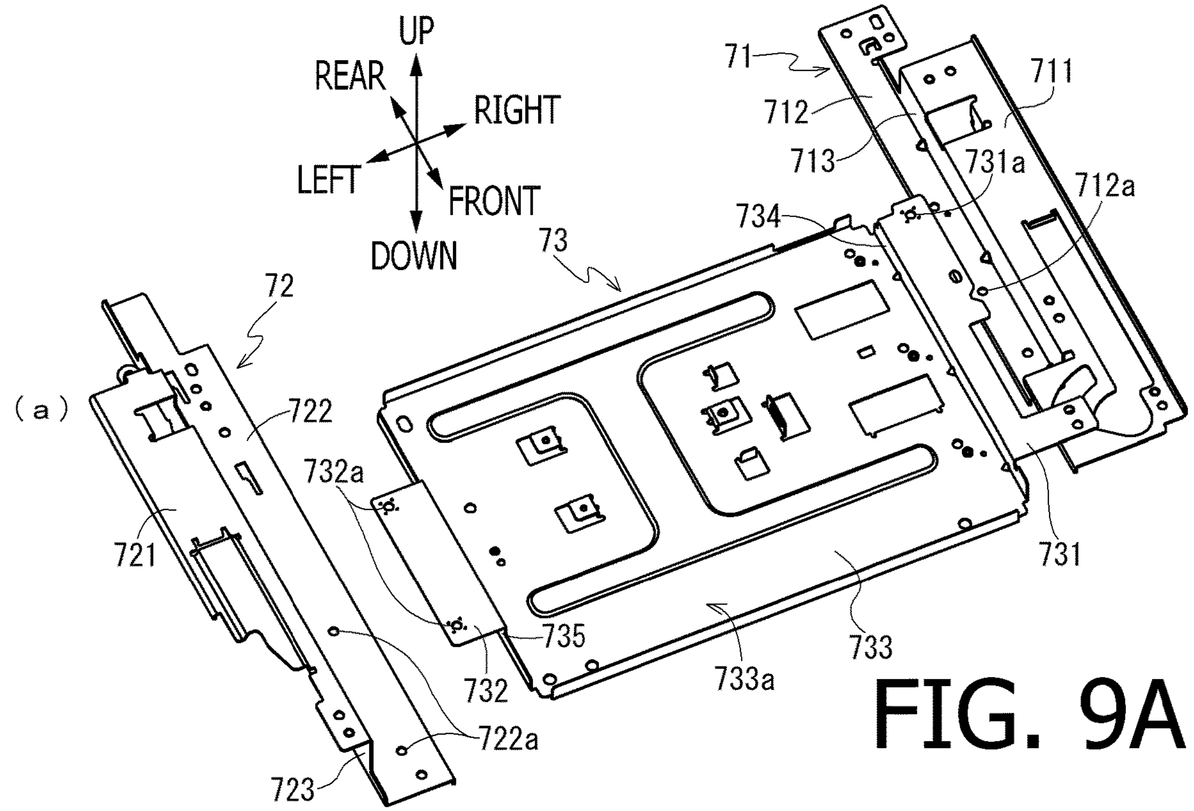
FIGS. 9A-9B are perspective views of the first enhancing member, the second enhancing member, and the link member.
Figure 9B:
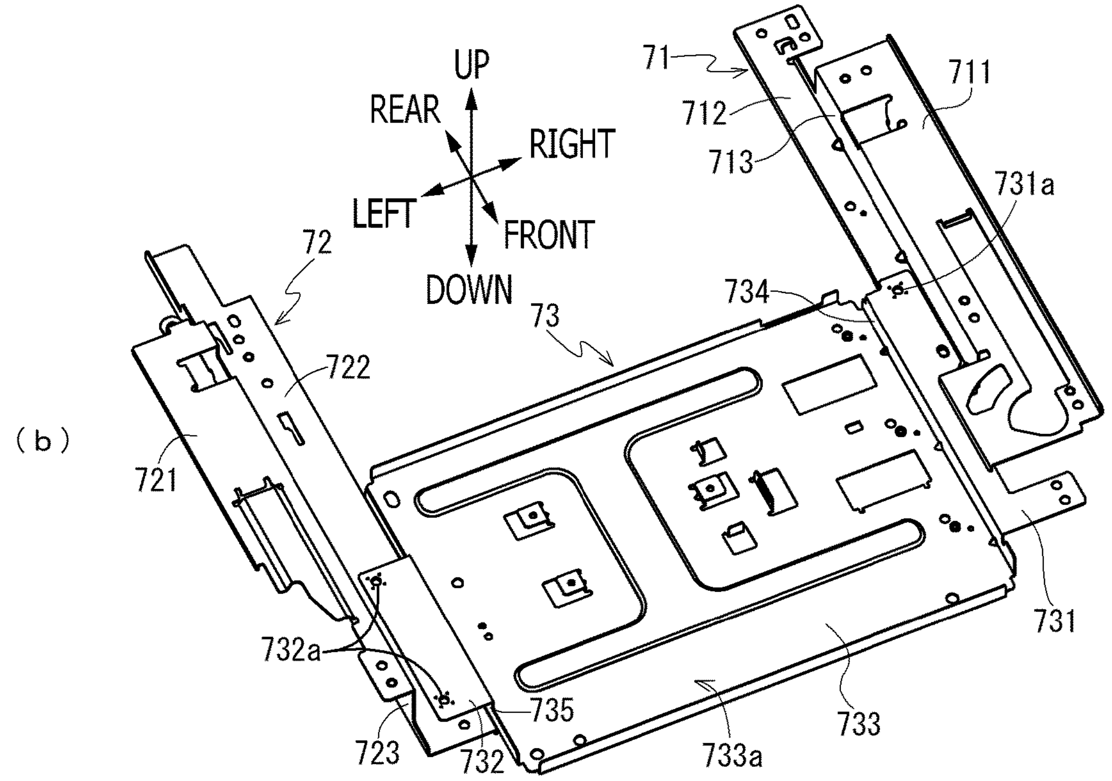
Figure 10:
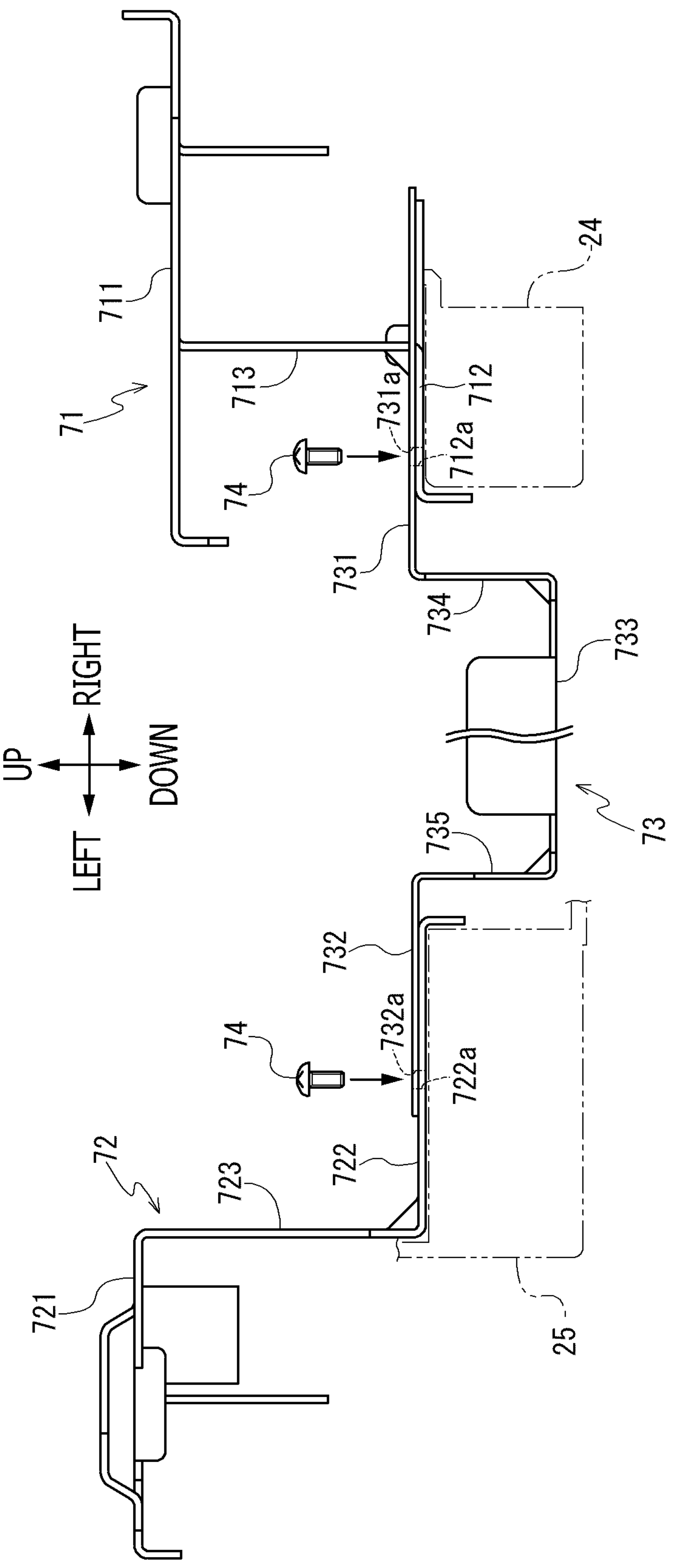
FIG. 10 is a frontward cross-sectional view of the first enhancing member and the link member fastened to a first LED-unit holder and the second enhancing member and the link member fastened to a second LED-unit holder.

As shown in FIGS. 9A-9B and 10, the first enhancing member 71 is formed by bending a plate member in the widthwise direction and includes a fixing portion 711, a linking portion 712, and a connecting portion 713. The fixing portion 711 and the linking portion 712 extend in the front-rear direction, and planar surfaces thereof face upward and downward. The linking portion 712 is located to be lower than the fixing portion 711. The connecting portion 713 connects the fixing portion 711 and the linking portion 712, and planar surfaces thereof face rightward and leftward.

The fixing portion 711 is fixed to the first LED-unit holder 24, and the linking portion 712 is linked with the link member 73 and is fixed to the first LED-unit holder 24. In the first enhancing member 71, at a position between the fixing portion 711 and the connecting portion 713 and at a position between the linking portion 712 and the connecting portion 713, bends, in which the plate member is bent along the front-rear direction, are formed. With the bends at the position between the fixing portion 711 and the connecting portion 713 and at the position between the linking portion 712 and the connecting portion 713, rigidity of the first enhancing member 71 may improve.

The second enhancing member 72 is formed by bending a plate member in the widthwise direction and includes a fixing portion 721, a linking portion 722, and a connecting portion 723. The fixing portion 721 and the linking portion 722 extend in the front-rear direction, and planar surfaces thereof face upward and downward. The linking portion 722 is located to be lower than the fixing portion 721. The connecting portion 723 connects the fixing portion 721 and the linking portion 722, and planar surfaces thereof faces rightward and leftward.

The fixing portion 721 is fixed to the second LED-unit holder 25, and the linking portion 722 is linked with the link member 73 and is fixed to the second LED-unit holder 25. In the second enhancing member 72, at a position between the fixing portion 721 and the connecting portion 723 and at a position between the linking portion 722 and the connecting portion 723, bends, in which the plate member is bent along the front-rear direction, are formed. With the bends at the position between the fixing portion 721 and the connecting portion 723 and at the position between the linking portion 722 and the connecting portion 723, rigidity of the second enhancing member 72 may be improved.

The link member 73 is formed by bending a plate member in the widthwise direction at a rightward end portion and a leftward end portion thereof and includes a first linking portion 731, a second linking portion 732, a stepped portion 733, a first connecting portion 734, and a second connecting portion 735. Planar surfaces of the first linking portion 731, the second linking portion 732, and the stepped portion 733 face upward and downward. The stepped portion 733 is located to be lower than the first linking portion 731 and the second linking portion 732.

The first linking portion 731 is connected to a rightward end of the stepped portion 733 through the first connecting portion 734, and the second linking portion 732 is connected to a leftward end of the stepped portion 733 through the second connecting portion 735. Planar surfaces of the first connecting portion 734 and the second connecting portion 735 face rightward and leftward.

In the link member 73, at a position between the first linking portion 731 and the first connecting portion 734, at a position between the first connecting portion 734 and the stepped portion 733, at a position between the second linking portion 732 and the second connecting portion 735, and at a position between the second connecting portion 735 and the stepped portion 733, bends, in which the plate member is bent along the front-rear direction, are formed. With the stepped portion 733 provided in the link member 73, bends are arranged at the positions between the first linking portion 731 and the stepped portion 733 and at the position between the second linking portion 732 and the stepped portion 733; therefore, rigidity of the link member 73 may be improved.

The first linking portion 731 is linked with the linking portion 712 of the first enhancing member 71. The linking portion 712 of the first enhancing member 71 has a linking hole 712*a*, and the first linking portion 731 of the link member 73 has a linking hole 731*a*.

For linking the first enhancing member 71 and the link member 73, the linking portion 712 of the first enhancing member 71 is placed to vertically overlap the first linking portion 731 of the link member 73 in layers (see FIG. 9B), and positions of the linking portion 712 and the first linking portion 731 are adjusted with a tool. Thereafter, a screw 74 is inserted through the linking hole 712*a* in the linking portion 712 and the linking hole 731*a* in the linking portion 731, and the screw 74 is fastened to the first LED-unit holder 24 (see FIG. 10). With the first enhancing member 71 and the link member 73 linked together, the first enhancing member 71 and the link member 73 are jointly fastened to the first LED-unit holder 24 with the screw 74.

The second linking portion 732 is linked with the linking portion 722 of the second enhancing member 72. The linking portion 722 of the second enhancing member 72 has linking holes 722*a*, and the second linking portion 732 of the link member 73 has linking holes 732*a*.

For linking the second enhancing member 72 and the link member 73, the linking portion 722 of the second enhancing member 72 is placed to vertically overlap the second linking portion 732 of the link member 73 in layers (see FIG. 9B), and positions of the linking portion 722 and the second linking portion 732 are adjusted with a tool. Thereafter, screws 74 are inserted through the linking holes 722*a* in the linking portion 722 and the linking holes 732*a* in the linking portion 732, and the screws 74 may be fastened to the second LED-unit holder 25 (see FIG. 10). With the second enhancing member 72 and the link member 73 linked together, the second enhancing member 72 and the link member 73 are jointly fastened to the second LED-unit holder 25 with the screw 74.

Thus, with the first enhancing member 71 and the link member 73 jointly fastened with the screw 74 to the first LED-unit holder 24 and the second enhancing member 72 and the link member 73 jointly fastened with the screws 74 to the second LED-unit holder 25, the first enhancing member 71, the second enhancing member 72, and the link member 73 are linked, and the first enhancing member 71, the second enhancing member 72, and the link member 73 are fixed to the first LED-unit holder 24 and the second LED-unit holder 25.

Therefore, when the first enhancing member 71, the second enhancing member 72, and the link member 73 are attached to the first LED-unit holder 24 and the second LED-unit holder 25, positional accuracy of the first enhancing member 71 and the link member 73 with respect to the first LED-unit holder 24 and positional accuracy of the second enhancing member 72 and the link member 73 with respect to the second LED-unit holder 25 may be improved.

Figure 7:
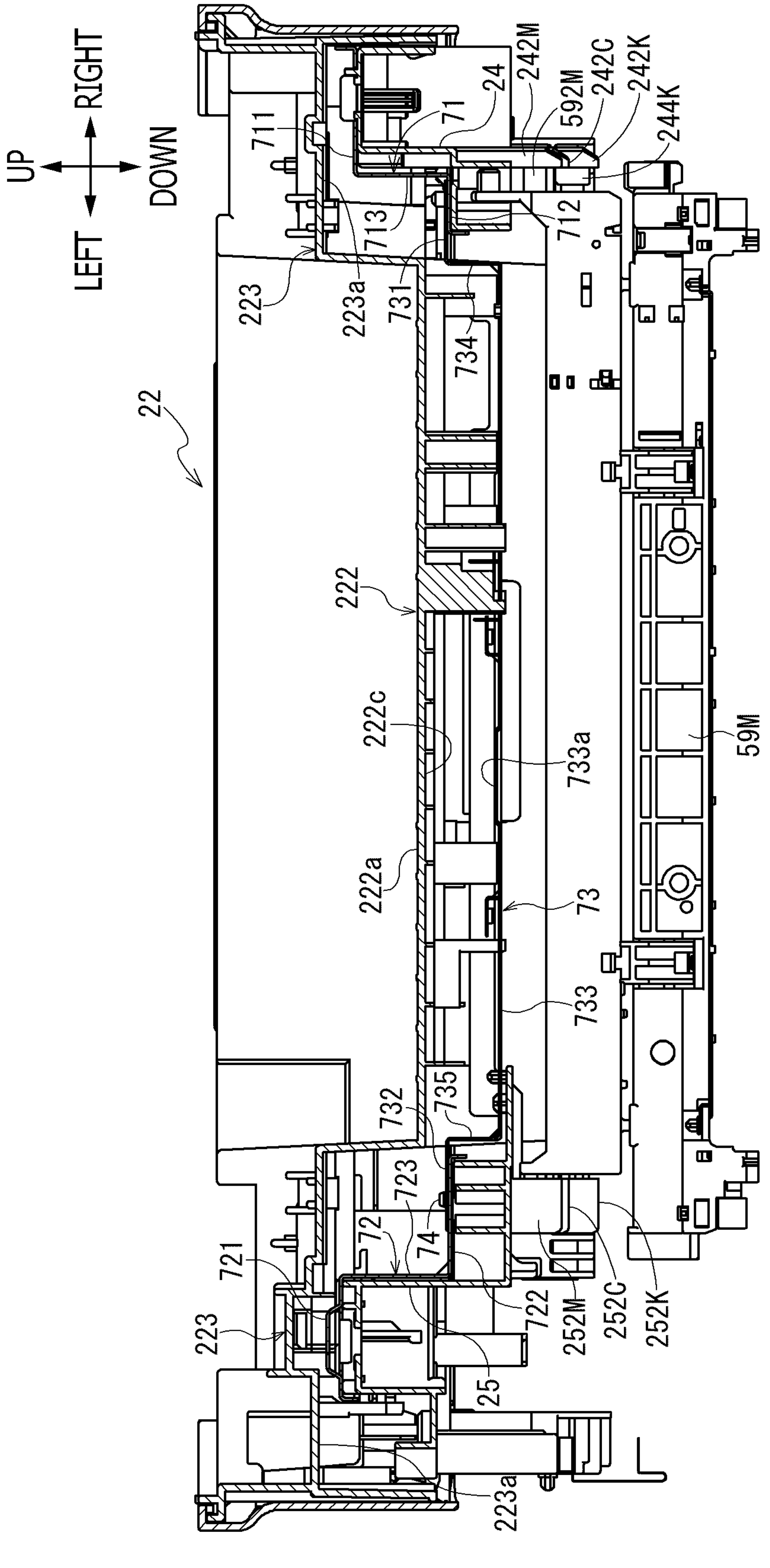
FIG. 7 is a frontward cross-sectional view of the first LED-unit holder and the second LED-unit holder to retain the LED units, the first enhancing member, the second enhancing member, and the link member attached to the openable/closable cover.

As shown in FIG. 7, the ejection tray 222 in the openable/closable cover 22 has an inner surface 222*c*, which faces toward the opening 21A of the housing body 21. The link member 73 is, when the first enhancing member 71 and the second enhancing member 72 are attached to the openable/closable cover 22, located between the horizontal section 222*a* of the ejection tray 222 of the openable/closable cover 22 and the LED units 59K, 59C, 59M, 59Y.

Meanwhile, the stepped portion 733 of the link member 73 is located farther from the inner surface 222*c* of the ejection tray 222 than the first enhancing member 71 and the second enhancing member 72 in the vertical direction, and a gap is formed between the first and second enhancing members 71, 72 and the stepped portion 733 in the vertical direction. The stepped portion 733 has an upper surface 733*a*, which faces the inner surface 222*c* of the ejection tray 222.

Figure 8:
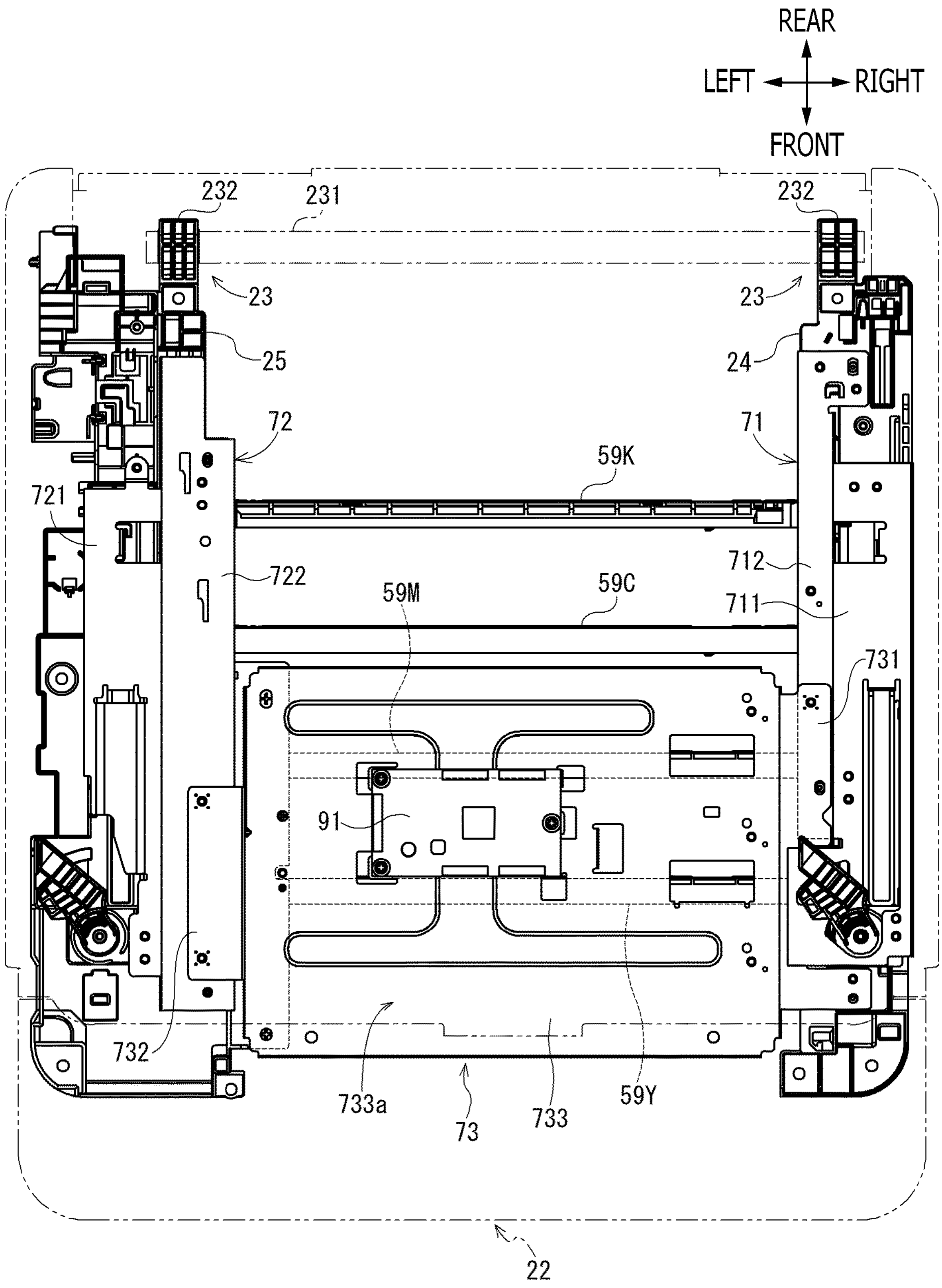
FIG. 8 is a plan view of the link member with a controller board attached thereto, and the first enhancing member and the second enhancing member linked with each other through the link member.

As shown in FIG. 8, the image forming apparatus 1 has a controller board 91, which may control operations in the LED unit 59K, 59C, 59M, 59Y. The controller board 91 is attached to the upper surface 733*a* of the stepped portion 733 in the link member 73.

By locating the controller board 91 on the upper surface 733*a* of the stepped portion 733, the controller board 91 may be efficiently arranged in the gap between the first and the second enhancing members 71, 72 and the stepped portion 733, and the image forming apparatus 1 may be downsized. Moreover, while the controller board 91 is arranged to vertically overlap the link member 73, a widthwise dimension of the image forming apparatus 1 may be reduced, and the image forming apparatus 1 may be downsized.

Moreover, the link member 73 linking the first enhancing member 71 and the second enhancing member 72 is located between at least the LED unit 59Y, which is located farthest from the hinge 23 in the front-rear direction among the LED units 59K, 59C, 59M, 59Y, and the openable/closable cover 22. In this arrangement, the first enhancing member 71 and the second enhancing member 72 are linked through the link member 73 at least at the position of the LED unit 59Y, which is farthest from the hinge 23 among the LED units 59K, 59C, 59M, 59Y in the front-rear direction. Therefore, the part of the first enhancing member 71 and the part of the second enhancing member 72 farther from the hinge 23 may be restrained from being twisted or deformed when the openable/closable cover 22 is opened or closed.

Figure 11A:
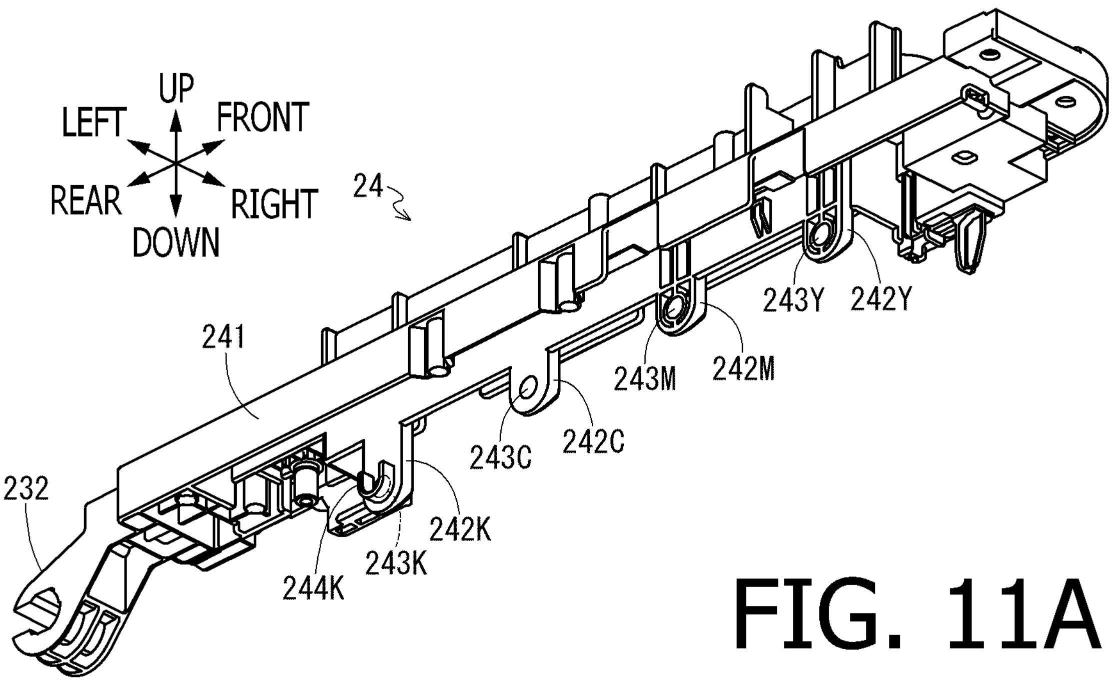
FIG. 11A is a perspective view of the first LED-unit holder.
Figure 11B:
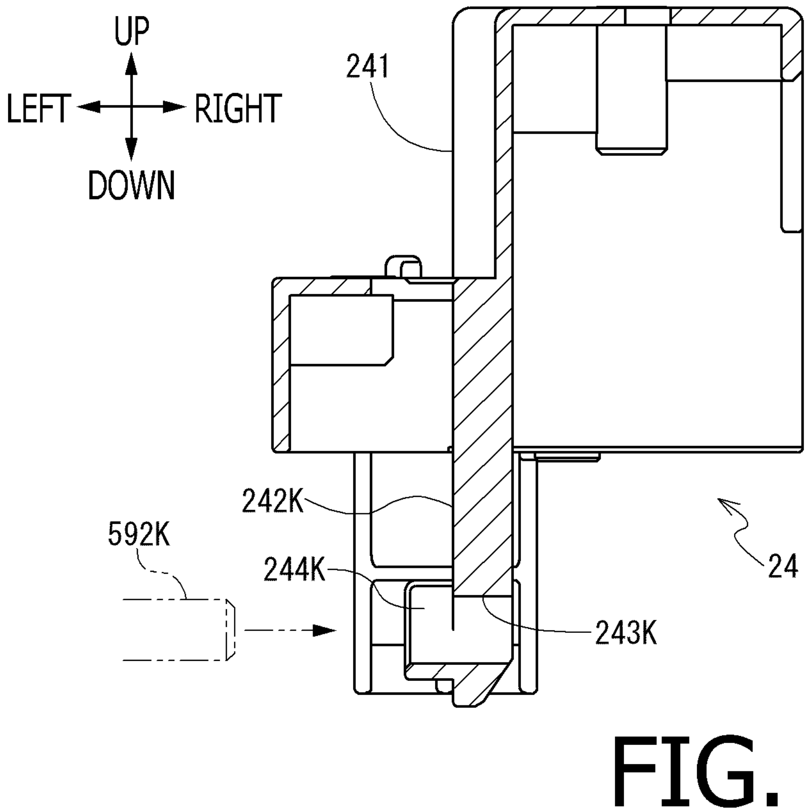
FIG. 11B is a frontward cross-sectional view of the first LED-unit holder.
Figure 12:
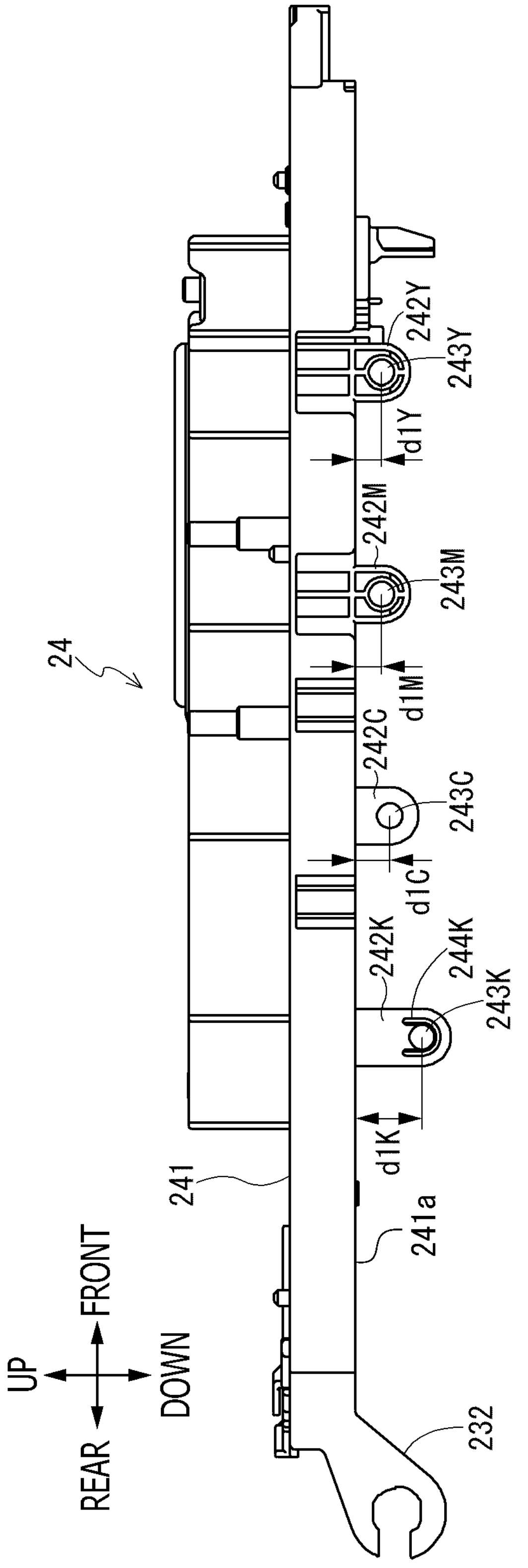
FIG. 12 is a side view of the first LED-unit holder.

As shown in FIGS. 11A-11B and 12, the first LED-unit holder 24 has a body 241, which extends in the front-rear direction, and stays 242K, 242C, 242M, 242Y extending downward from the body 241. The stays 242K, 242C, 242M, 242Y are arranged to align in the front-rear direction in an order from rear to front: the stay 242K, the stay 242C, the stay 242M, and the stay 242Y.

The stay 242K has a hole 243K, in which the protrusion 592K of the LED unit 59K may be inserted. The stay 242C has a hole 243C, in which the protrusion 592C of the LED unit 59C may be inserted. The stay 242M has a hole 243M, in which the protrusion 592M of the LED unit 59M may be inserted. The stay 242Y has a hole 243Y, in which the protrusion 592Y of the LED unit 59Y may be inserted.

Figure 13A:
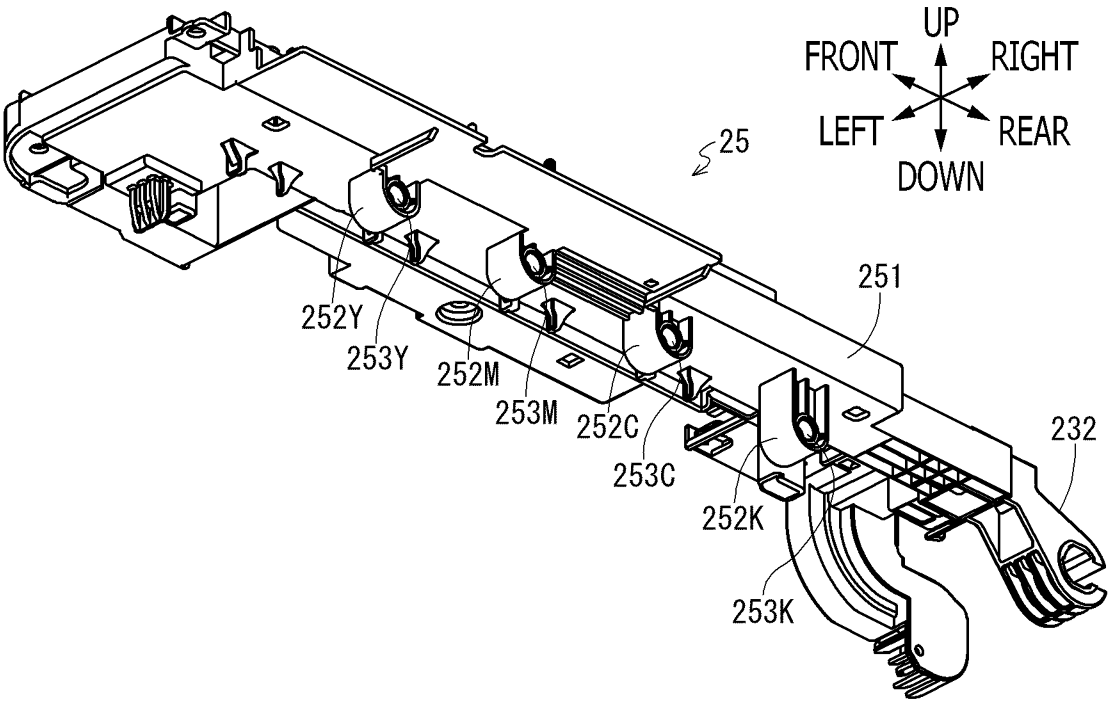
FIG. 13A is a perspective view of the second LED-unit holder.
Figure 13B:
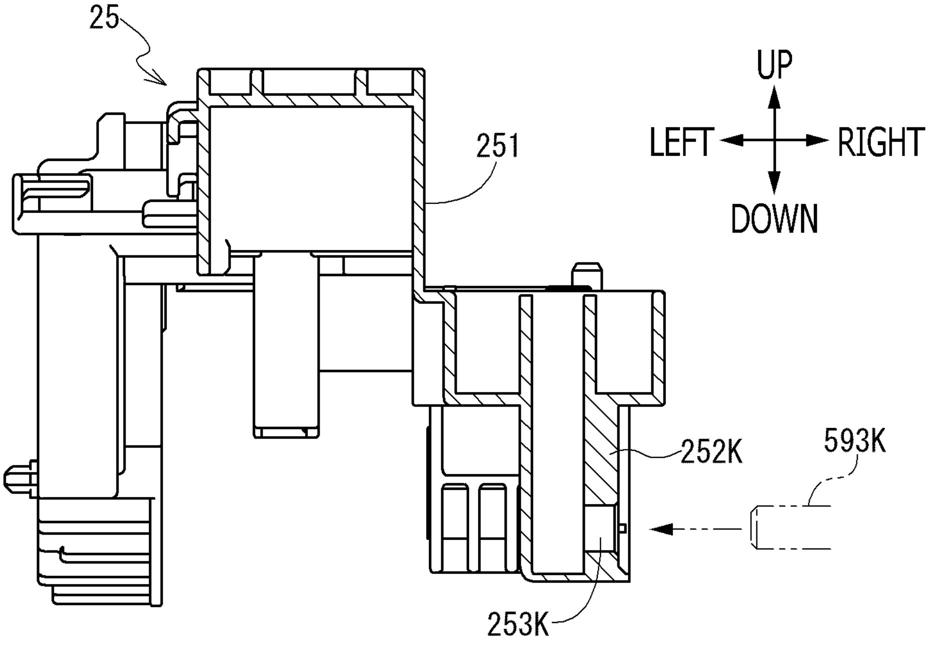
FIG. 13B is a frontward cross-sectional view of the second LED-unit holder.
Figure 14:
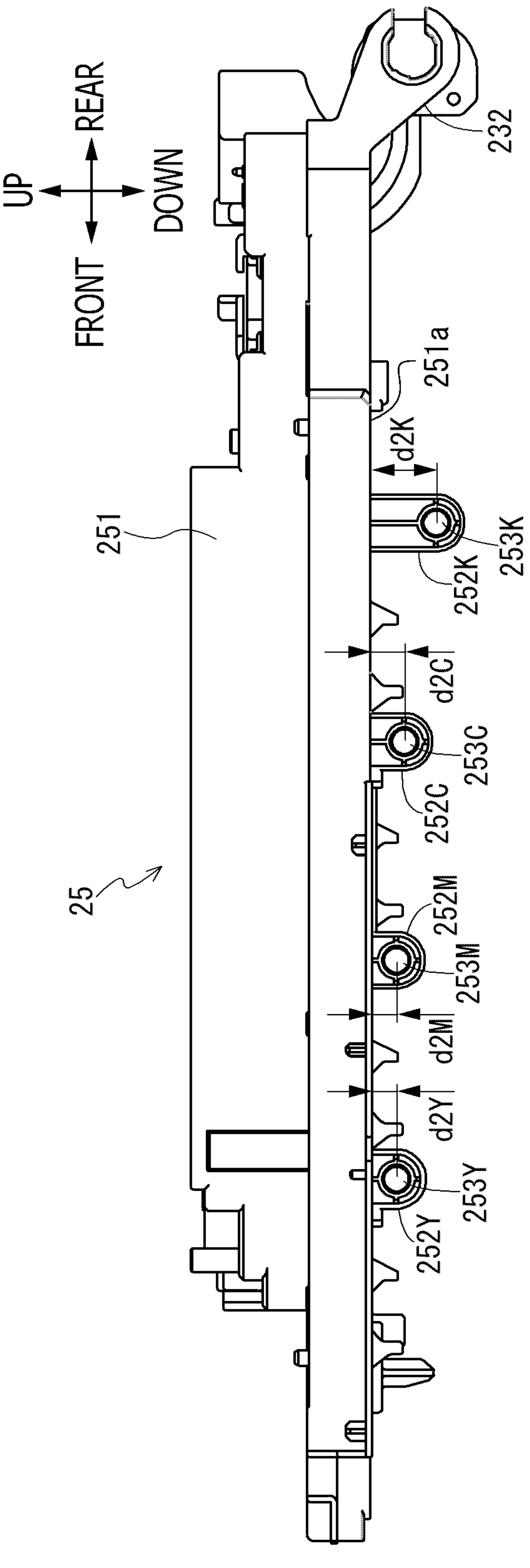
FIG. 14 is a side view of the second LED-unit holder.

As shown in FIGS. 13A-13B and 14, the second LED-unit holder 25 has a body 251, which extends in the front-rear direction, and stays 252K, 252C, 252M, 252Y extending downward from the body 251. The stay 252K, 252C, 252M, 252Y are arranged to align in the front-rear direction in an order from rear to front: the stay 252K, the stay 252C, the stay 252M, and the stay 252Y.

The stay 252K has a hole 253K, in which the protrusion 593K of the LED unit 59K may be inserted. The stay 252C has a hole 253C, in which the protrusion 593C of the LED unit 59C may be inserted. The stay 252M has a hole 253M, in which the protrusion 593M of the LED unit 59M may be inserted. The stay 252Y has a hole 253Y, in which the protrusion 593Y of the LED unit 59Y may be inserted.

With the protrusions 592K, 592C, 592M, 592Y of the LED units 59K, 59C, 59M, 59Y on the right being inserted in the holes 243K, 243C, 243M, 243Y in the first LED-unit holder 24, respectively, and with the protrusions 593K, 593C, 593M, 593Y of the LED units 59K, 59C, 59M, 59Y on the left being inserted in the holes 253K, 253C, 253M, 253Y in the second LED-unit holder 25, respectively, the first LED-unit holder 24 and the second LED-unit holder 25 are attached to the openable/closable cover 22; thereby the LED units 59K, 59C, 59M, 59Y are supported by the openable/closable cover 22.

As shown in FIGS. 11A-11B and 12, the stay 242K in the first LED holder 24 has an extended rib 244K, which extends from a peripheral edge of the hole 243K toward the LED unit 59K, i.e., leftward. The extended rib 244K has a shape of U, one end of which toward the openable/closable cover 22 in the vertical direction, i.e., an upper end thereof, is open. An inner radius of the extended rib 244K is substantially is equal to an inner radius of the hole 243K.

The extended rib 244K formed around the peripheral edge of the hole 243K in the stay 242K may support the protrusion 592K of the LED unit 59K. Therefore, in a case where the protrusion 592K of the LED unit 59K once inserted in the hole 243K slides out of the hole 243K, the extended rib 244K may catch and support the protrusion 592K.

Moreover, the first LED-unit holder 24 and the second LED-unit holder 25 are, before being attached to the openable/closable cover 22, attached to the first enhancing member 71 and the second enhancing member 72 that are linked through the link member 73, respectively. In other words, before the LED units 59K, 59C, 59M, 59Y are supported by the openable/closable cover 22, the first enhancing member 71, the second enhancing member 72, and the link member 73 retain the LED units 59K, 59C, 59M, 59Y through the first LED-unit holder 24 and the second LED-unit holder 25.

Although the first enhancing member 71, the second enhancing member 72, and the link member 73 may retain the LED units 59K, 59C, 59M, 59Y through the first LED-unit holder 24 and the second LED-unit holder 25, in the condition where the first enhancing member 71, the second enhancing member 72, and the link member 73 are not yet attached to the openable/closable cover 22, the first enhancing member 71, the second enhancing member 72, and the link member 73 may warp in the widthwise direction, and the hole 243K in the first enhancing member 71 may move in a direction to separate from the protrusion 592K of the LED unit 59K. In this regard, with the extended rib 244K, even when the first enhancing member 71, the second enhancing member 72, and the link member 73 warp in the widthwise direction, and the hole 243K in the first enhancing member 71 moves in the direction to separate from the protrusion 592K of the LED unit 59K, the extended rib 244K may catch the protrusion 592K, and the protrusion 592K may be retrained from falling off from the hole 243K.

In particular, the first enhancing member 71 and the second enhancing member 72 may tend to deform at the part farthest from the link member 73 in the front-rear direction. In this regard, the extended rib 244K is arranged around the peripheral edge of the hole 243K for the LED unit 59K, which is located farthest from the link member 73 among the LED units 59K, 59C, 59M, 59Y in the front-rear direction, and may restrain the protrusion 592K from falling off from the hole 243K effectively.

According to the present embodiment, the extended rib 244K is located around the peripheral edge of the hole 243K, which is located farthest from the link member 73 in the front-rear direction among the holes 243K, 243C, 243M, 243Y. Meanwhile, additionally, extended ribs in the form same as or similar to the extended rib 244K may be arranged around the peripheral edges of the holes 243C, 243M, 243Y that are closer to the link member 73 than the hole 243K. The extended ribs arranged around the peripheral edges of the holes 243C, 243M, 243Y, may restrain the protrusions 592M, 592C, 592Y from falling off from the holes 243M, 243C, 243Y reliably.

Moreover, the extended rib 244K may not necessarily be formed in the first LED-unit holder 24 but may be formed in the second LED-unit holder 25. The extended rib in the second LED-unit holder 25 may be arranged around any one or more of the peripheral edges of the holes 253K, 253M, 253C, 253Y. Furthermore, the extended ribs may be formed in both the first LED-unit holder 24 and the second LED-unit holder 25.

[Attaching First LED-Unit Holder and Second LED-Unit Holder to LED Units]

For attaching the first LED-unit holder 24 and the second LED-unit holder 25 to the LED units 59K, 59C, 59M, 59Y, first, the LED units 59K, 59C, 59M, 59Y are set to align in the front-rear direction in a standing posture with the LED heads 591K, 591C, 591M, 591Y facing downward with, for example, use of a tool.

Figure 15A:
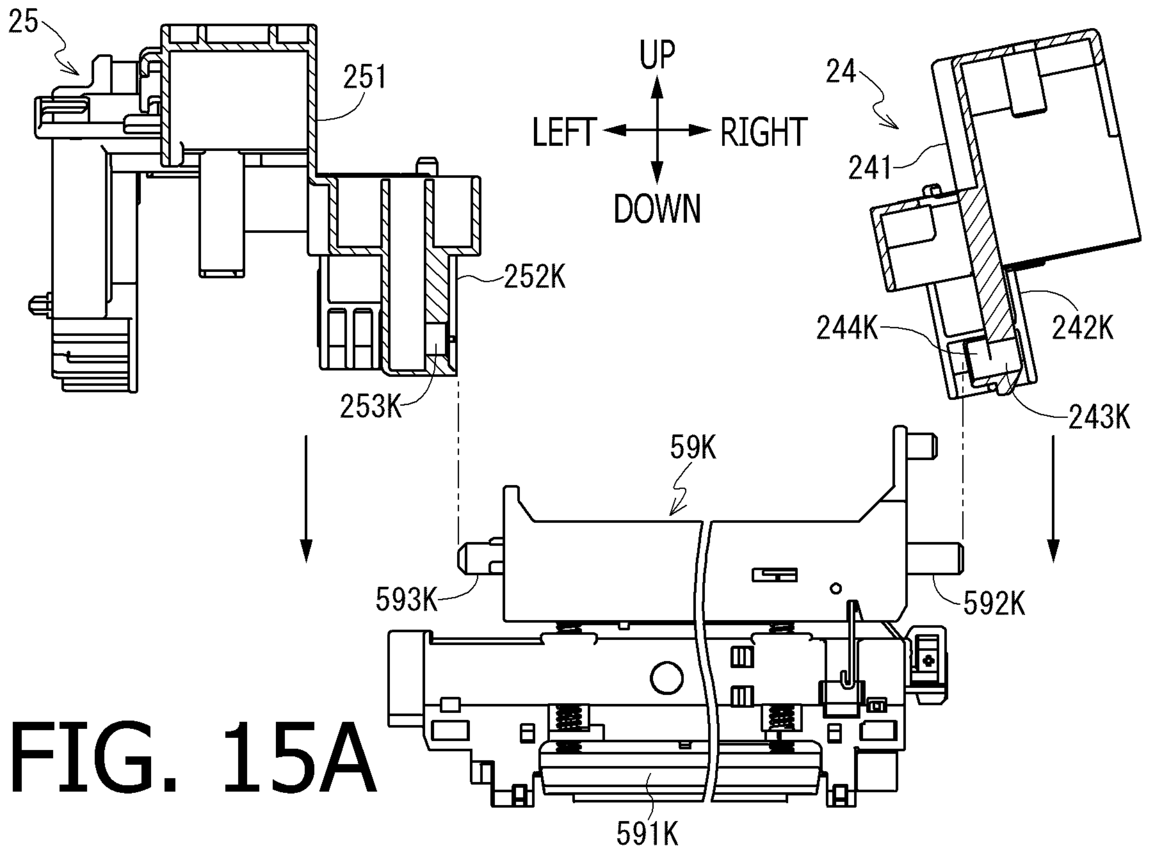
FIGS. 15A-15B illustrate works to attach the first LED-unit holder and the second LED-unit holder to the LED unit.

Next, as shown in FIG. 15A, the first LED-unit holder 24 and the second LED-unit holder 25 are located at upper positions with respect to the LED units 59K, 59C, 59M, 59Y. In particular, the second LED-unit holder 25 is placed in a posture such that axes of the holes 253K, 253C, 253M, 253Y align in the widthwise direction and the holes 253K, 253C, 253M, 253Y are located substantially leftward with respect to the protrusions 593K, 593C, 593M, 593Y of the LED units 59K, 59C, 59M, 59Y.

On the other hand, the first LED-unit holder 24 is set in a posture such that a lower end thereof is located outward with respect to an upper end thereof in the widthwise direction, and axes of the holes 243K, 243C, 243M, 243Y incline with respect to the widthwise direction, at a position substantially rightward with respect to the 592K, 592C, 592M, 592Y of the LED units 59K, 59C, 59M, 59Y.

Figure 15B:
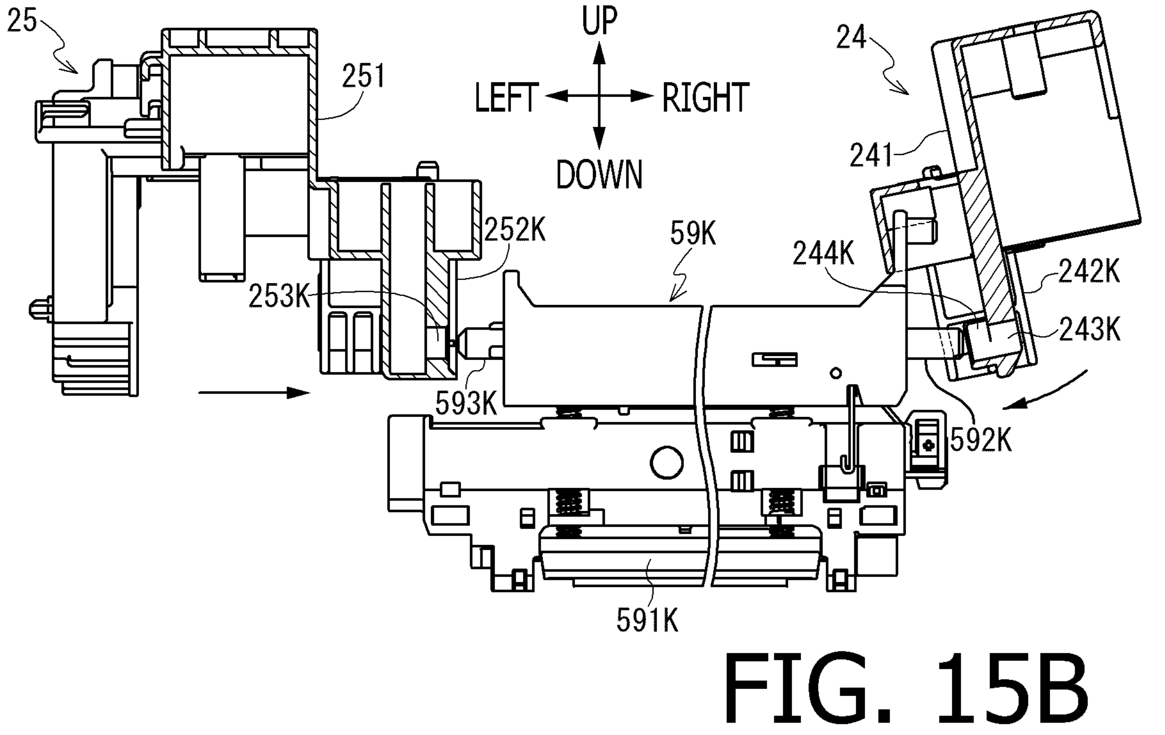

From the posture shown in FIG. 15A, the second LED-unit holder 25 is lowered to a position such that the holes 253K, 253C, 253M, 253Y are located at a same level as the protrusions 593K, 593C, 593M, 593Y, as shown in FIG. 15B. Further, the second LED-unit holder 25 is moved inward in the widthwise direction, i.e., rightward, to insert the protrusions 593K, 593C, 593M, 593Y in the holes 253K, 253C, 253M, 253Y.

On the other hand, the first LED-unit holder 24 is lowered to a position such that the holes 243K, 243C, 243M, 243Y are located at a same level as the protrusions 592K, 592C, 592M, 592Y, as shown in FIG. 15B. Further, the first LED-unit holder 24 is pivoted on the upper end thereof such that the lower end thereof moves inward in the widthwise direction, i.e., leftward, to insert the protrusions 592K, 592C, 592M, 592Y in the holes 243K, 243C, 243M, 243Y.

With the protrusions 592K, 592C, 592M, 592Y of the LED units 59K, 59C, 59M, 59Y being inserted in the holes 243K, 243C, 243M, 243Y in the first LED-unit holder 24, and the protrusions 593K, 593C, 593M, 593Y of the LED units 59K, 59C, 59M, 59Y being inserted in the holes 253K, 253C, 253M, 253Y in the second LED-unit holder 25, the LED units 59K, 59C, 59M, 59Y, the first LED-unit holder 24, and the second LED-unit holder 25 are mutually attached.

It may be noted that, while the first LED-unit holder 24 has the extended rib 244K extending from the peripheral edge of the hole 243K toward the LED unit 59K, when the first LED-unit holder 24 is being attached to the LED units 59K, 59C, 59M, 59Y, if the first LED-unit holder 24 is set at a position substantially rightward with respect to the protrusions 592K, 592C, 592M, 592Y in a posture such that the axes of the holes 243K, 243C, 243M, 243Y in the first LED-unit holder 24 align in the widthwise direction, the extended rib 244K may collide with the protrusion 592K as the first LED unit 24 is lowered.

In this regard, according to the present embodiment, the first LED-unit holder 24 is set at the position in the posture, in which the lower end thereof is located outward in the widthwise direction than the upper end thereof, and the first LED unit 24 is pivoted such that the lower end thereof moves inward. In this arrangement, the extended rib 244K may be restrained from colliding with the protrusion 592K when the protrusions 592K, 592C, 592M, 592Y are inserted in the holes 243K, 243C, 243M, 243Y.

Moreover, the extended rib 244K in the first LED-unit holder 24 has the shape of U, of which upper end is open. Therefore, when the first LED-unit holder 24 is pivoted to be attached to the LED units 59K, 59C, 59M, 59Y, the upper end of the extended rib 244K may not collide with the protrusion 592K. Accordingly, while the protrusion 592K is restrained from falling off from the hole 243K, operability to attach the first LED-unit holder 24 and the second LED-unit holder 25 to the LED units 59K, 59C, 59M, 59Y may be improved.

[Positional Relation between Link Member and LED Units with reference to Slanted Section of Ejection Tray]

Figure 16:
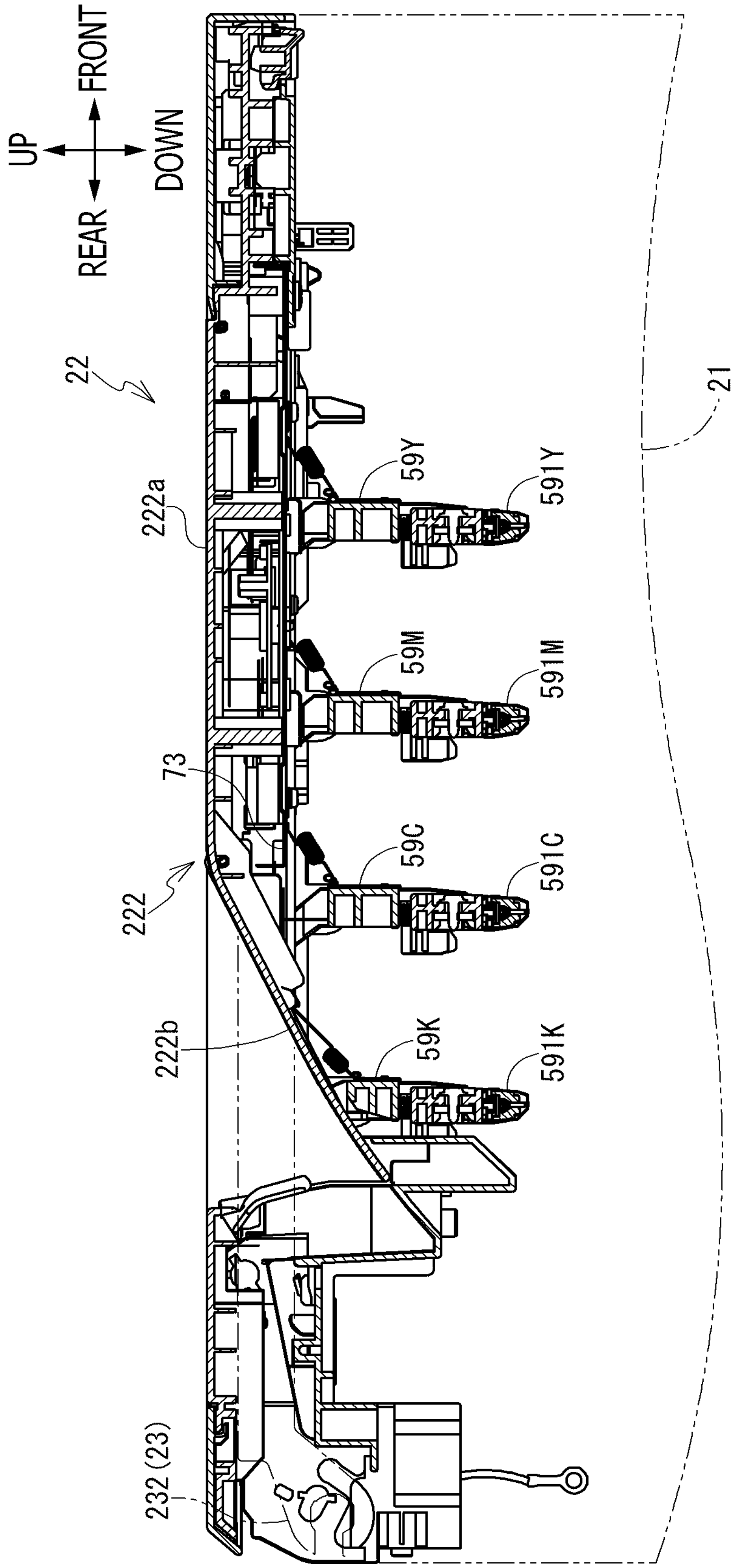
FIG. 16 is a sideward cross-sectional view of the openable/closable cover and the LED units supported by the openable/closable cover.
Figure 17:
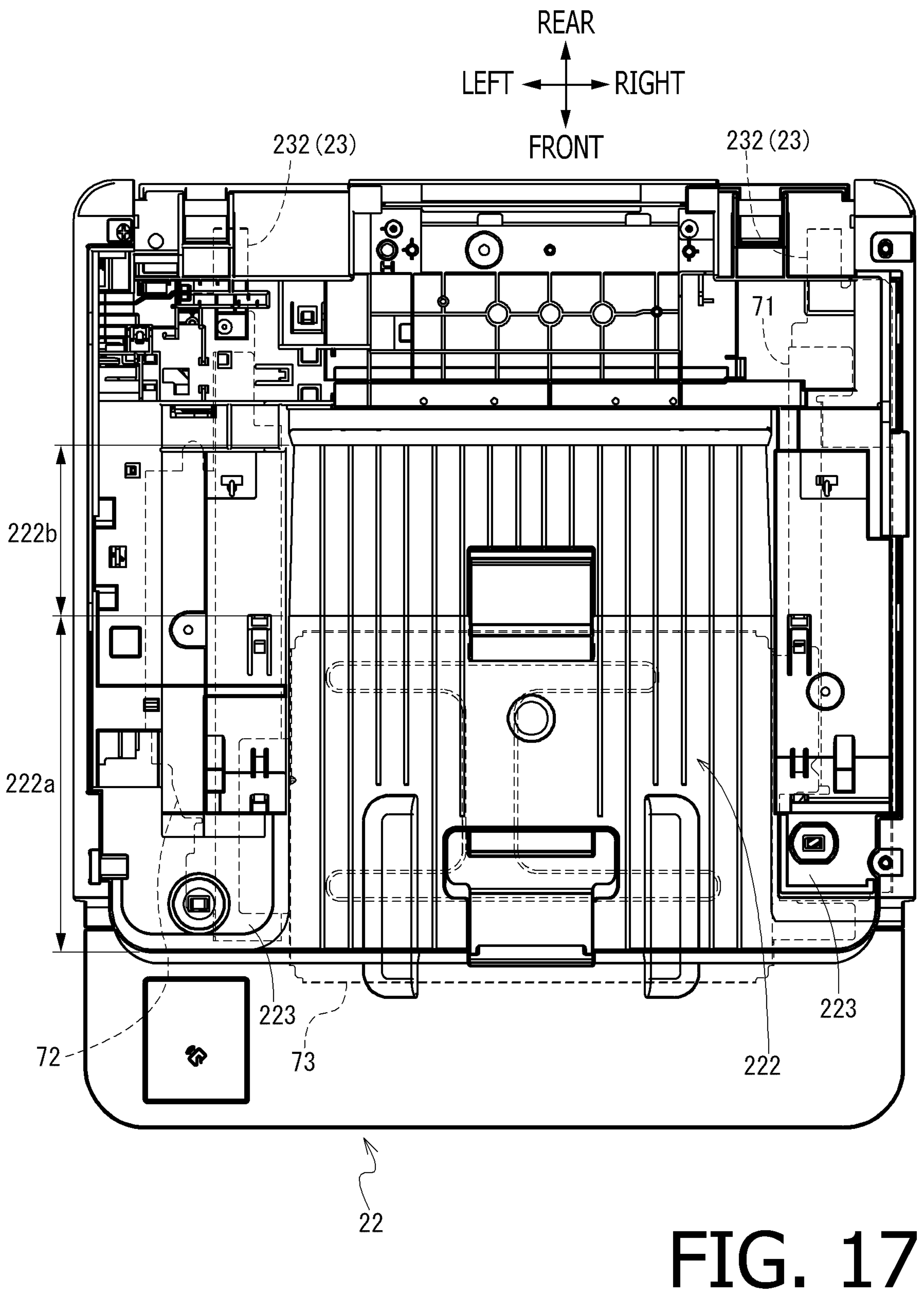
FIG. 17 is a plan view illustrating positional relation between the link member and a slanted section of an ejection tray.

As shown in FIGS. 16-17, the link member 73 is located at the position farther from the hinge 23 in the front-rear direction than the slanted section 222*b* of the ejection tray 222 formed in the openable/closable cover 22. The slanted section 222*b* of the ejection tray 222 is dented inward in the housing body 21. Meanwhile, the link member 73 is located farther from the hinge 23 than the slanted section 222*b*. Therefore, the link member 73 is prevented from colliding with the slanted section 222*b*.

Meanwhile, the LED unit 59K, which is closest to the hinge 23 among the LED units 59K, 59C, 59M, 59Y, and the LED unit 59C, which is second closest to the hinge 23 among the LED units 59K, 59C, 59M, 59Y, overlap the slanted section 222*b* of the ejection tray 222 in the view along the vertical direction. In this regard, the link member 73 is located at the position farther from the hinge 23 and does not occupy the area between the slanted section 222*b* and the LED units 59K, 59C. Therefore, while the slanted section 222*b* overlaps the LED units 59K, 59C, a volume of the image forming apparatus 1 may be reducible.

As shown in FIG. 12, a lower end 241*a* of the body 241 of the first LED-unit holder 24 and the hole 243Y are separated by a distance d1Y. The lower end 241*a* and the hole 243M are separated by a distance d1M. The lower end 241*a* and the hole 243C are separated by a distance d1C. The lower end 241*a* and the hole 243K are separated by a distance d1K.

The distance d1Y and the distance d1M are equal, the distance d1C is greater than the distances d1Y, d1M, and the distance d1K is greater than the distance d1C. In other words, the hole 243Y and the hole 243M are located at the vertically same position, the hole 243C located closer to the hinge 23 than the holes 243Y, 243M is located at a position lower than the holes 243Y, 243M, and the hole 243K located closer to the hinge 23 than the hole 243C is located at a position lower than the hole 243C.

As shown in FIG. 14, a lower end 251*a* of the body 251 of the second LED-unit holder 25 and the hole 253Y are separated by a distance d2Y. The lower end 251*a* and the hole 253M are separated by a distance d2M. The lower end 251*a* and the hole 253C are separated by a distance d2C. The lower end 251*a* and the hole 253K are separated by a distance d2K.

The distance d2Y and the distance d2M are equal, the distance d2C is greater than the distances d2Y, d2M, and the distance d2K is greater than the distance d2C. In other words, the hole 253Y and the hole 253M are located at the vertically same position, the hole 253C located closer to the hinge 23 than the holes 253Y, 253M is located at a position lower than the holes 253Y, 253M, and the hole 253K located closer to the hinge 23 than the hole 253C is located at a position lower than the hole 253C.

Meanwhile, the LED unit 59Y retained through the holes 243Y, 253Y and the LED unit 59M retained through the holes 243M, 253M are located at the positions to overlap the link member 73 in the view along the vertical direction. The LED unit 59C retained through the holes 243C, 253C and the LED unit 59K retained through the holes 243K, 253K are located at the positions to overlap the slanted section 222*b* of the ejection tray 222 in the view along the vertical direction.

The LED units 59Y, 59M are located below the horizontal section 222*a* of the ejection tray 222. In this regard, while the holes 243Y, 253Y to retain the LED unit 59Y and the holes 243M, 253M to retain the LED unit 59M are located at the higher position, the LED units 59Y, 59M are prevented from interfering with the horizontal section 222*a* or the link member 73. On the other hand, the LED units 59C, 59K are located at the positions to overlap the slanted section 222*b*, which is dented inward to be lower in the housing body 21 toward the hinge 23, but the holes 243C, 253C to retain the LED unit 59C and the holes 243K, 253K to retain the LED unit 59K are located at the positions lower than the holes 243M, 253M. Therefore, the LED unit 59C, 59K are prevented from interfering with the slanted section 222*b*.

In particular, the holes 243K, 253K to retain the LED unit 59K, which is closer to the hinge 23 than the LED unit 59C, are located at the lower position than the holes 243M, 253M to retain the LED unit 59C. Therefore, even if the slanting angle of the slanted section 222*b* is larger, the LED unit 59K may be restrained from interfering with the slanted section 222*b*. Therefore, the slanting angle of the slanted section 222*b* may be increased so that the dimension of the ejection tray 222 in the front-rear direction may be reduced, and the image forming apparatus 1 may be downsized.

The LED units 59Y, 59M, 59C, 59K have springs (not signed) (see FIG. 4). The springs may elastically support the LED heads 591K, 591C, 591M, 591Y so that the LED heads 591K, 591C, 591M, 591Y are allowed to move in the vertical direction with respect to bodies of the LED units 59Y, 59M, 59C, 59K, respectively, when the openable/closable cover 22 are closed and when the LED heads 591K, 591C, 591M, 591Y are urged against the photosensitive drums 51K, 51C, 51M, 51Y. With the springs to absorb the movable amounts of the LED heads 591K, 591C, 591M, 591Y in the vertical direction, while the distance d2Y, d2M, the distance d2M, and the distance d2K are different, and positions of the upper ends of the LED units 59Y, 59M, 59C, 59K are different, positions of the lower ends of the LED units 59Y, 59M, 59C, 59K in the vertical direction, i.e., the positions of the LED heads 591K, 591C, 591M, 591Y in the vertical direction, are substantially equal.

[Positional Relation between Operation Interface and Link Member]

Figure 18:
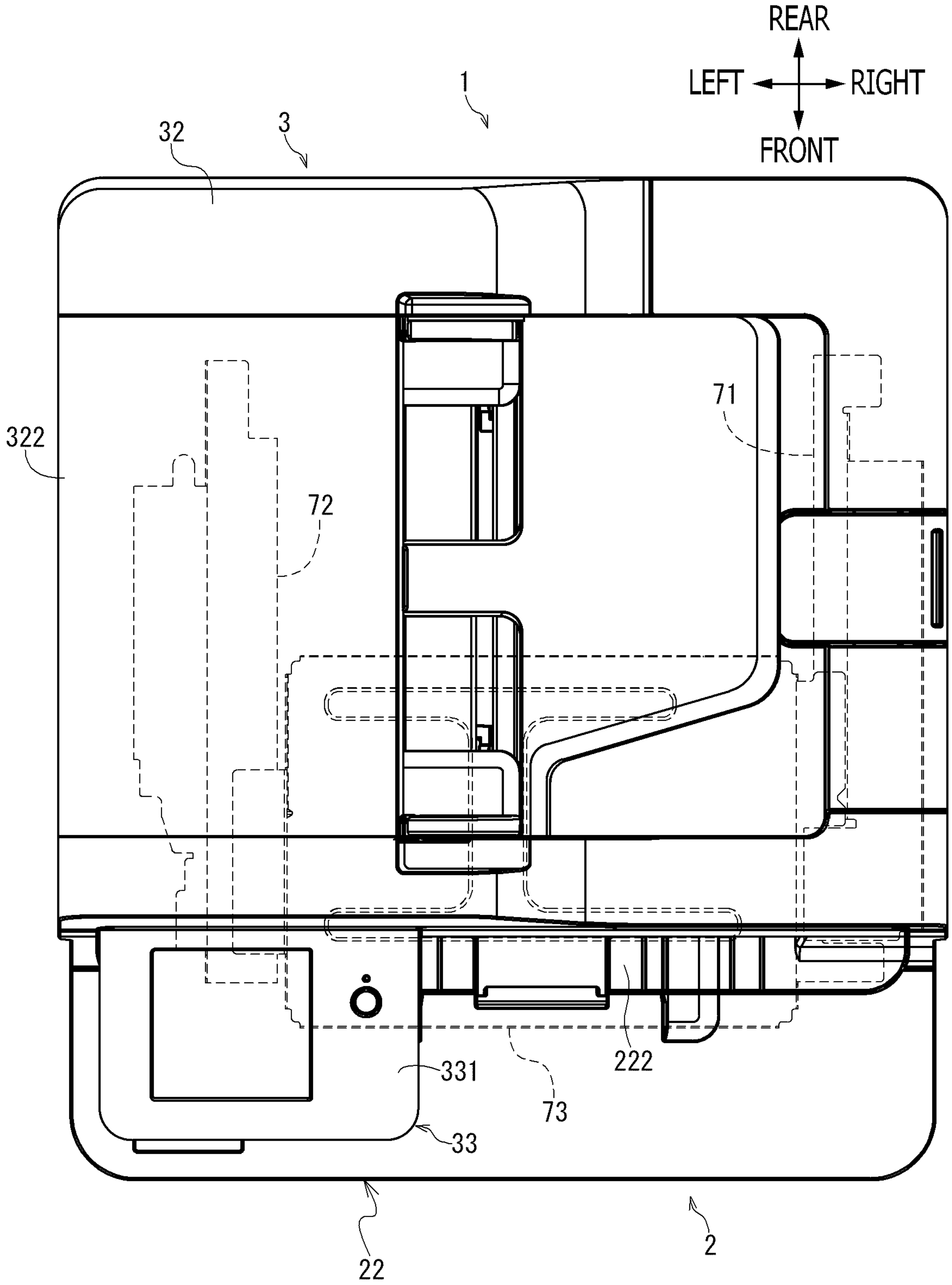
FIG. 18 is a plan view illustrating positional relation between an operation interface and the link member.

As shown in FIG. 18, the operation interface 33 supported by the openable/closable cover 22 overlaps the link member 73 in the front-rear direction in a view along the vertical direction. Therefore, when pressure is applied to the operation interface 33 supported by the openable/closable cover 22, the pressure may be distributed to the first enhancing member 71 and the second enhancing member 72 linked with the link member 73, and the openable/closable cover 22 may be restrained from being deformed.

Second Embodiment

A second embodiment of the present disclosure will be described below. In the following paragraphs, parts and items that are substantially like those in the image forming apparatus 1 described above will be referred to by the same reference sings, and detailed description of those will be herein omitted.

Figure 19:
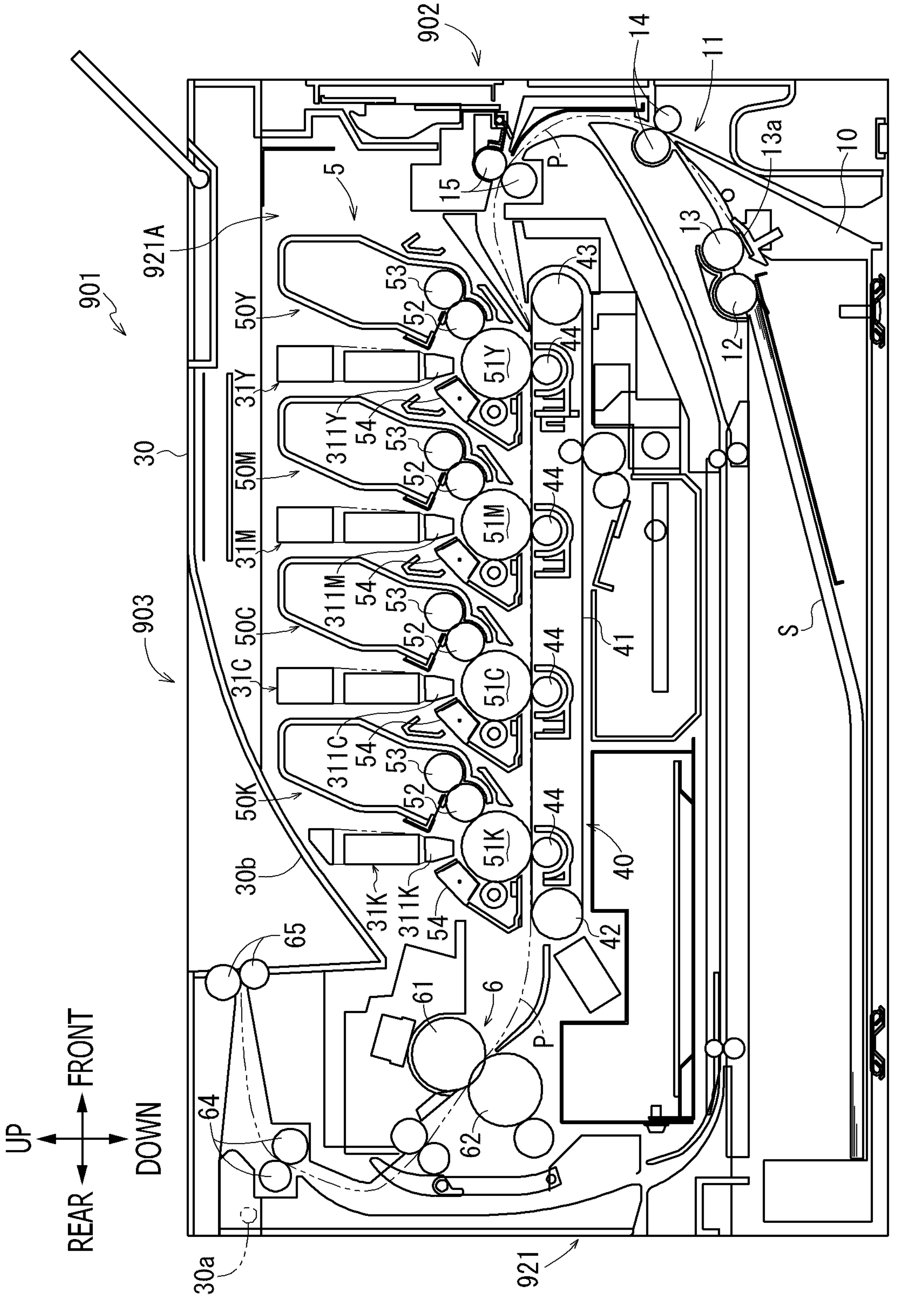
FIG. 19 is a cross-sectional view of an image forming apparatus.
Figure 20:
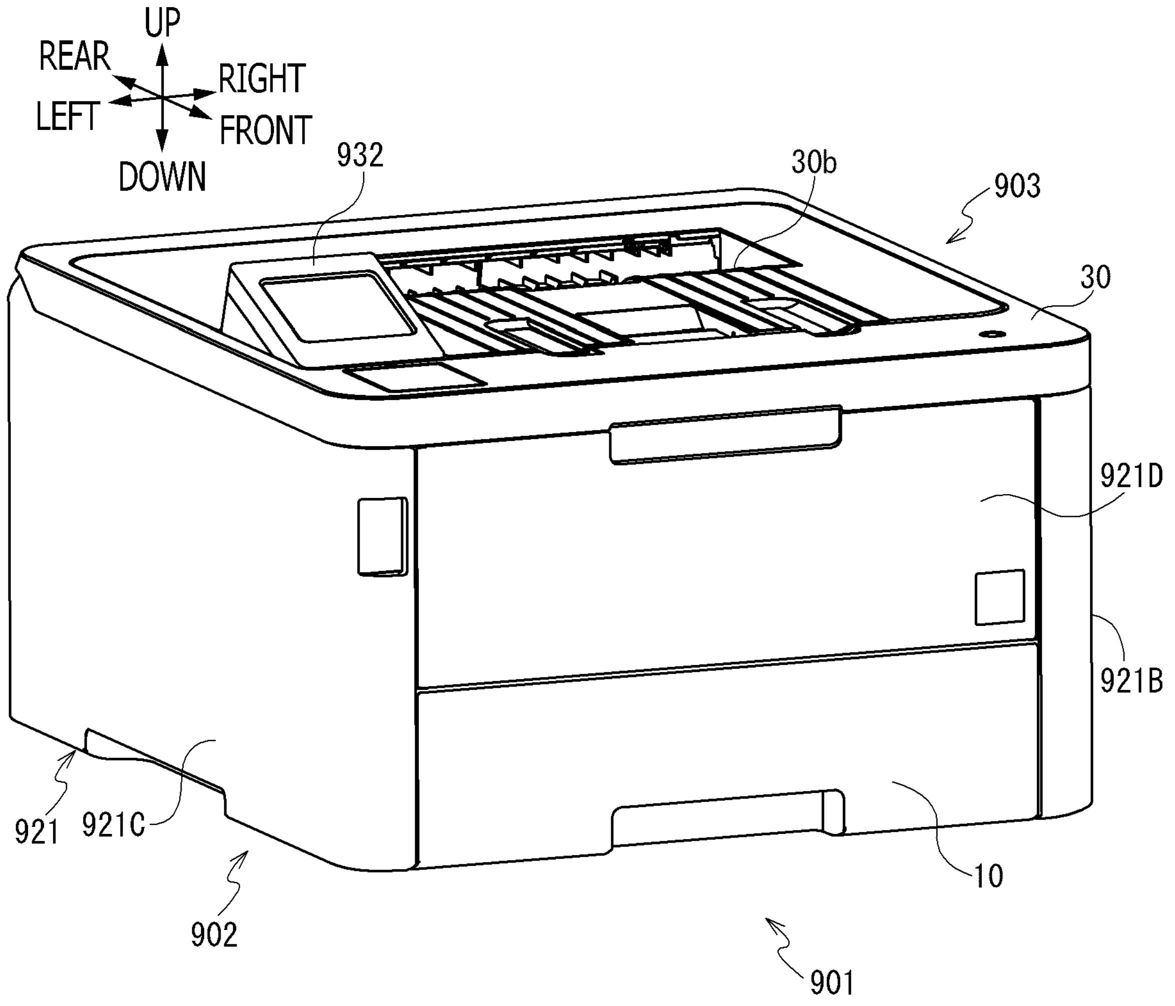
FIG. 20 is a perspective view of the image forming apparatus with a top cover located at a closed position.
Figure 21:
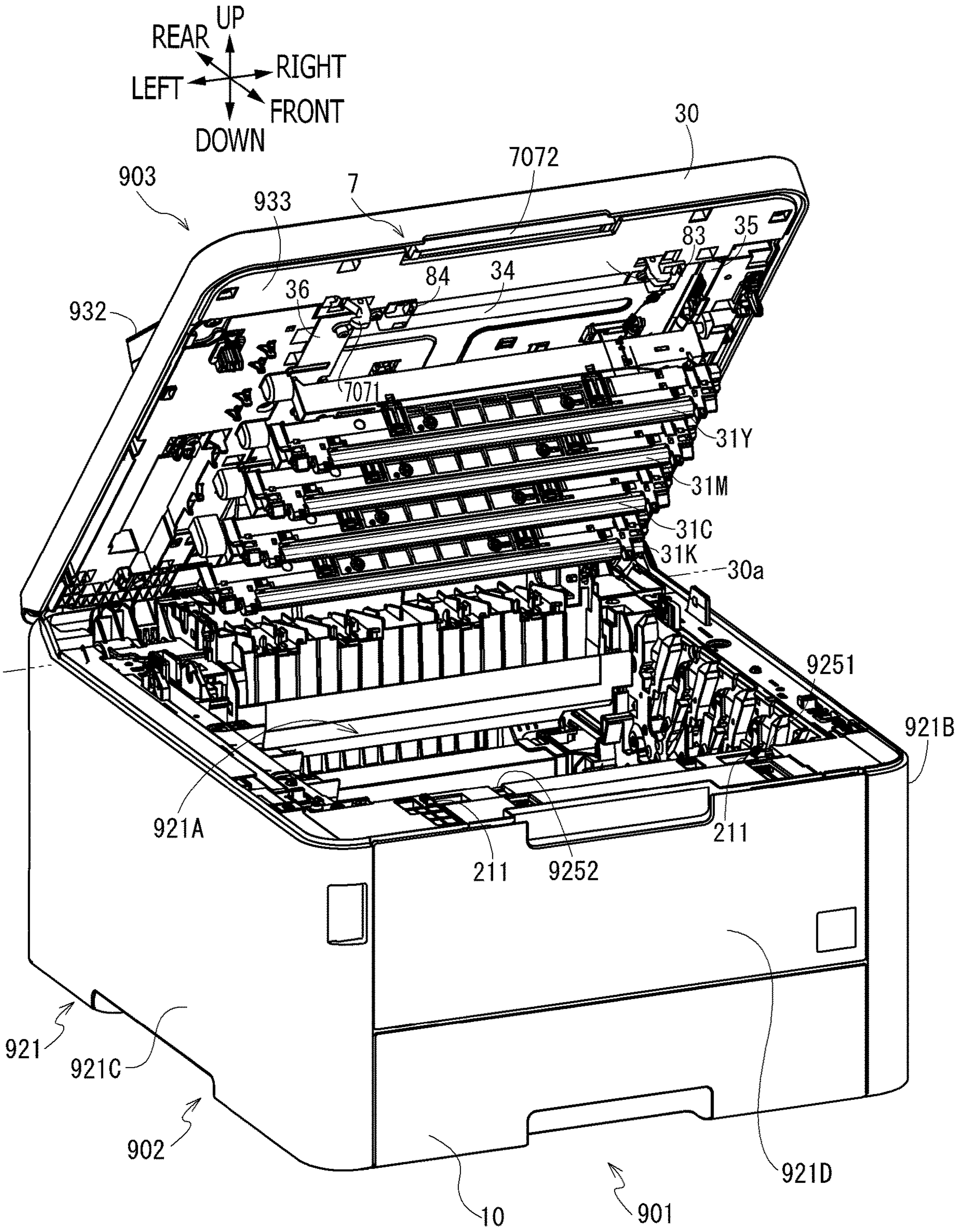
FIG. 21 is a perspective view of the image forming apparatus with the top cover located at an open position.

An image forming apparatus 901 as shown in FIGS. 19-21 is a multicolor laser printer having a main body 902 and an openable/closable cover 903, which is pivotable with respect to the main body 902. The housing 921 has a shape of an approximately rectangular box with an opening 921A on an upper side thereof. The housing 921 accommodates components including a feeder tray 10, a sheet conveyer 11, and an image forming device 5, which are substantially similar to those described earlier in the first embodiment.

The openable/closable cover 903 has a top cover 30, which may open or close the opening 921A of the housing 921. The top cover 30 is pivotable on a pivot axis 30*a* located at a rear end thereof to move between an open position, in which the top cover 30 opens the opening 921A, and a closed position, in which the top cover 30 closes the opening 921A. In other words, the top cover 30 is pivotable on the pivot axis 30*a* between the open position and closed position.

The top cover 30 includes an ejection tray 30*b*, which slants to be lower toward the rear side. On an upper side of the top cover 30, at a position leftward from the ejection tray 30*b*, an operation interface 932 is arranged. Through the operation interface 932, the image forming apparatus 901 may be operated, and condition of the image forming apparatus 901 may be displayed.

The image forming device 5 is located above the feeder tray 10 and includes four process cartridges 50K, 50C, 50M, 50Y, aligning in the front-rear direction. The process cartridges 50K, 50C, 50M, 50Y include photosensitive drums 51K, 51C, 51M, 51Y, respectively. The process cartridges 50K, 50C, 50M, 50Y and the photosensitive drums 51K, 51C, 51M, 51Y are substantially similar to those described earlier in the first embodiment.

The process cartridges 50K, 50C, 50M, 50Y are attached to the housing 921 in a posture in which axes of the photosensitive drums 51K, 51C, 51M, 51Y align in the widthwise direction. In other words, the photosensitive drums 51K, 51C, 51M, 51Y axially extend in the widthwise direction. Each of the process cartridges 50K, 50C, 50M, 50Y includes a developing roller 52, a supplying roller 53, and a charger 54. Each developing roller 52 is movable between a contact position, at which the developing roller 52 contacts the photosensitive drum 51K, 51C, 51M, or 51Y, and a separated position, at which the developing roller 52 is separated from the photosensitive drum 51K, 51C, 51M, or 51Y.

The openable/closable cover 903 has LED units 31K, 31C, 31M, 31Y. The LED units 31K, 31C, 31M, 31Y may expose surfaces of the photosensitive drums 51K, 51C, 51M, 51Y, respectively. The LED units 31K, 31C, 31M, 31Y are arranged to align in the front-rear direction and are supported by the top cover 30.

The LED units 31K, 31C, 31M, 31Y extend downward from the top cover 30 and have LED heads 311K, 311C, 311M, 311Y, respectively, at lower ends thereof. The LED units 31K, 31C, 31M, 31Y are, when the top cover 30 is closed, located above and in proximity to the photosensitive drums 51K, 51C, 51M, 51Y, respectively.

The LED head 311C is located frontward with respect to the LED head 311K. In other words, the LED head 311C is located farther in the front-rear direction from the pivot axis 30*a* than the LED head 311K. The LED head 311M is located frontward with respect to the LED head 311C. In other words, the LED head 311M is located farther in the front-rear direction from the pivot axis 30*a* than the LED head 311C. The LED head 311Y is located frontward with respect to the LED head 311M. In other words, the LED head 311Y is located farther in the front-rear direction from the pivot axis 30*a* than the LED head 311M.

Each of the LED heads 311K, 311C, 311M, 311Y has an LED array, in which a plurality of LED elements align in the widthwise direction.

The image forming apparatus 901 includes a transfer belt 41, a driving roller 42, a driven roller 43, and a plurality of transfer rollers 44, which are substantially similar to those described earlier in the first embodiment.

The photosensitive drums 51K, 51C, 51M, 51Y may be charged by evenly the chargers 54 and selectively exposed to beams emitted from the LED units 31K, 31C, 31M, 31Y. The beams may remove the charges in the selectively exposed areas; thereby, electrostatic latent images may be formed on the surfaces of the photosensitive drums 51K, 51C, 51M, 51Y.

The electrostatic latent images formed on the surfaces of the photosensitive drums 51K, 51C, 51M, 51Y may be transferred to the sheet S, which is conveyed by the sheet conveyer 11 to the transfer belt 41.

The image forming apparatus 901 further has a fuser 6 including a heat roller 61 and a pressure roller 62, which are substantially similar to those described earlier in the first embodiment.

The sheet S with the toner images thermally fixed thereon in the fuser 6 may be conveyed downstream in a conveying direction and further conveyed by an intermediate ejection roller pair 64 and an ejection roller pair 65, which is located downstream in the conveying direction from the intermediate ejection roller pair 64, to be ejected at the ejection tray 30*b*.

Figure 22:
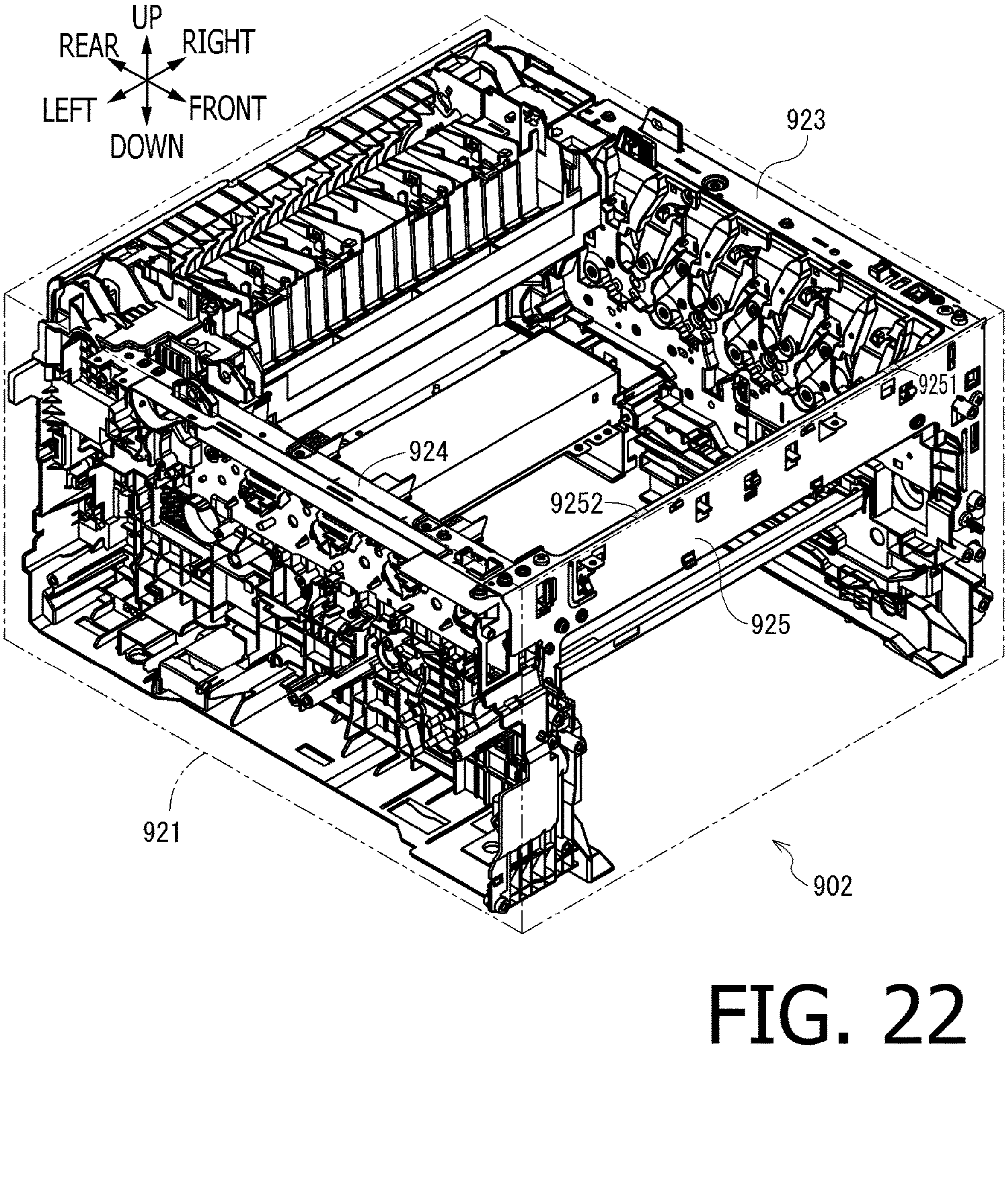
FIG. 22 is a perspective view of a first side frame, a second side frame, and a front frame in a main body of the image forming apparatus.

As shown in FIG. 22, the main body 902 has a first side frame 923, a second side frame 924, and a front frame 925. The first side frame 923 and the second side frame 924 are separated in the widthwise direction. The first side frame 923 is located at a rightward end area in the main body 902 and spreads in the front-rear direction and the vertical direction. The second side frame 924 is located at a leftward end area in the main body 902 and spreads in the front-rear direction and the vertical direction.

The front frame 925 is located at a frontward end area in the main body 902 and spreads in the widthwise direction and the vertical direction. The front frame 925 connects a frontward end of the first side frame 923 and a frontward end of the second side frame 924. The first side frame 923, the second side frame 924, and the front frame 925 are formed of a conductive metal and are grounded. The first side frame 923 and the second side frame 924 are examples of a first main-body grounding member, and the front frame 925 is an example of a second main-body grounding member.

The first side frame 923, the second side frame 924, and the front frame 925 are accommodated in the housing 921. The housing 921 includes a rightward cover 921B, a leftward cover 921C, and a frontward cover 921D. The rightward cover 921B covers a rightward side of the first side frame 923, and the leftward cover 921C covers a leftward side of the second side frame 924, and the frontward cover 921D covers a frontward side and an upper side of the front frame 925.

According to the present embodiment, the first side frame 923, the second side frame 924, and the front frame 925 formed separately are connected mutually; however, optionally, the first side frame 923, the second side frame 924, and the front frame 925 may be formed integrally in a single piece. In the arrangement such that the first side frame 923, the second side frame 924, and the front frame 925 are formed integrally, a quantity of grounding members in the main body 902 may be reduced.

[Locking Assembly in Top Cover]

As shown in FIGS. 21 and 23-25, the openable/closable cover 903 has a locking assembly 7 engageable with the housing 921 to retain the top cover 30 closed and a retainer frame 933 to retain the locking assembly 7.

The locking assembly 7 is located in a frontward end area in the top cover 30 and includes an engaging part 7071 engageable with the housing 921 and an operation part 7072 to operate the engaging part 7071. The retainer frame 933 has a form of a plate, which covers a frontward area of the top cover 30 from below. The frontward cover 921D of the housing 921 has an engageable part 211. When the engaging part 7071 of the locking assembly 7 engages with the engageable part 211 of the frontward cover 921D, the top cover 30 is retained in a closed posture.

The operation part 7072 includes a handle 7721 and a pressure applier 7722. The handle 7721 is a part to be gripped by a user who operates the locking assembly 7 and is formed of a plate member extending in the widthwise direction. The pressure applier 7722 is formed at each widthwise end of the handle 7721. The operation part 772 is located at a frontward end of the top cover 30. In other words, the operation part 772 is located on one end in the front-rear direction farther from the pivot axis 30*a* of the top cover 30.

The engaging part 7071 includes a pair of engaging parts 7071, which are located on one side and the other side of the locking assembly 7 in the widthwise direction. Each engaging part 7071 includes a pivot shaft 7711, a pressure receiver 7712, and an engageable claw 7713. The pivot shaft 7711 is a shaft extending in the front-rear direction and is rotatably supported by the retainer frame 933 to rotate on an axis thereof extending in the front-rear direction. The pressure receiver 7712 extends inward in the widthwise direction from the pivot shaft 7711 and is in contact with the pressure applier 7722 of the operation part 7072. The engageable claw 7713 extends downward from the pivot shaft 7711 and is engageable with the engageable part 211 of the frontward cover 921D.

The engaging part 7071 pivoting on the axis of the pivot shaft 7711 may move between an engaged position, at which the engageable claw 7713 engages with the engageable part 211 of the frontward cover 921D, and a disengaged position, at which the engageable claw 7713 is disengaged from the engageable part 221 of the frontward cover 921D. When the engaging part 7071 is at the engaged position, the engageable claw 7713 and the engageable part 211 are engaged, and thereby the top cover 30 is retained at the closed position. When the engaging part 7071 is at the disengaged position, the engageable claw 7713 and the engageable part 211 are disengaged, and the top cover 30 is allowed to move toward the open position.

With the locking assembly 7 as configured as above, in a state where the user is not gripping the handle 7721 and where the locking assembly 7 is not operated, the engaging part 7071 may be located at the engaged position, and the top cover 30 may be retained at the closed position.

On the other hand, when the user grips the handle 7721 and moves the handle 7721 upward to operate the locking assembly 7, the pressure receivers 7712 in the engaging parts 7071 are pressed upward by the pressure appliers 7722 of the operation part 772, the engaging parts 7071 pivot on the axis of the pivot shafts 7711, and the engageable claws 7713 move inward in the widthwise direction. Thereby, the engaging parts 7071 move from the engaged position to the disengaged position, and the top cover 30 is allowed to move from the closed position to the open position. Thus, in the locking assembly 7, the operation part 7072 may move in conjunction with the engaging parts 7071 to switch the positions of the engaging parts 7071 between the engaged position and the disengaged position.

[Grounding Structure of Top Cover]

Figure 25:
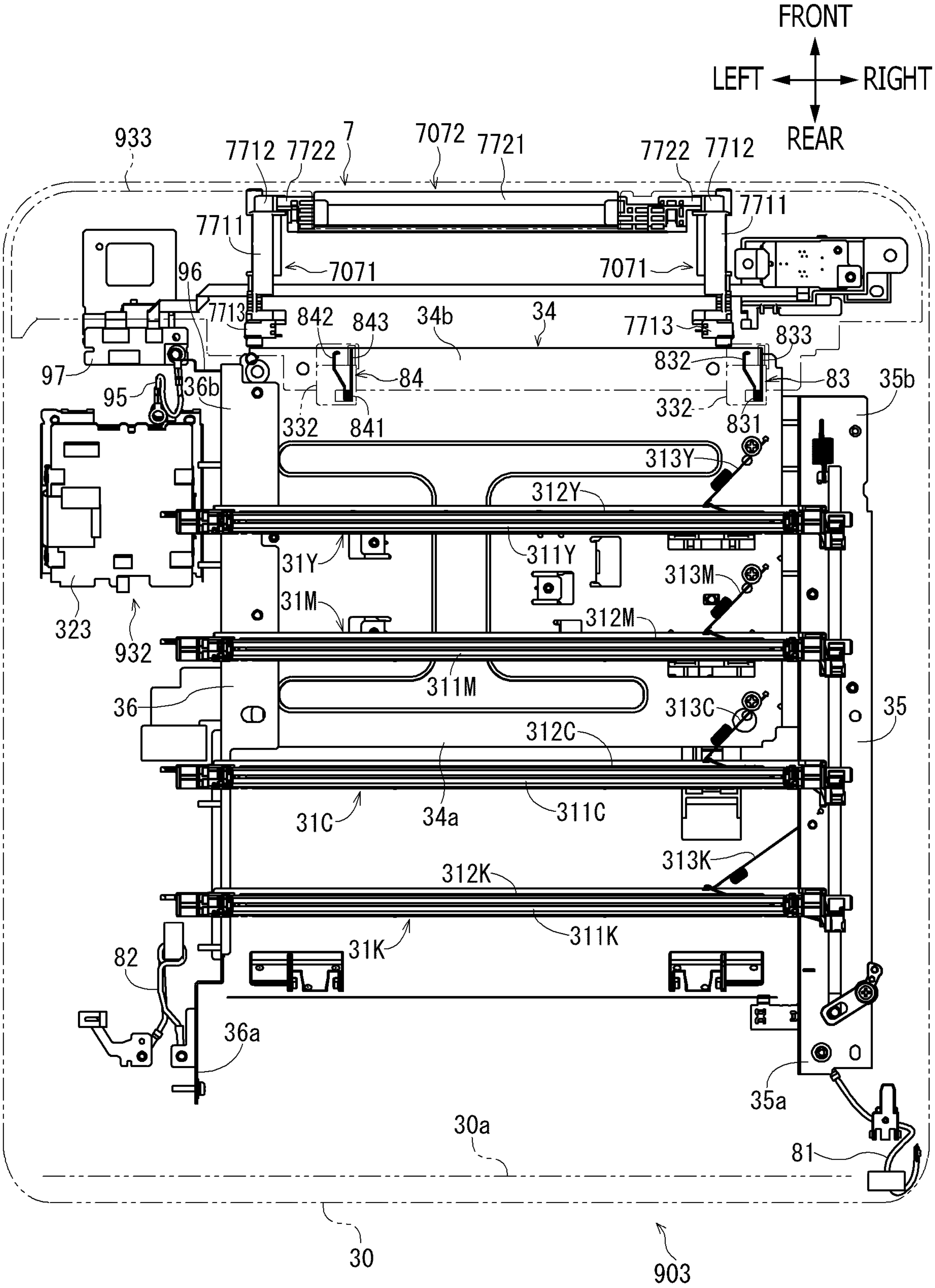
FIG. 25 is a bottom plan view of the top cover.
Figure 26:
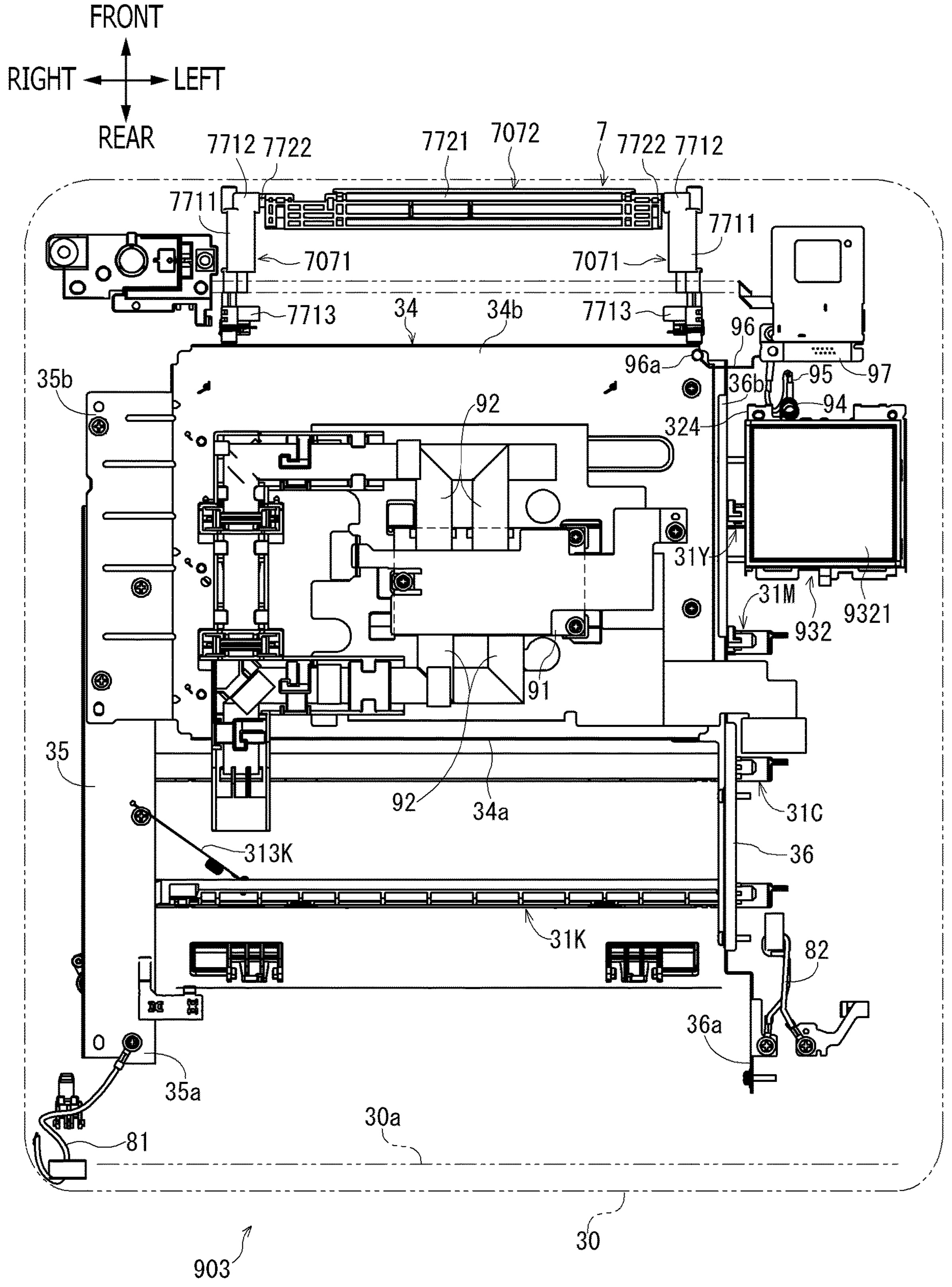
FIG. 26 is a top plan view of the top cover with a main metal plate, a first side metal plate, and a second side metal plate.
Figure 27:
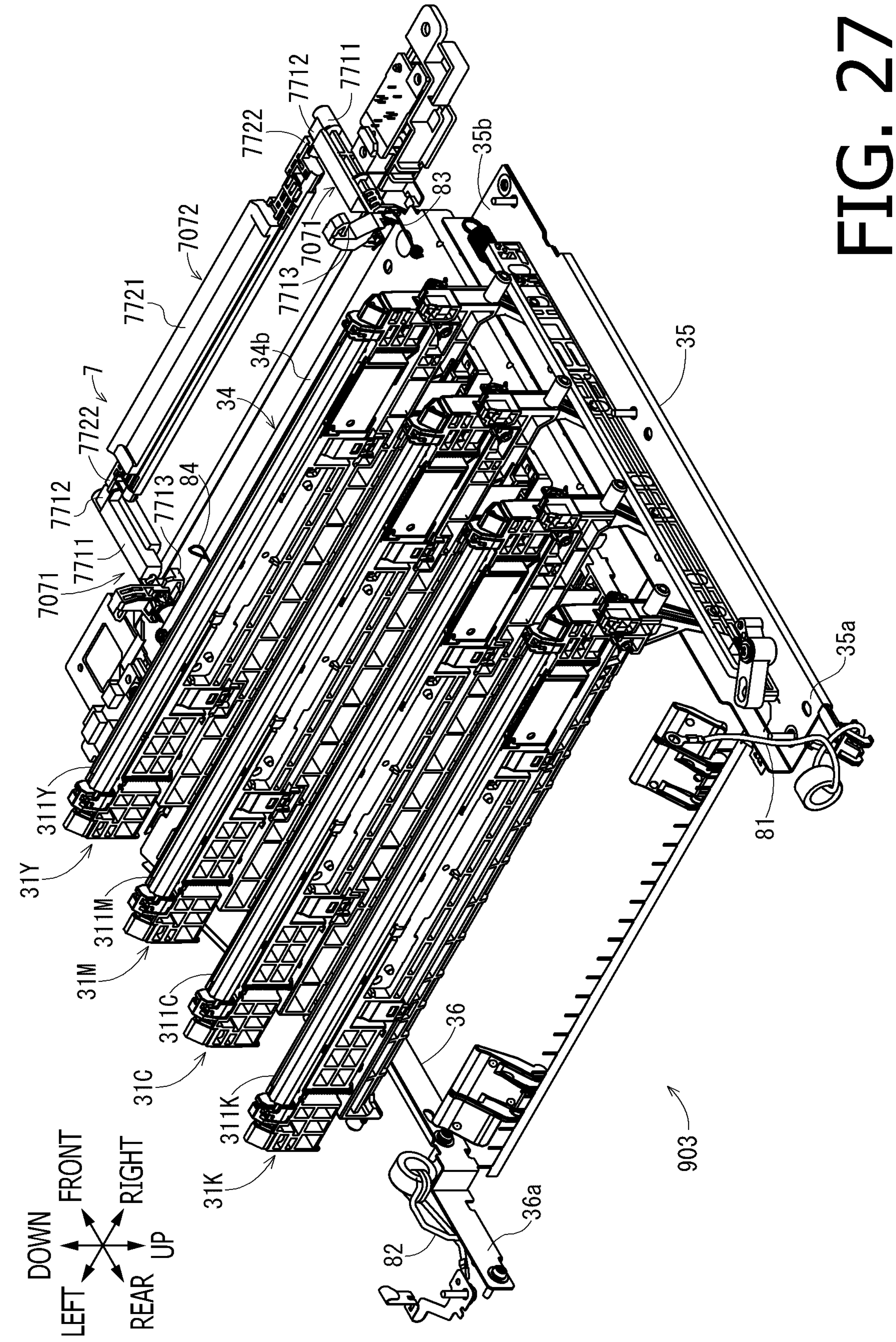
FIG. 27 is a perspective view of the top cover viewed from a lower-rearward position.

As shown in FIGS. 25-27, the openable/closable cover 903 includes a main metal plate 34, a first side metal plate 35, and a second side metal plate 36. The main metal plate 34, the first side metal plate 35, and the second side metal plate 36 are arranged on a lower side of the top cover 30.

The main metal plate 34 is formed of a metal plate member having a substantially rectangular shape spreading in the front-rear direction and the widthwise direction and is conductive. The main metal plate 34 is located rearward with respect to the locking assembly 7. The main metal plate 34 has a rearward end portion 34*a* and a frontward end portion 34*b*. The rearward end portion 34*a* is a portion of the main metal plate 34 on one end in the front-rear direction closer to the pivot axis 30*a*, and the frontward end portion 34*b* is a portion of the main metal plate 34 on the opposite end to the rearward end portion 34*a* in the front-rear direction.

The rearward end portion 34*a* of the main metal plate 34 is located frontward with respect to the LED head 311K. In other words, the rearward end portion 34*a* of the main metal plate 34 is located farther from the pivot axis 30*a* than the LED head 311K in the front-rear direction. In particular, the rearward end portion 34*a* of the main metal plate 34 is located between the LED head 311C and the LED head 311M in the front-rear direction. The frontward end portion 34*b* of the main metal plate 34 is located frontward with respect to the LED head 311Y.

The frontward end portion 34*b* of the main metal plate 34 overlaps a rearward end portion of the retainer frame 933 in the front-rear direction. The retainer frame 933 is located to be lower than the main metal plate 34, and the frontward end portion 34*b* of the main metal plate 34 is covered by the rearward portion of the retainer frame 933 from below.

The first side metal plate 35 is formed of an elongated metal plate member extending in the front-rear direction and is conductive. The first side metal plate 35 is connected to a rightward end area of the main metal plate 34. The first side metal plate 35 has a rearward end portion 35*a* and a frontward end portion 35*b*. The rearward end portion 35*a* is a portion of the first side metal plate 35 on one end in the front-rear direction closer to the pivot axis 30*a*, and the frontward end portion 35*b* is a portion of the first side metal plate 35 on the other end opposite to the rearward end portion 35*a* in the front-rear direction. The rearward end portion 35*a* is located rearward with respect to the rearward end portion 34*a* of the main metal plate 34 and is located in a rearward end area of the top cover 30.

The second side metal plate 36 is formed of an elongated metal plate member extending in the front-rear direction and is conductive. The second side metal plate 36 is connected to a leftward end area of the main metal plate 34. The second side metal plate 36 has a rearward end portion 36*a* and a frontward end portion 36*b*. The rearward end portion 36*a* is a portion of the second side metal plate 36 on one end in the front-rear direction closer to the pivot axis 30*a*, and the frontward end portion 36*b* is a portion of the second side metal plate 36 on the other end opposite to the rearward end portion 36*a* in the front-rear direction. The rearward end portion 36*a* is located rearward with respect to the rearward end portion 34*a* of the main metal plate 34 and is located in a rearward end area of the top cover 30.

The second side metal plate 36 is separated from the first side metal plate 35 in the widthwise direction, and the main metal plate 34 is located between the first side metal plate 35 and the second side metal plate 36 in the widthwise direction.

The openable/closable cover 903 has a first side grounding member 81, a second side grounding member 82, a first main grounding member 83, and a second main grounding member 84.

The first side grounding member 81 is a wire member connecting the first side metal plate 35 and the first side frame 923. The first side grounding member 81 is, at one end thereof, in contact with the rearward end portion 35*a* of the first side metal plate 35 and, at the other end thereof, is electrically connected with the first side frame 923. The first side grounding member 81 is electrically connected with the first side frame 923 when the top cover 30 is both at the open position and at the closed position. The first side frame 923 is grounded; therefore, since the first side metal plate 35 is electrically connected to the first side frame 923 through the first side grounding member 81, the first side metal plate 35 is grounded.

The second side grounding member 82 is a wire member connecting the second side metal plate 36 and the second side frame 924. The second side grounding member 82 is, at one end thereof, in contact with the rearward end portion 36*a* of the second side metal plate 36 and, at the other end thereof, is electrically connected with the second side frame 924. The second side grounding member 82 is electrically connected with the second side frame 924 when the top cover 30 is both at the open position and at the closed position. The second side frame 924 is grounded; therefore, since the second side metal plate 36 is electrically connected to the second side frame 924 through the second side grounding member 82, the second side metal plate 36 is grounded.

The first main grounding member 83 is formed of a metal spring and is in contact with a rightward end area in the frontward end portion 34*b* of the main metal plate 34. The first main grounding member 83 is retained by the retainer frame 933.

As shown in FIGS. 21-22, the front frame 925 of the main body 902 has a first contact portion 9251 at an upper end thereof. The first contact portion 9251 of the front frame 925 is exposed from the frontward cover 921D, and the first main grounding member 83 may contact the first contact portion 9251 from above.

The first main grounding member 83, when the top cover 30 is located at the closed position, contacts the first contact portion 951 and is connected electrically to the front frame 925. Since the front frame 925 is grounded, when the first main grounding member 83 is electrically connected to the front frame 925, the main metal plate 34 is electrically connected to the front frame 925 through the first main grounding member 83; thereby, the main metal plate 34 is grounded.

The second main grounding member 84 is formed of a metal spring and is in contact with a leftward end area in the frontward end portion 34*b* of the main metal plate 34. The second main grounding member 84 is separated from the first main grounding member 83 in the widthwise direction. The second main grounding member 84 is retained by the retainer frame 933.

As shown in FIGS. 21-22, the front frame 925 of the main body 902 has a second contact portion 9252 at the upper end thereof. The second contact portion 9252 and the first contact portion 951 are separated in the widthwise direction. The second contact portion 9252 of the front frame 925 is exposed from the frontward cover 921D, and the second main grounding member 84 may contact the second contact portion 9252 from above.

The second main grounding member 84, when the top cover 30 is located at the closed position, contacts the second contact portion 9252 and is connected electrically to the front frame 925. Since the front frame 925 is grounded, when the second main grounding member 84 is electrically connected to the front frame 925, the main metal plate 34 is electrically connected to the front frame 925 through the second main grounding member 84; thereby, the main metal plate 34 is grounded.

Figure 28A:
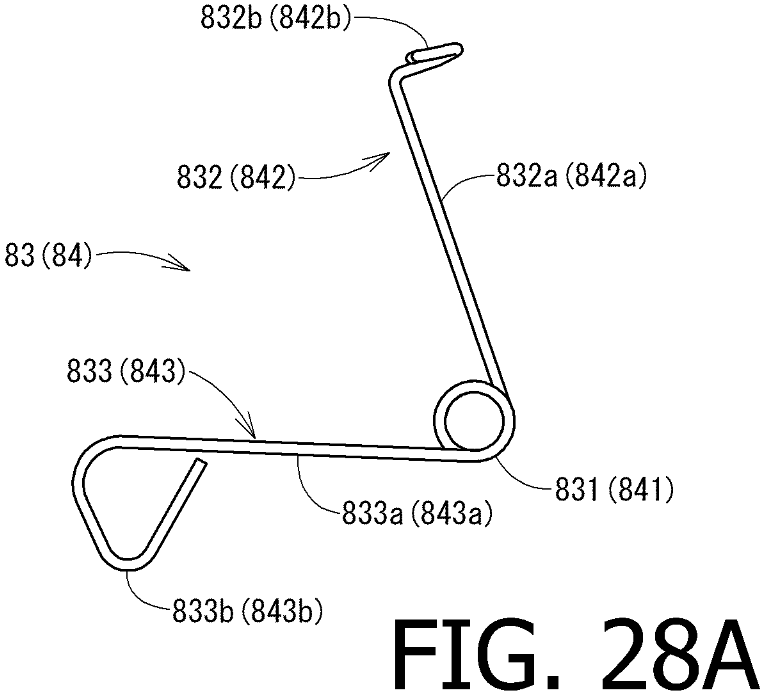
FIG. 28A is a side view of a first (second) main grounding member.
Figure 28B:
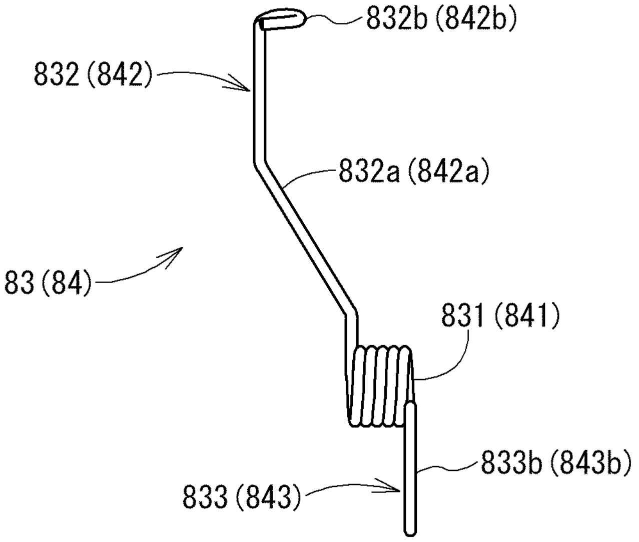
FIG. 28B is a front view of the first (second) main grounding member.

As shown in FIGS. 28A-28B, the first main grounding member 83 is a torsion coil spring formed by bending and coiling a metal-made resilient wire and includes a retained portion 831, a first arm portion 832, and a second arm portion 833. The retained portion 831 is formed by coiling the wire into loops in an annular shape.

The first arm portion 832 includes an extended portion 832*a* extended from the retained portion 831 and a contact portion 832*b* formed continuously from the extended portion 832*a*. The second arm portion 833 includes an extended portion 833*a* extending from the retained portion 831 in a direction different from the extended portion 832*a* and a contact portion 833*b* formed continuously from the extended portion 833*a*. FIGS. 28A-28B show the first main grounding member 83 in a natural state.

Figure 29:
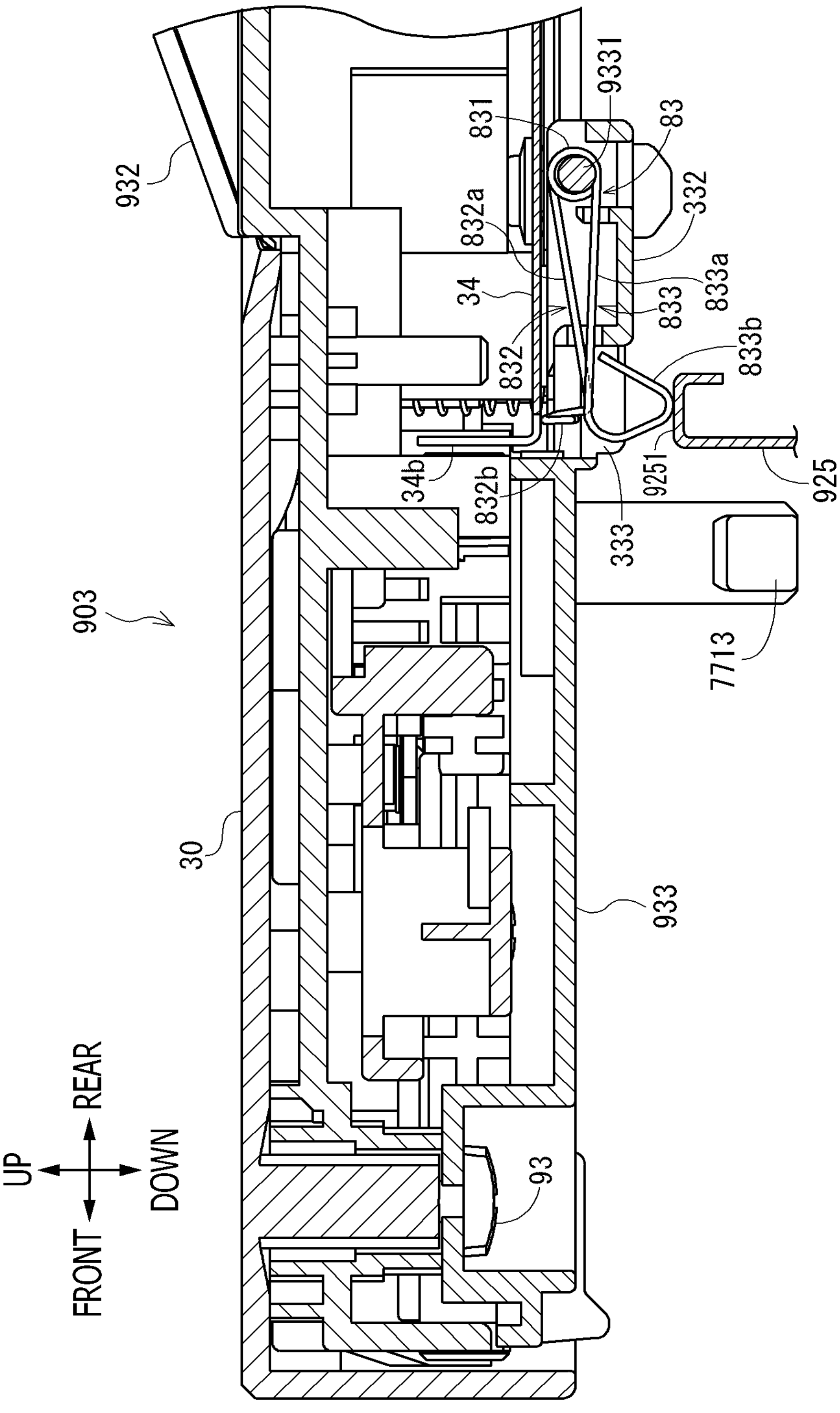
FIG. 29 is a sideward cross-sectional view of a frontward area of the top cover.
Figure 30A:
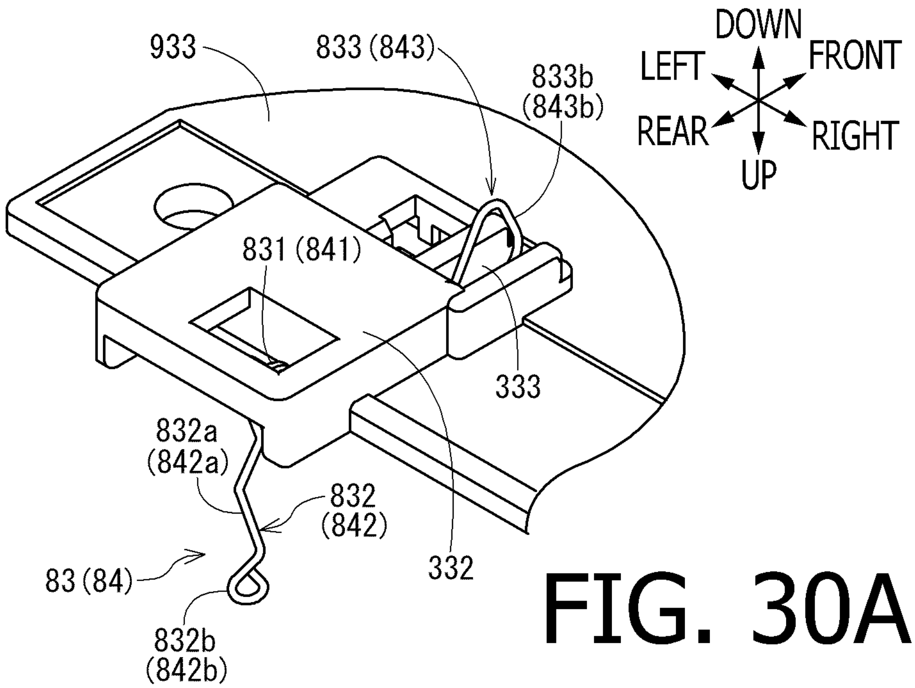
FIG. 30A is a perspective view of the first (second) main grounding member retained by a retainer frame viewed from a lower position.
Figure 30B:
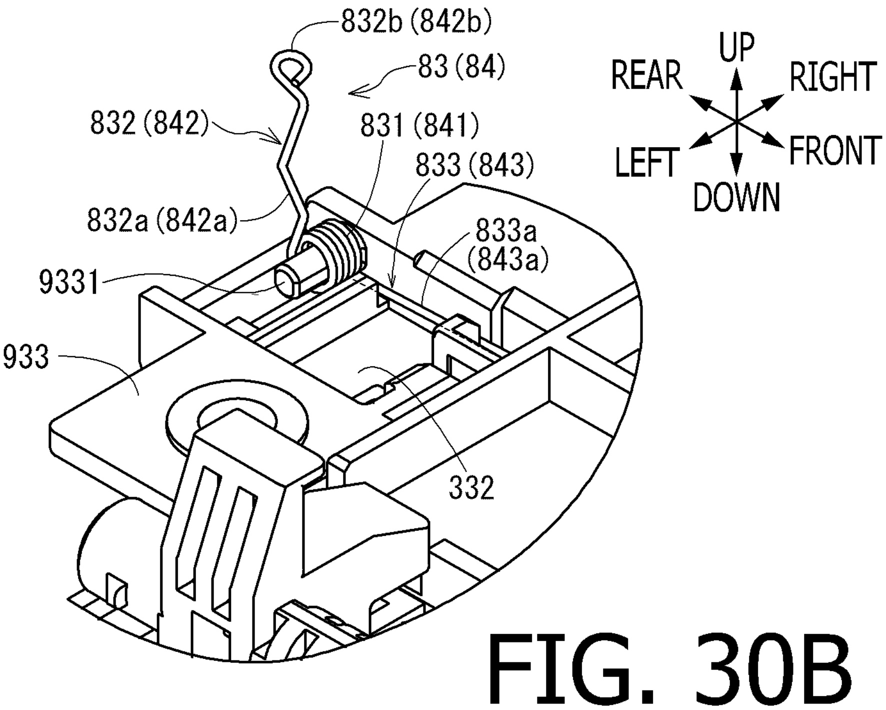
FIG. 30B is a perspective view of the first (second) main grounding member retained by the retainer frame viewed from an upper position.
Figure 31A:
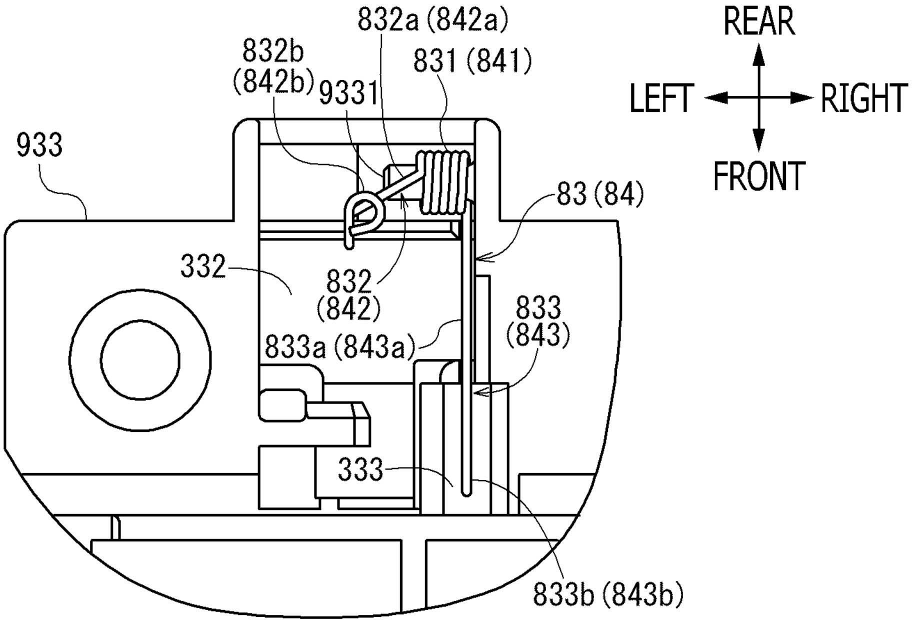
FIG. 31A is a top plan view of the first (second) main grounding member retained by the retainer frame.
Figure 31B:
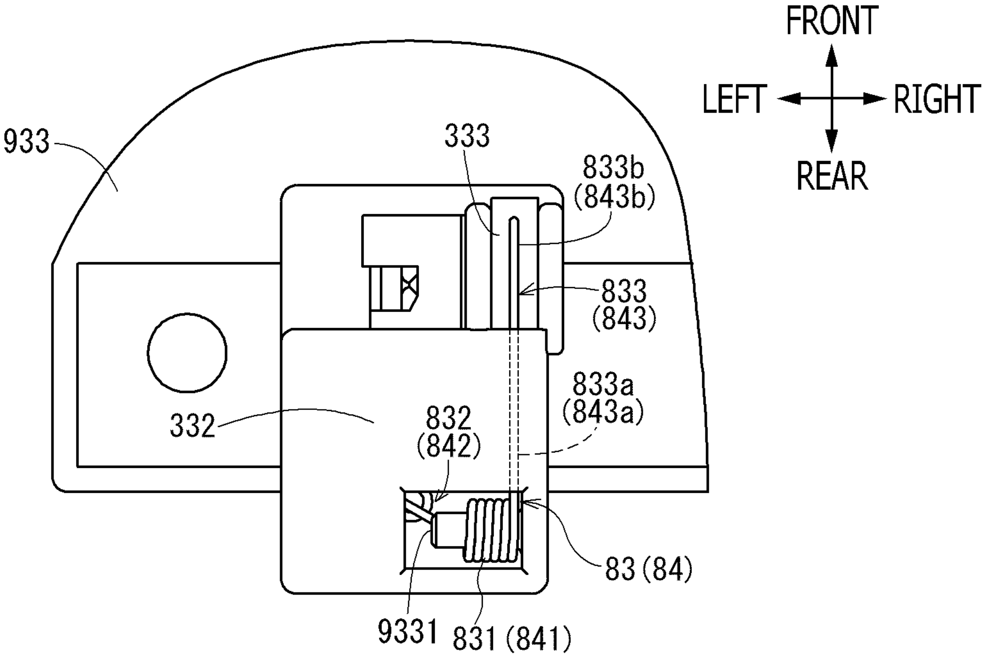
FIG. 31B is a bottom plan view of the first (second) main grounding member retained by the retainer frame.

As shown in FIG. 29, when the top cover 30 is located at the closed position, the first main grounding member 83 is located between the frontward end portion 34*b* of the main metal plate 34 and the rearward end portion of the retainer frame 933 in the vertical direction. The retainer frame 933 has a retainer pin 9331 extending in the widthwise direction, and the retained portion 831 of the first main grounding member 83 is retained by the retainer frame 933 with the retainer pin 9331. The contact portion 832*b* in the first arm portion 832 of the first main grounding member 83 is in contact a downward surface of the main metal plate 34, and the contact portion 833*b* in the second arm portion 833 of the first main grounding member 83 is in contact the first contact portion 9251 of the front frame 925.

When the first main grounding member 83 is in a state where the contact portion 832*b* contacts the main metal plate 34 and the contact portion 833*b* contacts the front frame 925, the first main grounding member 83 is in a folded form with the first arm portion 832 and the second arm portion 833 are closer to each other and provides an urging force in a direction, in which the first arm portion 832 and the second arm portion 833 tend to separate from each other. The contact portion 832*b* is pressed against the main metal plate 34 by the urging force of the first main grounding member 83, and the contact portion 833*b* is pressed against the front frame 925 by the urging force of the first main grounding member 83. In this arrangement, the main metal plate 34 and the front frame 925 are electrically connected through the first main grounding member 83 stably.

On the other hand, when the top cover 30 is located at the open position, the contact portion 833*b* in the second arm portion 833 of the first main grounding member 83 and the front frame 925 are separated; therefore, the main metal plate 34 and the front frame 925 are electrically disconnected.

As shown in FIGS. 29, 30A-30B, and 31A-31B, the retainer frame 933 has a covering portion 332, which covers the first main grounding member 83 retained by the retainer pin 9331. Moreover, the retainer frame 933 has an opening 333, through which the contact portion 833*b* in the second arm portion 833 of the first main grounding member 83 is exposed.

The covering portion 332 covers the extended portion 832*a* in the first arm portion 832 and the extended portion 833*a* in the second arm portion 833 of the first main grounding member 83 from below. The extended portion 832*a* in the first arm portion 832 and the extended portion 833*a* in the second arm portion 833 covered by the covering portion 332 are not exposed outward but are concealed; therefore, the extended portion 832*a* and the extended portion 833*a* may be restrained from being touched by the user when, for example, the top cover 30 is at the open position.

The contact portion 833*b* in the second arm portion 833 of the first main grounding member 83 protrudes downward to a lower side of the retainer frame 933 through the opening 333 and is thereby enabled to contact the first contact portion 9251 of the front frame 925.

The second main grounding member 84 has a retained portion 841, which is equivalent to the retained portion 831 in the first main grounding member 83. The second main grounding member 84 has a first arm portion 842, an extended portion 842*a*, and a contact portion 842*b*, which are equivalent to the first arm portion 832, the extended portion 832*a*, and the contact portion 832*b* in the first main grounding member 83, respectively. The second main grounding member 84 has a second arm portion 843, an extended portion 843*a*, and a contact portion 843*b*, which are equivalent to the second arm portion 833, the extended portion 833*a*, and the contact portion 833*b* in the first main grounding member 83, respectively.

While the first main grounding member 83 and the second main grounding member 84 are located at different positions in the openable/closable cover 903, the form of the first main grounding member 83 and the form of the second main grounding member 84 are the same. In this regard, detailed description of the second main grounding member 84 is herein omitted.

In the openable/closable cover 903, the first main grounding member 83 and the second main grounding member 84 are retained by the same retainer frame 933 that retains the locking assembly 7. Therefore, when the top cover 30 is closed and the engaging parts 7071 in the locking assembly 7 engage with the housing 921 of the main body 902, the positional accuracy between the first main grounding member 83 and the second main grounding member 84 may be secured.

As the positional accuracy between the first main grounding member 83 and the second main grounding member 84 is substantially secured, it may not be necessary to arrange the first main grounding member 83 and the second main grounding member 84 to protrude from the by a larger amount, but the first main grounding member 83 and the second main grounding member 84 may still contact the first contact portion 9251 and the second contact portion 9252, respectively, stably. In this regard, the protruding amount of the first main grounding member 83 and the second main grounding member 84 from the retainer frame 933 may be reduced, and the user may be restrained from touching the first main grounding member 83 or the second main grounding member 84.

Figure 23:
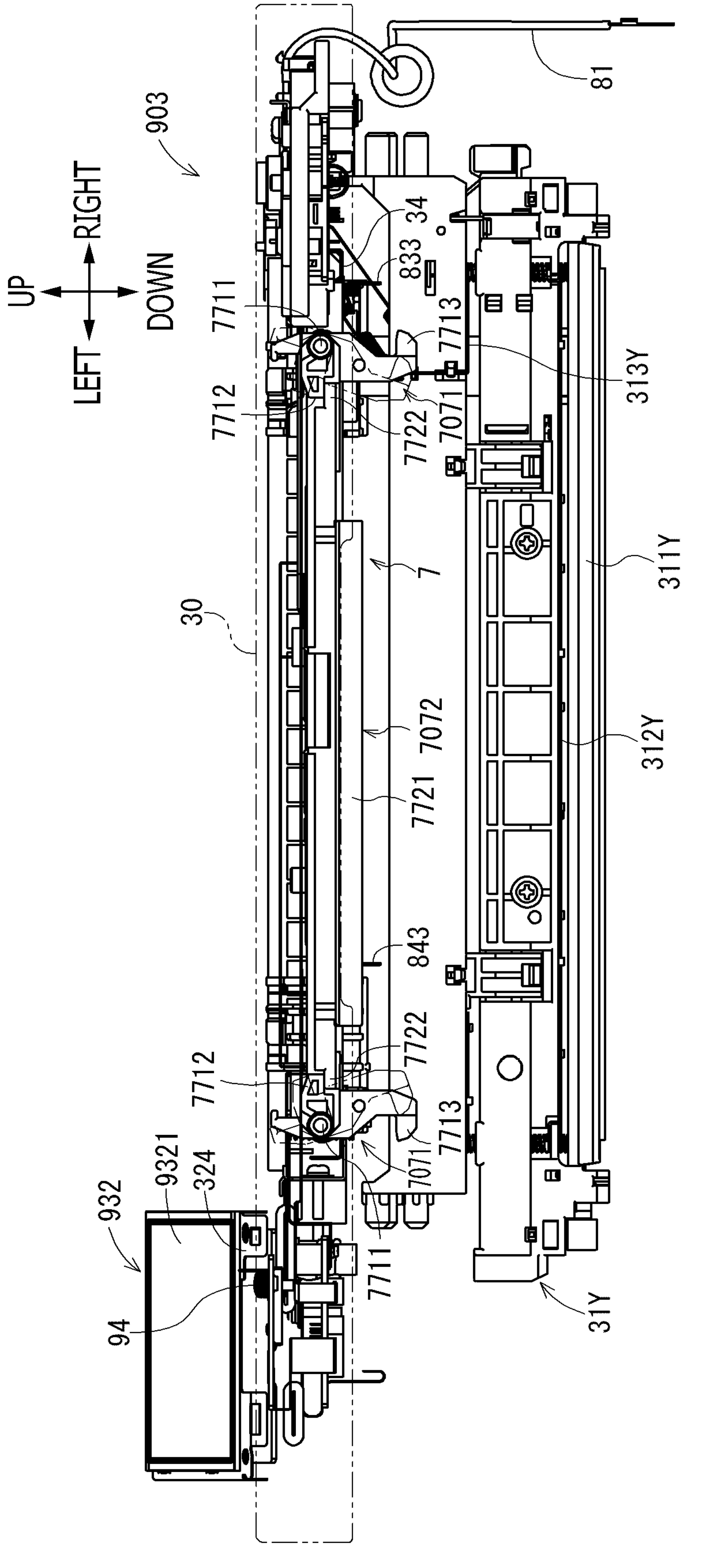
FIG. 23 is a front view of the top cover of the image forming apparatus.
Figure 24:
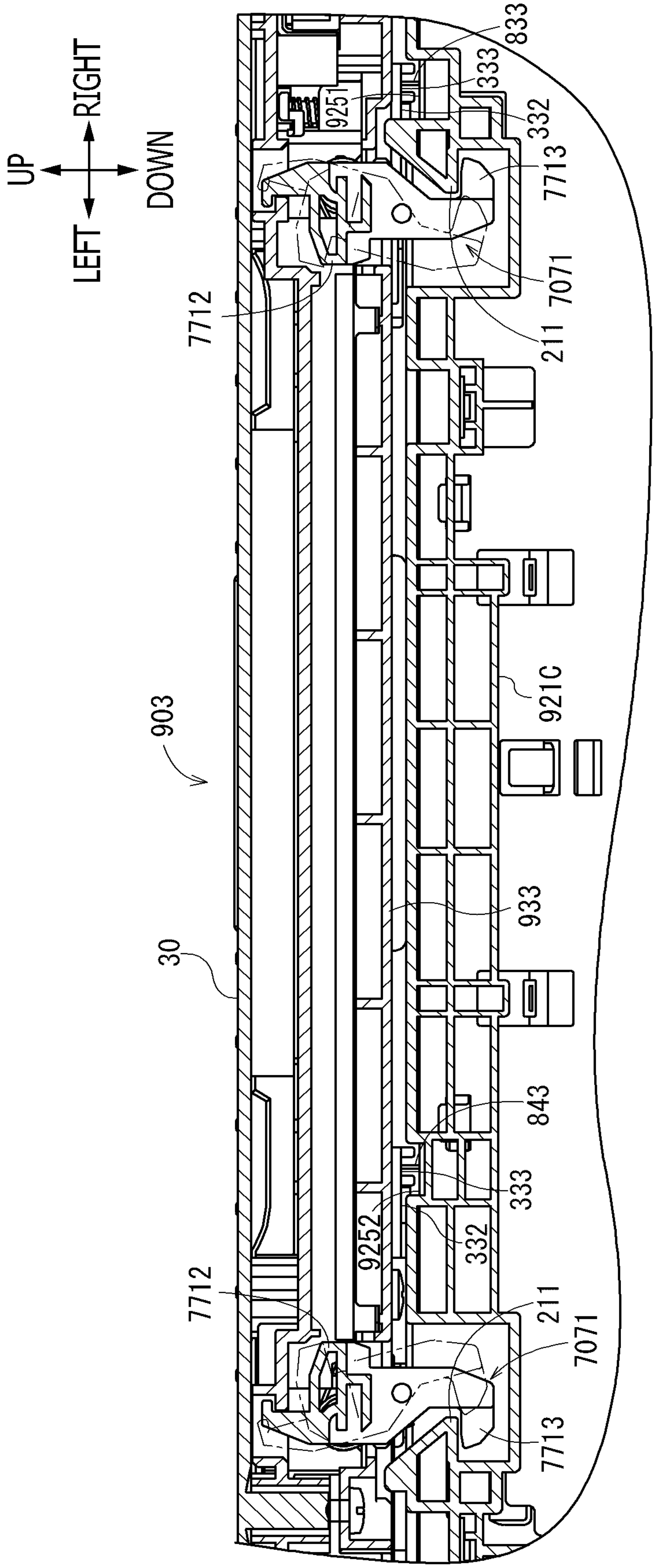
FIG. 24 is a frontward cross-sectional view of the top cover with a locking assembly retaining the top cover at the closed position.

As shown in FIGS. 23 and 25, the LED unit 31Y has a conductive wire 312Y arranged to extend in the widthwise direction and to overlap the LED head 311Y. The conductive wire 312Y is electrically connected to the main metal plate 34 through a connecting wire 313Y. With the connecting wire 313Y in the LED unit 31Y electrically connected to the main metal plate 34, the connecting wire 313Y is grounded. Therefore, static electricity produced in and around the LED unit 31Y may be expelled through the connecting wire 313Y, and the static electricity may be restrained from reaching the LED head 311Y.

Similarly, the LED unit 31M has a conductive wire 312M arranged to extend in the widthwise direction and to overlap the LED head 311M. The conductive wire 312M is electrically connected to the main metal plate 34 through a connecting wire 313M. With the connecting wire 313M in the LED unit 31M electrically connected to the main metal plate 34, the connecting wire 313M is grounded. Therefore, static electricity produced in and around the LED unit 31M may be expelled through the connecting wire 313M, and the static electricity may be restrained from reaching the LED head 311M.

Moreover, the LED unit 31C has a conductive wire 312C arranged to extend in the widthwise direction and to overlap the LED head 311C. The conductive wire 312C is electrically connected to the main metal plate 34 through a connecting wire 313C. With the connecting wire 313C in the LED unit 31C electrically connected to the main metal plate 34, the connecting wire 313C is grounded. Therefore, static electricity produced in and around the LED unit 31C may be expelled through the connecting wire 313C, and the static electricity may be restrained from reaching the LED head 311C.

Furthermore, the LED unit 31K has a conductive wire 312K arranged to extend in the widthwise direction and to overlap the LED head 311K. The conductive wire 312K is electrically connected to the main metal plate 34 through a connecting wire 313K. With the connecting wire 313K in the LED unit 31K electrically connected to the main metal plate 34, the connecting wire 313K is grounded. Therefore, static electricity produced in and around the LED unit 31K may be expelled through the connecting wire 313K, and the static electricity may be restrained from reaching the LED head 311K.

In the image forming apparatus 901, the first side metal plate 35, the second side metal plate 36, and the main metal plate 34 arranged in the openable/closable cover 903 are connected to the first side frame 923, the second side frame 924, and the front frame 925, respectively, to be grounded through the grounding members arranged at four locations, which are the first side grounding member 81 contacting the rearward end portion 35*a* of the first side metal plate 35, the second side grounding member 82 contacting the rearward end portion 36*a* of the second side metal plate 36, the first main grounding member 83 contacting the leftward area in the frontward end portion 34*b* of the main metal plate 34, and the second main grounding member 84 contacting the leftward area in the frontward end portion 34*b* of the main metal plate 34.

Therefore, static electricity may be effectively expelled from the LED units 31Y, 31M, 31C, which are electrically connected to the main metal plate 34, and the LED unit 31K, which is electrically connected to the first side metal plate 35, and effects of noise countermeasures for suppressing malfunctions of electrical components such as the LED heads 311Y, 311M, 311C, 311K in the image forming apparatus 901 may be enhanced. Moreover, three metal members, which are the first side metal plate 35, the second side metal plate 36, and the main metal plate 34, form a larger metal plate structure in the openable/closable cover 903. In other words, the metal plate structure is formed of the three separated pieces of the first side metal plate 35, second side metal plate 36, and the main metal plate 34. Therefore, area dimensions of the metal plate structure may be reduced as a whole, and forming accuracy of the metal plate structure may be improved.

In particular, while the LED unit 31K is located at the most rearward position among the LED units 31Y, 31M, 31C, 31K, the conductive wire 312K for the LED unit 31K is electrically connected to the first side metal plate 35 rather than the main metal plate 34. Therefore, the rearward end portion 34*a* of the main metal plate 34 is allowed to be located frontward with respect to the LED unit 31K, and the dimension of the main metal plate 34 in the front-rear direction may be reduced. Accordingly, while manufacturing cost for the metal plate members may be reduced, the conductive wires 312Y, 312M, 312C, 312K are electrically connected to the metal plates 34, 35 arranged in the openable/closable cover 903.

As shown in FIG. 26, the openable/closable cover 903 has a controller board 91 to control acts of the LED units 31Y, 31M, 31C, 31K. The LED units 31Y, 31M, 31C, 31K are connected to the controller board 91 through harnesses 92. The controller board 91 is mounted on an upper surface of the main metal plate 34, and a grounding circuit on the controller board 91 is electrically connected to the main metal plate 34. Meanwhile, the main metal plate 34 is grounded. Therefore, the controller board 91 is grounded through the electrical connection to the main metal plate 34. By connecting the controller board 91 arranged in the openable/closable cover 903 electrically to the main metal plate 34, which is also arranged in the openable/closable cover 903, the controller board 91 is efficiently grounded.

Figure 32:
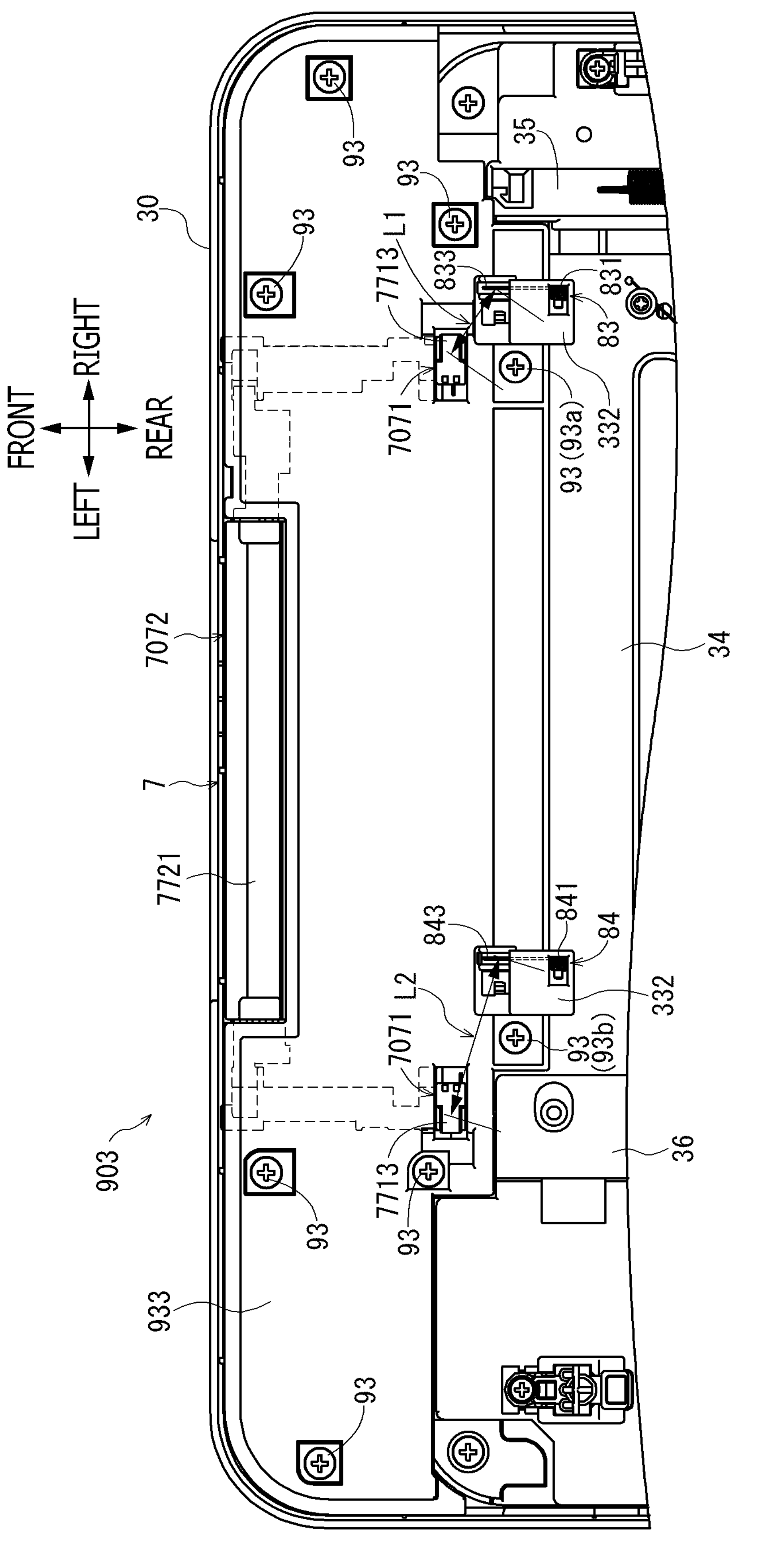
FIG. 32 is a bottom plan view of the frontward area of the top cover.

As shown in FIG. 32, the operation part 7072 of the locking assembly 7 is located at a widthwise central position in the frontward end area of the top cover 30. The frontward end area in the top cover 30 is an area on one end of the openable/closable cover 930 farther in the front-rear direction from the pivot axis 30*a*. The first main grounding member 83 is located rightward with respect to the operation part 7072. In other words, the first main grounding member 83 is located outward with respect to the operation part 7072 in the widthwise direction.

For operating the locking assembly 7 to move the top cover 30 toward the open position, the user may insert a hand from the front side of the top cover 30 and grip the handle 7721 of the operation part 7072. In this regard, the first main grounding member 83 is located outward in the widthwise direction with respect to the operation part 7072. Therefore, the user's hand may be restrained from touching the first main grounding member 83.

Meanwhile, in the present embodiment, the second main grounding member 84 may be located at the position to overlap the operation part 7072 of the locking assembly 7 in the widthwise direction. However, optionally, the second main grounding member 84 may be located at a position outward in the widthwise direction with respect to the operation part 7072. With the second main grounding member 84 being located outward in the widthwise direction with respect to the operation part 7072, when the user operates the operation part 7072, the second main grounding member 84 may be restrained from being touched by the user's hand.

The first main grounding member 83 and the second main grounding member 84 are located rearward with respect to the operation part 7072 of the locking assembly 7 in the front-rear direction. In other words, the first main grounding member 83 and the second main grounding member 84 are located closer to the pivot axis 30*a* than the operation part 7072 of the locking assembly 7 in the front-rear direction.

For operating the locking assembly 7 to move the top cover 30 toward the open position, the user may insert a hand from the front side of the top cover 30 and grip the handle 7721 of the operation part 7072. Meanwhile, the first main grounding member 83 and the second main grounding member 84 are located rearward with respect to the operation part 7072, and the inserted hand may not reach the first main grounding member 83 or the second main grounding member 84. Therefore, when the user operates the operation part 7072, the first main grounding member 83 and the second main grounding member 84 are restrained from being touched by the user.

The retainer frame 933 to retain the first main grounding member 83 and the second main grounding member 84 are fastened to the top cover 30 with screws 93. A screw 93*a* being one of the screws 93 is located between the engageable claw 7713 of the engaging part 7071 on the right in the locking assembly 7 and the first main grounding member 83 along a line L1, which extends through the engageable claw 7713 on the right and the first main grounding member 83.

The first main grounding member 83 located between the main metal plate 34 and the retainer frame 933 provides the urging force to separate the first arm portion 832 and the second arm portion 833 from each other, in other words, the urging force to separate the retainer frame 933 from the top cover 30 in the vertical direction. Therefore, when the load by the urging force from the first main grounding member 83 acts on the retainer frame 933, the retainer frame 933 may tend to deform.

Meanwhile, in the openable/closable cover 903, the retainer frame 933 is fixed with the screw 93*a* to the top cover 30 at the position between the engaging part 7071 on the right and the first main grounding member 83 in the direction along the line L1. In this arrangement, when the load by the urging force from the first main grounding member 83 acts on the retainer frame 933, the acting load may be restrained from being transmitted to the part of the retainer frame 933 that retains the engagement part 7071 on the right. Therefore, deformation of the part of the retainer frame 933 that retains the engagement part 7071 on the right may be restrained, and the positional accuracy of the top cover 30, which may be retained closed by the locking assembly 7, may be maintained.

Similarly, a screw 93*b* being another one of the screws 93 is located between the engageable claw 7713 in the engaging part 7071 on the left in the locking assembly 7 and the second main grounding member 84 along a line L2, which extends through the engageable claw 7713 on the left and the second main grounding member 84.

The second main grounding member 84 located between the main metal plate 34 and the retainer frame 933 provides the urging force to separate the first arm portion 842 and the second arm portion 843 from each other, in other words, the urging force to separate the retainer frame 933 from the top cover 30 in the vertical direction. Therefore, when the load by the urging force from the second main grounding member 84 acts on the retainer frame 933, the retainer frame 933 may tend to deform.

Meanwhile, in the openable/closable cover 903, the retainer frame 933 is fixed with the screw 93*b* to the top cover 30 at the position between the engaging part 7071 on the left and the second main grounding member 84 in the direction along the line L2. In this arrangement, when the load by the urging force from the second main grounding member 84 acts on the retainer frame 933, the acting load may be restrained from being transmitted to the part of the retainer frame 933 that retains the engagement part 7071 on the left. Therefore, deformation of the part of the retainer frame 933 that retains the engagement part 7071 on the left may be restrained, and the positional accuracy of the top cover 30, which may be retained closed by the locking assembly 7, may be maintained.

Figure 33:
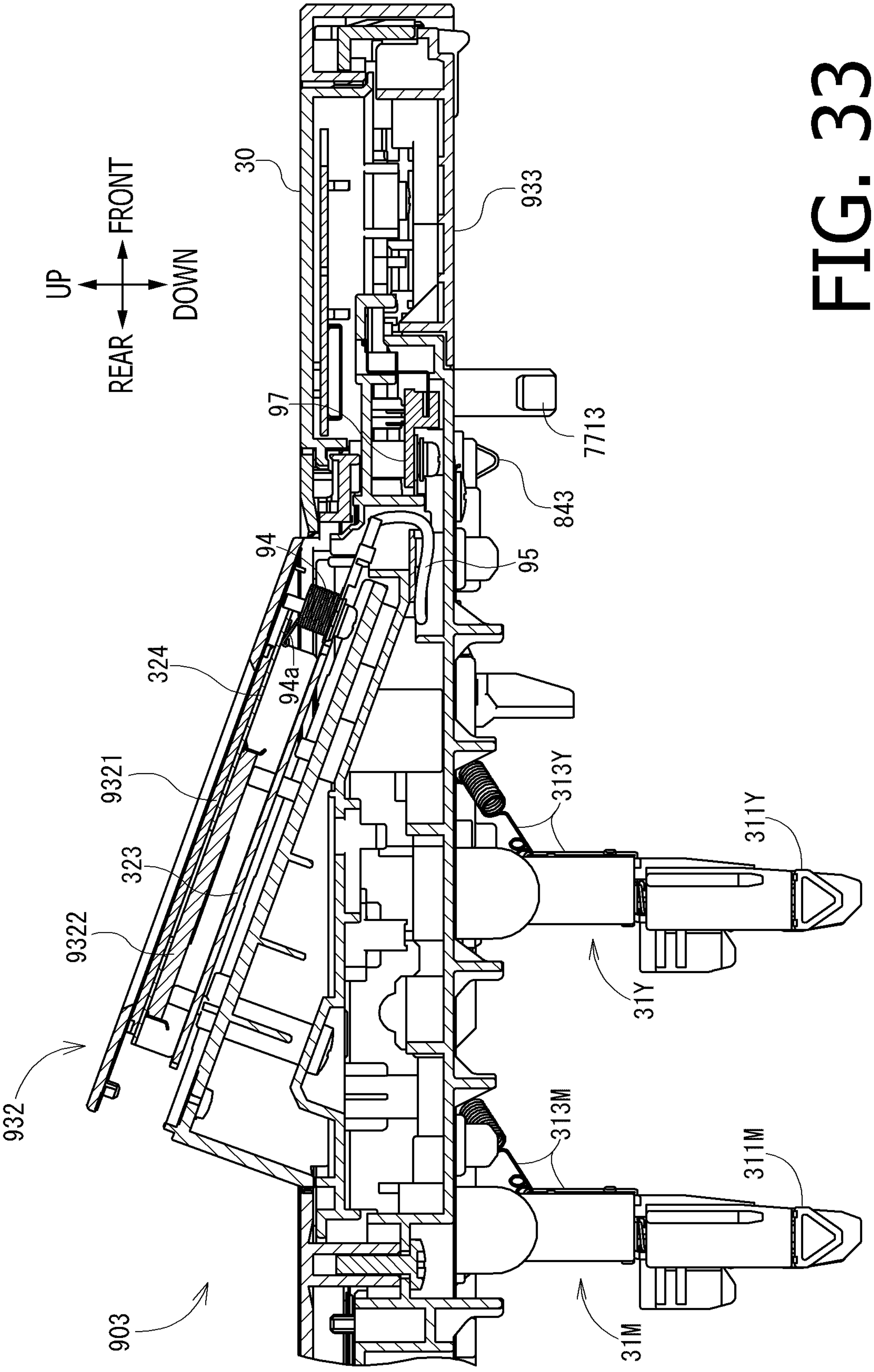
FIG. 33 is a sideward cross-sectional view of an operation interface.

As shown in FIG. 33, the operation interface 932 includes an operation panel 9321, which may be used by the user to operate the image forming apparatus 901, a display panel 9322, in which information including condition of the image forming apparatus 901 may be displayed, a panel board 323, which may control acts of the operation panel 9321 and the display panel 9322, and a conductive board 324, which is arranged to vertically overlap the panel board 323. In the operation interface 932, the operation panel 9321, the conductive board 324, the display panel 9322, and the panel board 323 are layered in this given order from top to bottom.

As shown in FIGS. 25-26 and 33, the conductive board 324 is electrically connected to the main metal plate 34 through a coil spring 94, a cable 95, and a grounding wire 96. Since the main metal plate 34 is grounded, the conductive board 324 electrically connected to the main metal plate 34 is grounded. Therefore, static electricity produced around operation interface 932 may be expelled through the conductive board 324, and the static electricity may be restrained from reaching the panel board 323 so that the operation interface 932 may be restrained from malfunctioning.

The coil spring 94 is electrically connected to the conductive board 324 through a contact portion 94*a* being in contact with the conductive board 324. The coil spring 94 and the cable 95 are jointly fastened with a screw to the top cover 30 and are electrically connected. The openable/closable cover 903 includes a relay board 97, and the cable 95 and the grounding wire 96 are jointly fastened with a screw to the relay board 97 and thereby electrically connected. The grounding wire 96 is electrically connected to the main metal plate 34 through a coil portion 96*a* being in contact with the main metal plate 34.

By connecting the conductive board 324 attached to the openable/closable cover 903 electrically to the main metal plate 34, which is also arranged in the openable/closable cover 903, the conductive board 324 is efficiently grounded. While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus, comprising:

a housing having an opening;

an openable/closable cover configured to open and close the opening;

a hinge supporting the openable/closable cover pivotably with respect to the housing;

a plurality of LED units, each of which has an LED head extending in a first direction, the first direction being parallel to a pivot axis of the hinge, the plurality of LED units being supported by the openable/closable cover in an arrangement aligning in a second direction, the second direction intersecting orthogonally with the first direction;

a first enhancing member attached to an inner surface of the openable/closable cover on one side of the openable/closable cover in the first direction, the inner surface facing toward the opening, the first enhancing member extending in the second direction;

a second enhancing member attached to the inner surface of the openable/closable cover on the other side of the openable/closable cover opposite to the one side in the first direction, the second enhancing member extending in the second direction; and a link member linking the first enhancing member and the second enhancing member at a position farther from the hinge than one of the plurality of LED units located closest to the hinge in the second direction, an end of the link member toward the hinge in the second direction being located farther from the hinge than the one of the plurality of LED units located closest to the hinge in the second direction.

2. The image forming apparatus according to claim 1, further comprising a first LED-unit holder retaining ends of the plurality of LED units on the one side in the first direction, the first LED-unit holder being configured to be attached to the first enhancing member; and a second LED-unit holder retaining ends of the plurality of LED units on the other side in the first direction, the second LED-unit holder being configured to be attached to the second enhancing member.

3. The image forming apparatus according to claim 1, further comprising a controller board configured to control the plurality of LED units, wherein the controller board is attached to the link member.

4. The image forming apparatus according to claim 1, wherein the link member has a stepped portion located farther from the inner surface of the openable/closable cover than the first enhancing member and the second enhancing member in a third direction, the third direction intersecting orthogonally with the first direction and the second direction.

5. The image forming apparatus according to claim 4, further comprising a controller board configured to control the plurality of LED units, wherein the controller board is attached to a surface of the stepped portion on a side facing the openable/closable cover.

6. The image forming apparatus according to claim 2, wherein the first enhancing member and the link member are jointly fastened to the first LED-unit holder with a screw, and the second enhancing member and the link member are jointly fastened to the second LED-unit holder with a screw.

7. The image forming apparatus according to claim 2, wherein each of the plurality of LED units has a protrusion protruding in the first direction on each end thereof in the first direction, each of the first LED-unit holder and the second LED-unit holder has holes, in each of which the protrusion of each of the plurality of LED units is configured to be inserted, and at least one of the first LED-unit holder and the second LED-unit holder has an extended rib extending from a peripheral edge of one of the holes toward one of the plurality of LED units, the extended rib having an inner radius equal to an inner radius of the one of the holes.

8. The image forming apparatus according to claim 7, wherein the extended rib is arranged at least around one of the holes corresponding to one of the plurality of LED units located farthest from the link member and closest to the hinge in the second direction.

9. The image forming apparatus according to claim 7, wherein the extended rib is formed to have a shape of a U, of which one end in a third direction toward the openable/closable cover is open, the third direction intersecting orthogonally with the first direction and the second direction.

10. The image forming apparatus according to claim 1, wherein the openable/closable cover has an ejection tray, at which a sheet is ejected from the housing, the ejection tray has a slanted section dented inward in the housing, and the link member is located farther than the slanted section from the hinge in the second direction.

11. The image forming apparatus according to claim 10, wherein, in a view along a third direction, the third direction intersecting orthogonally with the first direction and the second direction, the slanted section overlaps at least the one of the plurality of LED units located closest to the hinge in the second direction.

12. The image forming apparatus according to claim 1, wherein the link member faces, on one side thereof in a third direction, the third direction intersecting orthogonally with the first direction and the second direction at least a farthest one of the plurality of LED units from the hinge in the second direction among the plurality of LED units and faces, on the other side thereof in the third direction, the openable/closeable cover.

13. The image forming apparatus according to claim 1, wherein the openable/closable cover supports an operation interface configured to operate the image forming apparatus, and the operation interface overlaps the link member in the second direction in a view along a third direction, the third direction intersecting orthogonally with the first direction and the second direction.

14. The image forming apparatus according to claim 2, wherein the first enhancing member is attached to the inner surface of the openable/closable cover on one side thereof in a third direction, the third direction intersecting orthogonally with the first direction and the second direction, and the first LED-unit holder is attached to the other side of the first enhancing member in the third direction, and wherein the second enhancing member is attached to the inner surface of the openable/closable cover in an arrangement on one side thereof in the third direction, and the second LED-unit holder is attached to the other side of the second enhancing member in the third direction.

15. An image forming apparatus, comprising:

a housing having an opening;

an openable/closable cover configured to open and close the opening;

a hinge supporting the openable/closable cover pivotably with respect to the housing;

a plurality of LED units, each of which has an LED head extending in a first direction, the first direction being parallel to a pivot axis of the hinge, the plurality of LED units being supported by the openable/closable cover in an arrangement aligning in a second direction, the second direction intersecting orthogonally with the first direction;

a first enhancing member attached to an inner surface of the openable/closable cover on one side of the openable/closable cover in the first direction, the inner surface facing toward the opening, the first enhancing member extending in the second direction;

a second enhancing member attached to the inner surface of the openable/closable cover on the other side of the openable/closable cover opposite to the one side in the first direction, the second enhancing member extending in the second direction;

a link member linking the first enhancing member and the second enhancing member at a position farther from the hinge than one of the plurality of LED units located closest to the hinge in the second direction;

a first LED-unit holder retaining ends of the plurality of LED units on the one side in the first direction, the first LED-unit holder being configured to be attached to the first enhancing member; and a second LED-unit holder retaining ends of the plurality of LED units on the other side in the first direction, the second LED-unit holder being configured to be attached to the second enhancing member, wherein the first enhancing member is attached to the inner surface of the openable/closable cover on one side thereof in a third direction, the third direction intersecting orthogonally with the first direction and the second direction, and the first LED-unit holder is attached to the other side of the first enhancing member in the third direction, and wherein the second enhancing member is attached to the inner surface of the openable/closable cover in an arrangement on one side thereof in the third direction, and the second LED-unit holder is attached to the other side of the second enhancing member in the third direction.

16. An image forming apparatus, comprising:

a housing having an opening;

an openable/closable cover configured to open and close the opening;

a hinge supporting the openable/closable cover pivotably with respect to the housing;

a plurality of LED units, each of which has an LED head extending in a first direction, the first direction being parallel to a pivot axis of the hinge, the plurality of LED units being supported by the openable/closable cover in an arrangement aligning in a second direction, the second direction intersecting orthogonally with the first direction;

a metal plate attached to an inner surface of the openable/closable cover, the inner surface facing toward the opening, the metal plate comprising;

a first enhancing potion attached to the inner surface of the openable/closable cover on one side of the openable/closable cover in the first direction, the first enhancing portion extending in the second direction; and a second enhancing portion attached to the inner surface of the openable/closable cover on the other side of the openable/closable cover opposite to the one side in the first direction, the second enhancing portion extending in the second direction, wherein an end of the metal plate toward the hinge in the second direction in a portion ranging between the first enhancing portion and the second enhancing portion in the first direction is located farther from the hinge than one of the plurality of LED units located closest to the hinge in the second direction.

17. The image forming apparatus according to claim 16, further comprising:

a first LED-unit holder retaining ends of the plurality of LED units on the one side in the first direction, the first LED-unit holder being configured to be attached to the first enhancing portion; and a second LED-unit holder retaining ends of the plurality of LED units on the other side in the first direction, the second LED-unit holder being configured to be attached to the second enhancing portion.

18. The image forming apparatus according to claim 17, wherein the first enhancing portion is attached to the inner surface of the openable/closable cover on one side thereof in a third direction, the third direction intersecting orthogonally with the first direction and the second direction, and the first LED-unit holder is attached to the other side of the first enhancing portion in the third direction, and wherein the second enhancing portion is attached to the inner surface of the openable/closable cover in an arrangement on one side thereof in the third direction, and the second LED-unit holder is attached to the other side of the second enhancing portion in the third direction.

* * * * *